United States Patent
Wilkinson et al.

(10) Patent No.: US 10,614,504 B2
(45) Date of Patent: Apr. 7, 2020

(54) SYSTEMS AND METHODS FOR PROVIDING CONTENT-BASED PRODUCT RECOMMENDATIONS

(71) Applicant: Walmart Apollo, LLC, Bentonville, AR (US)

(72) Inventors: Bruce W. Wilkinson, Rogers, AR (US); Brian G. McHale, Chadderton Oldham (GB); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 427 days.

(21) Appl. No.: 15/488,015

(22) Filed: Apr. 14, 2017

(65) Prior Publication Data
US 2017/0301001 A1 Oct. 19, 2017

Related U.S. Application Data

(60) Provisional application No. 62/323,026, filed on Apr. 15, 2016, provisional application No. 62/348,444, (Continued)

(51) Int. Cl.
*G06Q 30/06* (2012.01)
*G06Q 30/02* (2012.01)
*G06Q 10/08* (2012.01)

(52) U.S. Cl.
CPC ....... *G06Q 30/0631* (2013.01); *G06Q 10/083* (2013.01); *G06Q 30/0251* (2013.01); (Continued)

(58) Field of Classification Search
None
See application file for complete search history.

(56) References Cited

U.S. PATENT DOCUMENTS 4,771,380 A * 9/1988 Kris .................... G06F 15/8076
                                                          712/6
4,931,929 A    6/1990 Sherman
(Continued)

FOREIGN PATENT DOCUMENTS

CA      2822865      2/2014
CN    103106267      5/2013
(Continued)

OTHER PUBLICATIONS

Cognizant; "Omnichannel Retailing | The Digital Store of the Future | Cognizant"; http://www.youtube.com/watch?v=CRaiadNn_nw; published on Sep. 1, 2015; pp. 1-5 (Year: 2015).*

(Continued)

*Primary Examiner* — Nicholas D Rosen
(74) *Attorney, Agent, or Firm* — Fitch, Even, Tabin & Flannery LLP

(57) ABSTRACT

Systems, apparatuses, and methods are provided herein for content-based product recommendations. A system for content-based product recommendations comprises a content monitoring device configured to monitor video content viewed by a user, a customer vectors database, a product vectors database; and a control circuit being configured to: detect, via the content monitoring device, a video content being viewed by the user, identify an item associated with a current segment of the video content viewed by the user, determine a product category associated with the item, determine alignments between the customer value vectors and the product characteristic vectors for each of the plurality of products in the product category, select a recommended product from the plurality of products based on the alignments between the customer value vectors and the product characteristic vectors for each of the plurality of (Continued)

products, and initiate an offer of the recommended product to the customer.

21 Claims, 21 Drawing Sheets

Related U.S. Application Data filed on Jun. 10, 2016, provisional application No. 62/436,842, filed on Dec. 20, 2016, provisional application No. 62/485,045, filed on Apr. 13, 2017, provisional application No. 62/463,103, filed on Feb. 24, 2017, provisional application No. 62/427,478, filed on Nov. 29, 2016, provisional application No. 62/400,302, filed on Sep. 27, 2016.

(52) U.S. Cl.
CPC ..... *G06Q 30/0255* (2013.01); *G06Q 30/0269* (2013.01); *G06Q 30/0241* (2013.01)

(56) References Cited

U.S. PATENT DOCUMENTS

| | | | | |
|---|---|---|---|---|
| 5,092,343 | A | 3/1992 | Spitzer | |
| 5,357,439 | A | 10/1994 | Matsuzaki | |
| 5,410,471 | A | 4/1995 | Alyfuku | |
| 5,712,830 | A | 1/1998 | Ross | |
| 5,737,611 | A | 4/1998 | Vicik | |
| 5,974,396 | A | 10/1999 | Anderson | |
| 6,236,974 | B1 | 5/2001 | Kolawa | |
| 6,249,773 | B1 | 6/2001 | Allard | |
| 6,260,024 | B1 | 7/2001 | Shkedy | |
| 6,327,574 | B1 | 12/2001 | Kramer | |
| 6,519,571 | B1 | 2/2003 | Guheen | |
| 6,583,720 | B1 | 6/2003 | Quigley | |
| 6,594,642 | B1 | 7/2003 | Lemchen | |
| 6,614,348 | B2 | 9/2003 | Ciccolo | |
| 6,615,208 | B1 | 9/2003 | Behrens | |
| 6,654,725 | B1 | 11/2003 | Langheinrich | |
| 6,655,963 | B1 * | 12/2003 | Horvitz | G06Q 30/02 434/236 |
| 6,731,940 | B1 | 5/2004 | Nagendran | |
| 6,826,541 | B1 | 11/2004 | Johnston | |
| 6,856,249 | B2 | 2/2005 | Strubbe | |
| 6,901,304 | B2 | 5/2005 | Swan | |
| 6,937,710 | B1 | 8/2005 | Griffiths | |
| 7,063,263 | B2 | 6/2006 | Swartz | |
| 7,072,848 | B2 | 7/2006 | Boyd | |
| 7,130,814 | B1 | 10/2006 | Szabo | |
| 7,147,154 | B2 | 12/2006 | Myers | |
| 7,174,312 | B2 | 2/2007 | Harper | |
| 7,225,979 | B2 | 6/2007 | Silverbrook | |
| 7,249,708 | B2 | 7/2007 | McConnell | |
| 7,330,828 | B2 | 2/2008 | Schoder | |
| 7,346,563 | B2 | 3/2008 | Pellerin | |
| 7,369,680 | B2 | 5/2008 | Trajkovic | |
| 7,508,307 | B2 | 3/2009 | Albert | |
| 7,584,139 | B2 | 9/2009 | Goodwin | |
| 7,657,457 | B2 | 2/2010 | Razumov | |
| 7,658,327 | B2 | 2/2010 | Tuchman | |
| 7,680,694 | B2 | 3/2010 | Glazer | |
| 7,685,024 | B2 | 3/2010 | Ofer | |
| 7,707,073 | B2 | 4/2010 | Bloebaum | |
| 7,720,720 | B1 | 5/2010 | Sharma | |
| 7,766,829 | B2 | 8/2010 | Sloan | |
| 7,778,773 | B2 | 8/2010 | Yaqub | |
| 7,814,029 | B1 | 10/2010 | Siegel | |
| 7,819,315 | B1 | 10/2010 | Pienkos | |
| 7,856,368 | B2 | 12/2010 | Avallone | |
| 7,860,759 | B2 | 12/2010 | Stoppelman | |
| 7,873,543 | B2 | 1/2011 | Perrier | |
| 7,945,473 | B2 | 5/2011 | Fano | |
| 8,013,729 | B2 | 9/2011 | Buehler | |
| 8,036,951 | B2 | 10/2011 | Kraft | |
| 8,055,546 | B1 | 11/2011 | Cassone | |
| 8,073,460 | B1 | 12/2011 | Scofield | |
| 8,086,546 | B2 | 12/2011 | Spiegel | |
| 8,117,089 | B2 | 2/2012 | Minsky | |
| 8,140,388 | B2 | 3/2012 | Gross | |
| 8,239,287 | B1 * | 8/2012 | Smith | G06Q 30/0241 705/26.1 |
| 8,244,830 | B2 | 8/2012 | Robinson | |
| 8,249,946 | B2 | 8/2012 | Froseth | |
| 8,261,306 | B2 | 9/2012 | Dimitrova | |
| 8,266,017 | B1 | 9/2012 | Dearlove | |
| 8,271,322 | B2 | 9/2012 | Ariyibi | |
| 8,285,715 | B2 | 10/2012 | Faria | |
| 8,298,087 | B1 * | 10/2012 | Smith | G06Q 30/0255 463/42 |
| 8,316,020 | B1 | 11/2012 | Kleinmann | |
| 8,364,520 | B1 | 1/2013 | Eichorn | |
| 8,370,207 | B2 | 2/2013 | Edwards | |
| 8,370,216 | B2 | 2/2013 | Kessel | |
| 8,386,285 | B2 | 2/2013 | Chen | |
| 8,401,914 | B1 | 3/2013 | Kim | |
| 8,429,026 | B1 | 4/2013 | Kolawa | |
| 8,447,703 | B2 | 5/2013 | Yuasa | |
| 8,457,354 | B1 | 6/2013 | Kolar | |
| 8,494,915 | B2 | 7/2013 | Mesaros | |
| 8,538,829 | B1 | 9/2013 | Hu | |
| 8,558,703 | B2 | 10/2013 | Edlund | |
| 8,577,753 | B1 | 11/2013 | Vincent | |
| 8,583,511 | B2 | 11/2013 | Hendrickson | |
| 8,595,773 | B1 | 11/2013 | Wang | |
| 8,606,636 | B1 | 12/2013 | Keoshkerian | |
| 8,606,645 | B1 | 12/2013 | Applefeld | |
| 8,630,921 | B2 | 1/2014 | Nuzzi | |
| 8,666,844 | B2 | 3/2014 | Shaya | |
| 8,738,541 | B2 | 5/2014 | Gross | |
| 8,744,920 | B2 | 6/2014 | Aldomar | |
| 8,803,366 | B2 | 8/2014 | Proud | |
| 8,818,876 | B2 | 8/2014 | Yu | |
| 8,849,710 | B2 | 9/2014 | Moghadam | |
| 8,849,719 | B2 | 9/2014 | Baker | |
| 8,874,485 | B2 | 10/2014 | Partridge | |
| 8,968,195 | B2 | 3/2015 | Tran | |
| 9,015,277 | B1 | 4/2015 | Slavin | |
| 9,030,295 | B2 | 5/2015 | Allen | |
| 9,036,019 | B2 | 5/2015 | Hanson | |
| 9,087,358 | B1 | 7/2015 | Giorgalli | |
| 9,129,250 | B1 | 9/2015 | Sestini | |
| 9,165,320 | B1 | 10/2015 | Belvin | |
| 9,174,758 | B1 | 11/2015 | Rowley | |
| 9,183,510 | B1 | 11/2015 | Walti | |
| 9,189,021 | B2 | 11/2015 | Jerauld | |
| 9,218,633 | B2 | 12/2015 | Hulett | |
| 9,224,157 | B2 | 12/2015 | Lim | |
| 9,230,070 | B2 | 1/2016 | Farha | |
| 9,251,527 | B2 | 2/2016 | Shah | |
| 9,256,693 | B2 | 2/2016 | Nice | |
| 9,256,890 | B1 | 2/2016 | Schmidt | |
| 9,286,617 | B2 | 3/2016 | Maskatia | |
| 9,294,298 | B2 | 3/2016 | Lee | |
| 9,325,849 | B1 | 4/2016 | Brydon | |
| 9,424,589 | B2 | 8/2016 | Perrier | |
| 9,430,788 | B2 | 8/2016 | Stiernagle | |
| 9,451,576 | B2 | 9/2016 | Lifshitz | |
| 9,489,674 | B2 | 11/2016 | Faith | |
| 9,524,638 | B2 * | 12/2016 | Kim | G08C 23/02 |
| 9,563,194 | B2 | 2/2017 | Stiernagle | |
| 9,750,439 | B2 | 9/2017 | Doniger | |
| 10,169,971 | B2 | 1/2019 | Wilkinson | |
| 10,366,396 | B2 * | 7/2019 | Wilkinson | G06Q 30/016 |
| 10,373,230 | B2 * | 8/2019 | Walti | G06Q 30/0631 |
| 10,373,464 | B2 * | 8/2019 | Wilkinson | G08B 21/02 |
| 2001/0014868 | A1 | 8/2001 | Herz | |
| 2001/0034661 | A1 | 10/2001 | Ferreira | |
| 2002/0003166 | A1 | 1/2002 | Miller | |
| 2002/0010000 | A1 | 1/2002 | Chern | |
| 2002/0052825 | A1 | 5/2002 | Bensemana | |
| 2002/0095345 | A1 | 7/2002 | Panelli | |
| 2002/0128910 | A1 | 9/2002 | Sakuma | |

(56) References Cited

U.S. PATENT DOCUMENTS

| | | |
|---|---|---|
| 2002/0152001 A1 | 10/2002 | Knipp |
| 2002/0161664 A1 | 10/2002 | Shaya |
| 2002/0165790 A1 | 11/2002 | Bancroft |
| 2002/0174025 A1 | 11/2002 | Hind |
| 2002/0178013 A1 | 11/2002 | Hoffman |
| 2002/0194604 A1 | 12/2002 | Sanchez |
| 2003/0004810 A1 | 1/2003 | Eldering |
| 2003/0028424 A1 | 2/2003 | Kampff |
| 2003/0065520 A1 | 4/2003 | Jutzi |
| 2003/0083951 A1 | 5/2003 | Connelly |
| 2003/0088370 A1 | 5/2003 | Bagepalli |
| 2003/0107650 A1 | 6/2003 | Colmenarez |
| 2003/0126023 A1 | 7/2003 | Crampton |
| 2003/0130897 A1 | 7/2003 | Pickover |
| 2003/0130908 A1 | 7/2003 | Hing |
| 2003/0149693 A1 | 8/2003 | Dobler |
| 2003/0177072 A1 | 9/2003 | Bared |
| 2003/0212619 A1 | 11/2003 | Jain |
| 2004/0030531 A1 | 2/2004 | Miller |
| 2004/0064379 A1 | 4/2004 | Anderson |
| 2004/0100380 A1 | 5/2004 | Lindsay |
| 2004/0103043 A1 | 5/2004 | Reade |
| 2004/0117383 A1 | 6/2004 | Lee |
| 2004/0153442 A1 | 8/2004 | Mantz |
| 2004/0158497 A1 | 8/2004 | Brand |
| 2004/0165708 A1 | 8/2004 | White |
| 2004/0176987 A1 | 9/2004 | Dial |
| 2004/0198386 A1 | 10/2004 | Dupray |
| 2004/0225651 A1 | 11/2004 | Musgrove |
| 2005/0034161 A1 | 2/2005 | Brown |
| 2005/0049920 A1 | 3/2005 | Day |
| 2005/0159996 A1 | 7/2005 | Lazarus |
| 2005/0187021 A1 | 8/2005 | Daskalakis |
| 2005/0189414 A1 | 9/2005 | Fano |
| 2005/0238465 A1 | 10/2005 | Razumov |
| 2005/0273377 A1 | 12/2005 | Ouimet |
| 2005/0283394 A1 | 12/2005 | McGloin |
| 2006/0010029 A1 | 1/2006 | Gross |
| 2006/0036485 A1 | 2/2006 | Duri |
| 2006/0055543 A1 | 3/2006 | Ganesh |
| 2006/0136293 A1 | 6/2006 | Kasravi |
| 2006/0183980 A1 | 8/2006 | Yang |
| 2006/0230053 A1 | 10/2006 | Eldering |
| 2006/0237532 A1 | 10/2006 | Scott-Leikach |
| 2006/0256008 A1 | 11/2006 | Rosenberg |
| 2006/0259360 A1 | 11/2006 | Flinn |
| 2006/0288374 A1 | 12/2006 | Ferris |
| 2007/0016488 A1 | 1/2007 | Ulenas |
| 2007/0035511 A1 | 2/2007 | Banerjee |
| 2007/0050201 A1 | 3/2007 | Gardner |
| 2007/0073553 A1 | 3/2007 | Flinn |
| 2007/0179846 A1 | 8/2007 | Jain |
| 2007/0219866 A1 | 9/2007 | Wolf |
| 2007/0244741 A1 | 10/2007 | Blume |
| 2007/0265870 A1 | 11/2007 | Song |
| 2007/0290038 A1 | 12/2007 | Woodcock |
| 2007/0294133 A1 | 12/2007 | Lasker |
| 2007/0299724 A1 | 12/2007 | Hales |
| 2008/0004995 A1 | 1/2008 | Klingenberg |
| 2008/0043013 A1 | 2/2008 | Gruttadauria |
| 2008/0052171 A1 | 2/2008 | Eldering |
| 2008/0059297 A1 | 3/2008 | Vallier |
| 2008/0065468 A1 | 3/2008 | Berg |
| 2008/0071622 A1 | 3/2008 | Walker |
| 2008/0089288 A1 | 4/2008 | Anschutz |
| 2008/0114642 A1 | 5/2008 | Goldberg |
| 2008/0208673 A1 | 8/2008 | Mebruer |
| 2008/0248815 A1 | 10/2008 | Busch |
| 2008/0249836 A1 | 10/2008 | Angell |
| 2008/0288327 A1 | 11/2008 | Watarai |
| 2009/0012704 A1 | 1/2009 | Franco |
| 2009/0018996 A1 | 1/2009 | Hunt |
| 2009/0063290 A1 | 3/2009 | Mehew |
| 2009/0083121 A1 | 3/2009 | Angell |
| 2009/0094121 A1 | 4/2009 | Newhouse |
| 2009/0128325 A1 | 5/2009 | Ivanov |
| 2009/0132347 A1 | 5/2009 | Anderson |
| 2009/0164772 A1 | 6/2009 | Karkaria |
| 2009/0166375 A1 | 7/2009 | Butler |
| 2009/0171968 A1 | 7/2009 | Kane |
| 2009/0197616 A1 | 8/2009 | Lewis |
| 2009/0234712 A1 | 9/2009 | Kolawa |
| 2009/0271293 A1 | 10/2009 | Parkhurst |
| 2009/0303052 A1 | 12/2009 | Aklepi |
| 2010/0030578 A1 | 2/2010 | Siddique |
| 2010/0042940 A1 | 2/2010 | Monday |
| 2010/0064040 A1 | 3/2010 | Wise |
| 2010/0084463 A1 | 4/2010 | Huang |
| 2010/0133850 A1 | 6/2010 | Winkler |
| 2010/0185552 A1 | 7/2010 | Deluca |
| 2010/0198668 A1 | 8/2010 | Resnick |
| 2010/0216509 A1 | 8/2010 | Riemer |
| 2010/0293032 A1 | 11/2010 | Engelsma |
| 2010/0293569 A1 | 11/2010 | Kusumoto |
| 2011/0004588 A1 | 1/2011 | Leitersdorf |
| 2011/0022606 A1 | 1/2011 | Mason |
| 2011/0035282 A1 | 2/2011 | Spatscheck |
| 2011/0131089 A1 | 6/2011 | Walker |
| 2011/0213661 A1 | 9/2011 | Milana |
| 2011/0218859 A1 | 9/2011 | Wang |
| 2011/0225046 A1 | 9/2011 | Eldering |
| 2011/0246260 A1 | 10/2011 | Gilbert |
| 2011/0246306 A1 | 10/2011 | Blackhurst |
| 2011/0251897 A1 | 10/2011 | Litvack |
| 2011/0267374 A1 | 11/2011 | Sakata |
| 2011/0282476 A1 | 11/2011 | Hegemier |
| 2011/0302011 A1 | 12/2011 | Yoder |
| 2011/0316697 A1 | 12/2011 | Krahnstoever |
| 2012/0019378 A1 | 1/2012 | Watson |
| 2012/0036522 A1 | 2/2012 | Wang |
| 2012/0054018 A1 | 3/2012 | Pradeep |
| 2012/0059735 A1* | 3/2012 | Su .................. G06Q 30/0631 |
| | | 705/26.7 |
| 2012/0150626 A1 | 6/2012 | Zhang |
| 2012/0166268 A1 | 6/2012 | Griffiths |
| 2012/0259732 A1 | 10/2012 | Sasankan |
| 2012/0271740 A1 | 10/2012 | Connors |
| 2012/0310715 A1 | 12/2012 | Singhal |
| 2013/0030915 A1 | 1/2013 | Statler |
| 2013/0031018 A1 | 1/2013 | Jellum |
| 2013/0066740 A1 | 3/2013 | Ouimet |
| 2013/0073389 A1 | 3/2013 | Heath |
| 2013/0080364 A1 | 3/2013 | Wilson |
| 2013/0091146 A1 | 4/2013 | Stanger |
| 2013/0106604 A1 | 5/2013 | Lee |
| 2013/0117137 A1 | 5/2013 | Klein |
| 2013/0138530 A1 | 5/2013 | Westphal |
| 2013/0138656 A1 | 5/2013 | Wheaton |
| 2013/0232221 A1 | 5/2013 | Brechner |
| 2013/0140357 A1 | 6/2013 | Ure |
| 2013/0175335 A1 | 7/2013 | Roberts |
| 2013/0176115 A1 | 7/2013 | Puleston |
| 2013/0201800 A1* | 8/2013 | Kim .................. G08C 23/02 |
| | | 367/197 |
| 2013/0204737 A1 | 8/2013 | Agarwal |
| 2013/0214938 A1 | 8/2013 | Kim |
| 2013/0226539 A1 | 8/2013 | Shaw |
| 2013/0268317 A1 | 10/2013 | Mattila |
| 2013/0268335 A1 | 10/2013 | Cooper |
| 2013/0268395 A1* | 10/2013 | Sandow .................. G06Q 30/02 |
| | | 705/26.7 |
| 2013/0268886 A1 | 10/2013 | Sureshkumar |
| 2013/0275275 A1 | 10/2013 | Lemmons |
| 2013/0311324 A1 | 11/2013 | Stoll |
| 2013/0326008 A1 | 12/2013 | Morgan |
| 2013/0339122 A1 | 12/2013 | Truitt |
| 2014/0002643 A1 | 1/2014 | Aziz |
| 2014/0040038 A1 | 2/2014 | Hermanowski |
| 2014/0052562 A1 | 2/2014 | Oliveira |
| 2014/0058775 A1 | 2/2014 | Siig |
| 2014/0058794 A1 | 2/2014 | Malov |
| 2014/0074649 A1 | 3/2014 | Patel |
| 2014/0074743 A1 | 3/2014 | Rademaker |
| 2014/0089133 A1 | 3/2014 | Argue |

(56) References Cited

U.S. PATENT DOCUMENTS

| | | |
|---|---|---|
| 2014/0089134 A1 | 3/2014 | Linh |
| 2014/0108125 A1 | 4/2014 | Maraz |
| 2014/0122228 A1 | 5/2014 | Wical |
| 2014/0129393 A1 | 5/2014 | Soon-Shiong |
| 2014/0156392 A1 | 6/2014 | Ouimet |
| 2014/0164046 A1 | 6/2014 | Haralambos |
| 2014/0164476 A1 | 6/2014 | Thomson |
| 2014/0180815 A1 | 6/2014 | Chatwin |
| 2014/0180953 A1 | 6/2014 | Westcott |
| 2014/0195902 A1 | 7/2014 | Yang |
| 2014/0207659 A1 | 7/2014 | Erez |
| 2014/0214543 A1 | 7/2014 | Gandhi |
| 2014/0214590 A1 | 7/2014 | Argue |
| 2014/0214600 A1 | 7/2014 | Argue |
| 2014/0214629 A1 | 7/2014 | Azam |
| 2014/0249966 A1 | 9/2014 | Zaragoza |
| 2014/0266791 A1 | 9/2014 | Lloyd |
| 2014/0278815 A1 | 9/2014 | Grant |
| 2014/0279200 A1 | 9/2014 | Hosein |
| 2014/0279202 A1 | 9/2014 | Egozi |
| 2014/0279208 A1 | 9/2014 | Nickitas |
| 2014/0279294 A1 | 9/2014 | Field-Darragh |
| 2014/0297001 A1 | 10/2014 | Silverman |
| 2014/0297470 A1 | 10/2014 | Ramadge |
| 2014/0304123 A1 | 10/2014 | Schwartz |
| 2014/0310040 A1 | 10/2014 | Carmichael |
| 2014/0310056 A1 | 10/2014 | Alapati |
| 2014/0316916 A1 | 10/2014 | Hay |
| 2014/0330738 A1 | 11/2014 | Falcone |
| 2014/0337151 A1 | 11/2014 | Crutchfield |
| 2014/0344102 A1 | 11/2014 | Cooper |
| 2015/0006314 A1 | 1/2015 | Goulart |
| 2015/0032847 A1 | 1/2015 | Van Coppenolle |
| 2015/0058154 A1 | 2/2015 | Appleyard |
| 2015/0058175 A1 | 2/2015 | Axt |
| 2015/0081469 A1 | 3/2015 | Acharyya |
| 2015/0099589 A1* | 4/2015 | Smith ............ G06Q 30/0255 463/42 |
| 2015/0106236 A1 | 4/2015 | Morris |
| 2015/0106238 A1 | 4/2015 | Shuster |
| 2015/0112807 A1 | 4/2015 | Muppirala |
| 2015/0120550 A1 | 4/2015 | Jung |
| 2015/0120600 A1 | 4/2015 | Luwang |
| 2015/0139416 A1 | 5/2015 | Skiba |
| 2015/0149443 A1 | 5/2015 | Aravamudan |
| 2015/0161706 A1 | 6/2015 | Karmakar |
| 2015/0186773 A1 | 7/2015 | Weill |
| 2015/0186981 A1 | 7/2015 | Holman |
| 2015/0190086 A1 | 7/2015 | Chan |
| 2015/0193115 A1 | 7/2015 | Chirakan |
| 2015/0206246 A1 | 7/2015 | Lange |
| 2015/0221016 A1 | 8/2015 | Schulz |
| 2015/0227871 A1 | 8/2015 | Zeile |
| 2015/0227883 A1 | 8/2015 | Murphy |
| 2015/0242750 A1 | 8/2015 | Anderson |
| 2015/0254712 A1 | 9/2015 | Chen |
| 2015/0254785 A1 | 9/2015 | Yang |
| 2015/0256633 A1* | 9/2015 | Chand ............ G06K 9/00536 382/103 |
| 2015/0256899 A1 | 9/2015 | Chand |
| 2015/0262117 A1 | 9/2015 | Li |
| 2015/0262282 A1* | 9/2015 | Walti ............ G06Q 30/0631 705/26.7 |
| 2015/0269642 A1 | 9/2015 | Cai |
| 2015/0278908 A1 | 10/2015 | Nice |
| 2015/0307279 A1 | 10/2015 | Almada |
| 2015/0310536 A1 | 10/2015 | Brady |
| 2015/0324490 A1 | 11/2015 | Page |
| 2015/0324881 A1 | 11/2015 | Ouimet |
| 2015/0324882 A1 | 11/2015 | Ouimet |
| 2015/0356601 A1 | 12/2015 | Lu |
| 2015/0370985 A1 | 12/2015 | Carvalko |
| 2015/0379597 A1 | 12/2015 | Gupta |
| 2016/0005070 A1 | 1/2016 | Burr |
| 2016/0027068 A1 | 1/2016 | Brantley |
| 2016/0027094 A1 | 1/2016 | Chamyvelumani |
| 2016/0034907 A1 | 2/2016 | Worrall |
| 2016/0063440 A1 | 3/2016 | Webb |
| 2016/0063551 A1 | 3/2016 | Yankovich |
| 2016/0071116 A1 | 3/2016 | Atkins |
| 2016/0086255 A1 | 3/2016 | Sainfort |
| 2016/0092988 A1 | 3/2016 | Letourneau |
| 2016/0094703 A1 | 3/2016 | Wernevi |
| 2016/0098547 A1 | 4/2016 | Char |
| 2016/0110759 A1 | 4/2016 | Polehn |
| 2016/0140589 A1 | 5/2016 | Deshpande |
| 2016/0171424 A1 | 6/2016 | Kannan |
| 2016/0171539 A1 | 6/2016 | Ganduri |
| 2016/0171597 A1 | 6/2016 | Todeschini |
| 2016/0171866 A1 | 6/2016 | Dupasquier |
| 2016/0239857 A1 | 8/2016 | Milton |
| 2016/0253710 A1 | 9/2016 | Publicover |
| 2016/0283979 A1 | 9/2016 | Chatterton |
| 2016/0292634 A1 | 10/2016 | Mehring |
| 2016/0292769 A1 | 10/2016 | Colson |
| 2016/0300547 A1 | 10/2016 | El-Rukby |
| 2016/0345869 A1 | 12/2016 | Rishi |
| 2016/0350715 A1 | 12/2016 | Minvielle |
| 2016/0371650 A1 | 12/2016 | Schmidt |
| 2017/0009417 A1 | 1/2017 | High |
| 2017/0109806 A1 | 4/2017 | Adoni |
| 2017/0180147 A1 | 6/2017 | Brandman |
| 2017/0300856 A1 | 10/2017 | Wilkinson |
| 2017/0300936 A1 | 10/2017 | Wilkinson |
| 2017/0300944 A1 | 10/2017 | Wilkinson |
| 2017/0300946 A1 | 10/2017 | Wilkinson |
| 2017/0300956 A1 | 10/2017 | Cantrell |
| 2017/0300992 A1 | 10/2017 | Wilkinson |
| 2017/0300999 A1 | 10/2017 | Wilkinson |
| 2017/0301000 A1 | 10/2017 | Morgan |
| 2017/0301002 A1 | 10/2017 | Wilkinson |
| 2017/0301008 A1 | 10/2017 | Houdek-Heis |
| 2017/0308909 A1 | 10/2017 | Faith |
| 2017/0330269 A1 | 11/2017 | Kanellos |
| 2017/0345033 A1 | 11/2017 | Wilkinson |
| 2017/0364860 A1 | 12/2017 | Wilkinson |
| 2017/0364925 A1 | 12/2017 | Wilkinson |
| 2017/0364962 A1 | 12/2017 | Wilkinson |
| 2018/0005177 A1 | 1/2018 | Wilkinson |
| 2018/0025365 A1 | 1/2018 | Wilkinson |
| 2018/0040044 A1 | 2/2018 | Mattingly |
| 2018/0047065 A1 | 2/2018 | Wildberger |
| 2018/0053240 A1 | 2/2018 | Jones |
| 2018/0060943 A1 | 3/2018 | Mattingly |
| 2018/0082252 A1 | 3/2018 | Wilkinson |
| 2018/0083908 A1 | 3/2018 | Dotan-Cohen |
| 2018/0107971 A1 | 4/2018 | Vukin |
| 2018/0108062 A1 | 4/2018 | McHale |
| 2018/0113431 A1 | 4/2018 | Wilkinson |
| 2018/0137461 A1 | 5/2018 | Wilkinson |
| 2018/0144397 A1 | 5/2018 | Wilkinson |
| 2018/0174101 A1 | 6/2018 | Mattingly |
| 2018/0174188 A1 | 6/2018 | Wilkinson |
| 2018/0174198 A1 | 6/2018 | Wilkinson |
| 2018/0174223 A1 | 6/2018 | Cantrell |
| 2018/0174224 A1 | 6/2018 | Wilkinson |
| 2018/0233014 A1 | 8/2018 | Wilkinson |
| 2018/0254096 A1 | 9/2018 | Karunanithi |
| 2018/0268357 A1 | 9/2018 | Cantrell |
| 2018/0285816 A1 | 10/2018 | Mattingly |
| 2018/0300677 A1 | 10/2018 | Wilkinson |
| 2018/0300788 A1 | 10/2018 | Mattingly |
| 2019/0005021 A1 | 1/2019 | Miller |
| 2019/0295099 A1* | 9/2019 | Wilkinson ........... G06Q 30/016 |
| 2019/0295100 A1* | 9/2019 | Wilkinson ........... G06Q 30/016 |

FOREIGN PATENT DOCUMENTS

| | | |
|---|---|---|
| CN | 203299604 | 11/2013 |
| CN | 203405712 | 1/2014 |
| CN | 203745868 | 7/2014 |
| EP | 3018591 | 5/2016 |
| JP | 2002123716 | 4/2002 |
| KR | 20120008159 | 1/2012 |

(56) References Cited

FOREIGN PATENT DOCUMENTS

| | | |
|---|---|---|
| KR | 101220581 | 1/2013 |
| KR | 20130082894 | 7/2013 |
| KR | 101595538 | 2/2016 |
| WO | 2000033228 | 6/2000 |
| WO | 2000070481 | 11/2000 |
| WO | 2000073958 | 12/2000 |
| WO | 2001011511 | 2/2001 |
| WO | 2001073651 | 10/2001 |
| WO | 2001075680 | 10/2001 |
| WO | 2002003267 | 1/2002 |
| WO | 2006006940 | 1/2006 |
| WO | 2007041275 | 4/2007 |
| WO | 2007072579 | 6/2007 |
| WO | WO-2011146688 A1 * | 11/2011 ....... H04N 21/23614 |
| WO | 2014195902 | 12/2014 |
| WO | 2015123751 | 8/2015 |
| WO | 2015171072 | 11/2015 |
| WO | 2016018994 | 2/2016 |
| WO | 2016085827 | 6/2016 |

OTHER PUBLICATIONS

Vasile, F., et al., "Meta-Prod2Vec—Product Embeddings Using Side-Information for Recommendation," published in "RecSys 2016—Proceedings of the 10th ACM Conference on Recommender Systems", pp. 225-232, Association for Computing Machinery, Inc. (Year: 2016).*

Merriam-Webster Dictionary; "bin"; https://www.merriam-webster.com/dictionary/bin; retrieved on Apr. 2, 2019.

Khan, Sal; "The dot product"; https://www.khanacademy.org/science/physics/magnetic-forces-and-magnetic-fields/electric-motors/v/the-dot-product; uploaded on Aug. 8, 2008, pp. 1-10.

"Amazon Alexa;" Wikipedia; https://web.archive.org/web/20160926125220/https://en.wikipedia.org/wiki/Amazon_Alexa; Sep. 26, 2016; pp. 1-4.

"Amazon Dash Buttons;" Amazon; https://web.archive.org/web/20160623172354/https://www.amazon.com/Dash-Buttons/b?ie=UTF8&node=10667898011; Jun. 23, 2016; pp. 1-8.

"Amazon Dash;" Wikipedia; https://web.archive.org/web/20160310021300/https://en.wikipedia.org/wiki/Amazon_Dash; Mar. 10, 2016; pp. 1-2.

"Amazon Echo;" Amazon; https://web.archive.org/web/20160602024155/https://www.amazon.com/Amazon-Echo-Bluetooth-Speaker-with-WiFi-Alexa/dp/B00X4WHP5E; Jun. 2, 2016; pp. 1-10.

"Predicting Customer Needs with Forward Demand;" Blue Yonder; https://www.blueyonder.com/en/products/forward-demand.html; retrieved on Mar. 16, 2016; pp. 1-11.

Gustafson, Krystina; "The anti-Amazons: Two brands shaking up retail"; http://www.cnbc.com/2016/03/22/the-anti-amazons-two-brands-shaking-up-retail.html; Mar. 28, 2016; pp. 1-8.

Hewlett-Packard; "HP C350B 8 GB USB PEN Drive With 1 Year Norton"; Amazon.com, http://www.amazon.in/HP-C350B-DRIVE-NORTON-ANTIVIRUS/dp/B00GZHE9KO, retrieved Apr. 18, 2016, pp. 1.

Karim, Shah; "Seven Retail Megatrends for 2020;" Chain Store Age; http://www.chainstoreage.com/article/seven-retail-megatrends-2020; Feb. 22, 2015; pp. 1-3.

Kohan, Shelley E.; "5 Retail Trends for 2015;" RetailNext; https://retailnext.net/en/blog/retail-trends-2015/; Feb. 24, 2015; pp. 1-4.

Lu, Haiyun; "Recommendations Based on Purchase Patterns;" International Journal of Machine Learning and Computing; vol. 4, No. 6; Dec. 2014; pp. 501-504.

Neo4j; "Walmart uses Neo4j to optimize customer experience with personal recommendations"; http://info.neo4j.com/rs/neotechnology/images/neo4j-casestudy-walmart.pdf; available at least as early as Mar. 29, 2016; pp. 1-2.

Prassas, George, et al.; "Dynamic Recommendations in Internet Retailing"; Global Co-Operation in the New Millennium: The 9th European Conference on Information Systems; Athens University of Economics and Business; Jun. 27-29, 2001; pp. 368-379.

Mamabouchey; "chloe"; https://www.youtube.com/watch?v=ja17TZ5kYZ4; published Sep. 16, 2015; pp. 1-4.

Mills, Kelly-Ann; "Chatty robots who help with your shopping and recognise faces of regular customers rolled out in Russian supermarkets"; https://www.mirror.co.uk/news/world-news/chatty-robots-who-help-your-11566357; Nov. 22, 2017; pp. 1-15.

Retail Touchpoints; "Zara to Deploy Click-And-Collect Robots in Stores"; https://www.retailtouchpoints.com/topics/store-operations/zara-to-deploy-click-and-collect-robots-in-stores; Mar. 7, 2018; pp. 1-2.

U.S. Appl. No. 15/488,004; Office Action dated Sep. 17, 2019; (pp. 1-22).

Anagnostopoulos, Aris, et al.; "The Importance of Being Expert: Efficient Max-Finding in Crowdsourcing"; SIGMOD'15; ACM; May 31-Jun. 4, 2015; pp. 983-998.

Aung, Myo Min, et al.; "Quality Monitoring and Dynamic Pricing in Cold Chain Management"; World Academy of Science, Engineering and Technology International Journal of Mechanical, Aerospace, Industrial, Mechatronic and Manufacturing Engineering; vol. 6, No. 2; published 2012; pp. 454-458.

Barilliance; "A New Social Proof Application for Online Retailers that Drives Conversions"; http://www.barilliance.com/social-proof-application-for-ecommerce-sites/; Retrieved on Feb. 17, 2016; pp. 1-6.

Bergen, Jennifer; "Korea's Tesco reinvents grocery shopping with QR-code 'stores'"; https://www.geek.com/mobile/koreas-tesco-reinvents-grocery-shopping-with-qr-code-stores-1396025/; Jun. 28, 2011; pp. 1-8.

Bid and Barter; "Bid and Barter"; http://www.bidandbarter.com/about.html; Retrieved on Nov. 24, 2016; pp. 1-2.

Borowski, Craig; "6 Tips to Shift from Reactive to Proactive Customer Service"; https://www.softwareadvice.com/resources/6-tips-shift-reactive-proactive-customer-service/; Retrieved on Nov. 22, 2016; pp. 1-9.

E-Thele SQD Networks; "360 degree retail surveillance & loss prevention video", https://www.youtube.com/watch?v=NgELfYPnMvQ, published on Jul. 29, 2013, pp. 1-5.

Erlibird; "Recommendation System that Uses Big Data to Help People Find Gifts for their Facebook Friends"; https://erlibird.com/go/giftri-com; retrieved on May 30, 2016; pp. 1-4.

Ernst & Young LLP and the Retailers Association of India; "Movement of Goods in India"; rasci.in/downloads/2013/Movement_Goods_India.pdf; published on Dec. 5, 2013; pp. 1-28.

Giering, Michael; "Retail Sales Prediction and Item Recommendations Using Customer Demographics at Store Level"; ACM SIGKDD Explorations Newsletter; vol. 10, Issue 2, Dec. 2008; pp. 84-89.

He, Jianming et al.; "A Social Network-Based Recommender System (SNRS)"; Annals of Information Systems book series; vol. 12; May 20, 2010; pp. 47-74.

Home Chef; "Home Chef Meal Delivery Service, Fresh Ingredients to Cook at Home"; https://web.archive.org/web/20160705144946/https://www.homechef.com/; available at least as early as Jul. 5, 2016; pp. 1-4.

IGoDigital; "iGoDigital: Creating a Personalized Multi-Channel Shopping Experience with Product Recommendations"; http://www.youtube.com/watch?v=Zvnd4RLnV5I; published on Aug. 15, 2012; pp. 1-4.

ip.com; "Intelligent Online Shopping Cart Which Can Automatically Pre-Load a Shopping List;" Prior Art Database; http://priorart.ip.com/IPCOM/00236206; Apr. 11, 2016; pp. 1-11.

Jakkula, V. et al.; "Detecting Anomalous Sensor Events in Smart Home Data for Enhancing the Living Experience"; Proceedings AAAIWS'11-07 Proceedings of the 7th AAAI Conference on Artificial Intelligence and Smarter Living: The Conquest of Complexity; 2011; pp. 33-37.

Jank, Wolfgang, et al.; "Understanding Geographical Markets of Online Firms Using Spatial Models of Customer Choice"; Marketing Science; vol. 24, No. 4; Fall 2005; pp. 623-634.

(56) References Cited

OTHER PUBLICATIONS

Kelso, Alicia; "Pizza Hut Serves Up Custom Pies on Interactive Tabletops"; http://www.kioskmarketplace.com/articles/pizza-hut-serves-up-custom-pies-on-interactive-tabletops/; Jun. 28, 2016; pp. 1-2.

Keng, Brian; "Beyond Collaborative Filtering (Part 1)"; http://rubikloud.com/labs/data-science/beyond-collaborative-filtering/; May 18, 2016; pp. 1-5.

Kiosk; "Vending Kiosk Software"; http://kiosk.com/market-solutions/vending-rental; Retrieved on Jun. 28, 2016; pp. 1-8.

Listonic SP. Z O.O.; "Smart Shopping List—Listonic"; https://play.google.com/store/apps/details?id=com.l; Retrieved on Nov. 24, 2016; pp. 1-3.

Maras, Elliot; "RFID: A Tool for Tracking Products, Assets and More"; http://www.foodlogistics.com/article/12141721/rfid-a-tool-for-tracking-products-assets-and-more; Dec. 17, 2015; pp. 1-9.

Mathisfun; "Dot Product"; https://web.archive.org/web/20140320190422/https://www.mathsisfun.com/algebra/vectors-dot-product.html; available at least as early as Mar. 20, 2014; pp. 1-5.

McDonald, Heath; "Who are "innovators" and do they matter?"; Marketing Intelligence & Planning; vol. 25, No. 5; 2007; pp. 1-18.

Menczer, Filippo, et al.; "Adaptive Assistants for Customized E-Shopping;" IEEE Intelligent Systems; vol. 17, Issue 6; Nov./Dec. 2002; https://www.computer.org/csdl/mags/ex/2002/06/x6012-abs.html; pp. 12-19.

Miles, Stephanie; "8 Tools for the In-Store Delivery of Mobile Coupons"; http://streetfightmag.com/2013/07/30/8-tools-for-the-in-store-delivery-of-mobile-coupons-2/; Jul. 30, 2013; pp. 1-6.

Organizy Ltd.; "Organizy Grocery Shopping List"; https://play.google.com/store/apps/details?id=com.organizy.shopping.list; Retrieved on Nov. 24, 2016; pp. 1-3.

PCT; App. No. PCT/US2017/027688; International Search Report and Written Opinion dated Sep. 5, 2017.

Shoukas, Denise; "The Future of Food Shopping Is Here"; https://www.specialtyfood.com/news/article/future-food-shopping-here/; Jun. 24, 2013; pp. 1-8.

study.com; "Classes of Adopters: Innovators, Early, Late and Laggards"; http://study.com/academy/lesson/classes-of-adopters-innovators-early-late-and-laggards.html; retrieved on Oct. 13, 2016; pp. 1-4.

Tan, Soo-Jiuan; "Predicting Innovation Adoption: a Choice-Based Approach"; In AP—Asia Pacific Advances in Consumer Research; vol. 1; National University of Singapore; 1994; pp. 72-78.

Uhler, David, et al.; "Mobile Computing, Applications, and Services"; Lecture Notes of the Institute for Computer Science, Social Informatics and Telecommunications Engineering; Feb. 5, 2013; pp. 380.

Vasal, Ityam; "Gift Recommender System for Amazon;" 583 Term Paper; retrieved on May 30, 2016; pp. 1-9.

Vendhq; "Retail Trends and Predictions 2016"; https://www.vendhq.com/us/university/retail-trends-and-predictions-2016; available at least as early as 2016; pp. 1-19.

Wikipedia; "Dot Product"; https://web.archive.org/web/20140815031517/https://en.wikipedia.org/wiki/Dot_product; available at least as early as Aug. 15, 2014; pp. 1-8.

Wylie, Jonathan; "How to Read QR Codes With a Smartphone"; https://www.pcworld.com/article/242873/how_to_read_qr_codes_with_a_smartphone.html; Nov. 1, 2011; pp. 1-3.

Yin, J. et al; "Sensor-Based Abnormal Human-Activity Detection"; IEEE Transactions on Knowledge and Data Engineering; vol. 20, Issue: 8; Jun. 27, 2008; pp. 1-25.

Zhu, Wei, et al.; "Personalized In-Store E-Commerce with the PromoPad: An Augmented Reality Shopping Assistant"; https://www.researchgate.net/publication/228786852_Personalized_In-store_E-Commerce_with_the_PromoPad_an_Augmented_Reality_Shopping_Assistant; Jan. 2004; pp. 1-19.

* cited by examiner

SYSTEMS AND METHODS FOR PROVIDING CONTENT-BASED PRODUCT RECOMMENDATIONS

RELATED APPLICATIONS

This application claims the benefit of each of the following U.S. Provisional applications, each of which is incorporated herein by reference in its entirety: 62/323,026 filed Apr. 15, 2016; 62/348,444 filed Jun. 10, 2016; 62/436,842 filed Dec. 20, 2016; 62/485,045, filed Apr. 13, 2017; 62/463,103, filed Feb. 24, 2017; 62/427,478, filed Nov. 29, 2016; and 62/400,302, filed Sep. 27, 2016.

TECHNICAL FIELD

These teachings relate generally to providing products and services to individuals and in some cases, relates to identifying marketing opportunities.

BACKGROUND

Various shopping paradigms are known in the art. One approach of long-standing use essentially comprises displaying a variety of different goods at a shared physical location and allowing consumers to view/experience those offerings as they wish to thereby make their purchasing selections. This model is being increasingly challenged due at least in part to the logistical and temporal inefficiencies that accompany this approach and also because this approach does not assure that a product best suited to a particular consumer will in fact be available for that consumer to purchase at the time of their visit.

Increasing efforts are being made to present a given consumer with one or more purchasing options that are selected based upon some preference of the consumer. When done properly, this approach can help to avoid presenting the consumer with things that they might not wish to consider. That said, existing preference-based approaches nevertheless leave much to be desired. Information regarding preferences, for example, may tend to be very product specific and accordingly may have little value apart from use with a very specific product or product category. As a result, while helpful, a preferences-based approach is inherently very limited in scope and offers only a very weak platform by which to assess a wide variety of product and service categories.

In modern retail services there is a need to improve the customer service and/or convenience for the customer. One aspect of customer convenience is a customer's ability to find desired products. There are numerous ways to allow a customer to shop. However, there is a need to improve a customer's ability to shop.

BRIEF DESCRIPTION OF THE DRAWINGS

The above needs are at least partially met through provision of the vector-based characterizations of products described in the following detailed description, particularly when studied in conjunction with the drawings, wherein.

Figure 1:
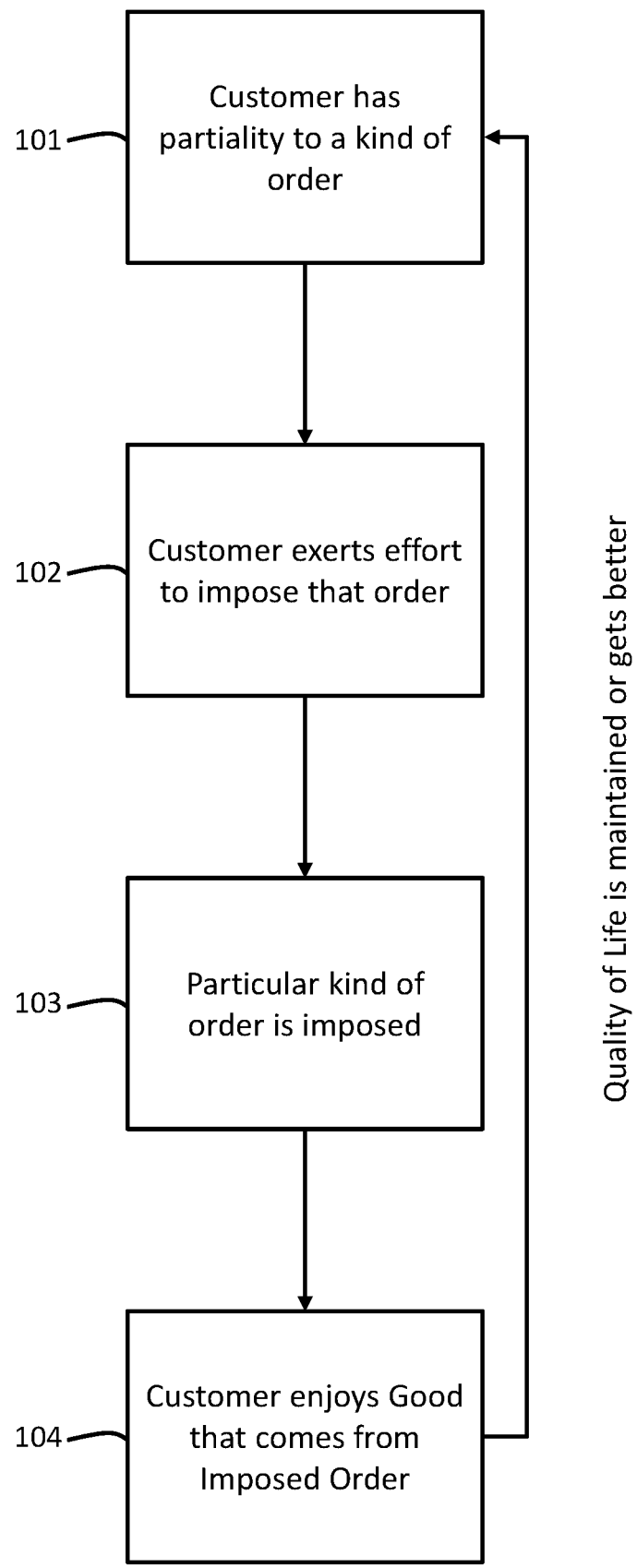
FIG. 1 comprises a flow diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, many of these embodiments provide for a memory having information stored therein that includes partiality information for each of a plurality of persons in the form of a plurality of partiality vectors for each of the persons wherein each partiality vector has at least one of a magnitude and an angle that corresponds to a magnitude of the person's belief in an amount of good that comes from an order associated with that partiality. This memory can also contain vectorized characterizations for each of a plurality of products, wherein each of the vectorized characterizations includes a measure regarding an extent to which a corresponding one of the products accords with a corresponding one of the plurality of partiality vectors.

Rules can then be provided that use the aforementioned information in support of a wide variety of activities and results. Although the described vector-based approaches bear little resemblance (if any) (conceptually or in practice) to prior approaches to understanding and/or metricizing a given person's product/service requirements, these approaches yield numerous benefits including, at least in some cases, reduced memory requirements, an ability to accommodate (both initially and dynamically over time) an essentially endless number and variety of partialities and/or product attributes, and processing/comparison capabilities that greatly ease computational resource requirements and/or greatly reduced time-to-solution results.

People tend to be partial to ordering various aspects of their lives, which is to say, people are partial to having things well arranged per their own personal view of how things should be. As a result, anything that contributes to the proper ordering of things regarding which a person has partialities represents value to that person. Quite literally, improving order reduces entropy for the corresponding person (i.e., a reduction in the measure of disorder present in that particular aspect of that person's life) and that improvement in order/reduction in disorder is typically viewed with favor by the affected person.

Generally speaking a value proposition must be coherent (logically sound) and have "force." Here, force takes the form of an imperative. When the parties to the imperative have a reputation of being trustworthy and the value proposition is perceived to yield a good outcome, then the imperative becomes anchored in the center of a belief that "this is something that I must do because the results will be good for me." With the imperative so anchored, the corresponding material space can be viewed as conforming to the order specified in the proposition that will result in the good outcome.

Pursuant to these teachings a belief in the good that comes from imposing a certain order takes the form of a value proposition. It is a set of coherent logical propositions by a trusted source that, when taken together, coalesce to form an imperative that a person has a personal obligation to order their lives because it will return a good outcome which improves their quality of life. This imperative is a value force that exerts the physical force (effort) to impose the desired order. The inertial effects come from the strength of the belief. The strength of the belief comes from the force of the value argument (proposition). And the force of the value proposition is a function of the perceived good and trust in the source that convinced the person's belief system to order material space accordingly. A belief remains constant until acted upon by a new force of a trusted value argument. This is at least a significant reason why the routine in people's lives remains relatively constant.

Newton's three laws of motion have a very strong bearing on the present teachings. Stated summarily, Newton's first law holds that an object either remains at rest or continues to move at a constant velocity unless acted upon by a force, the second law holds that the vector sum of the forces F on an object equal the mass m of that object multiplied by the acceleration a of the object (i.e., $F=ma$), and the third law holds that when one body exerts a force on a second body, the second body simultaneously exerts a force equal in magnitude and opposite in direction on the first body.

Relevant to both the present teachings and Newton's first law, beliefs can be viewed as having inertia. In particular, once a person believes that a particular order is good, they tend to persist in maintaining that belief and resist moving away from that belief. The stronger that belief the more force an argument and/or fact will need to move that person away from that belief to a new belief.

Relevant to both the present teachings and Newton's second law, the "force" of a coherent argument can be viewed as equaling the "mass" which is the perceived Newtonian effort to impose the order that achieves the aforementioned belief in the good which an imposed order brings multiplied by the change in the belief of the good which comes from the imposition of that order. Consider that when a change in the value of a particular order is observed then there must have been a compelling value claim influencing that change. There is a proportionality in that the greater the change the stronger the value argument. If a person values a particular activity and is very diligent to do that activity even when facing great opposition, we say they are dedicated, passionate, and so forth. If they stop doing the activity, it begs the question, what made them stop? The answer to that question needs to carry enough force to account for the change.

And relevant to both the present teachings and Newton's third law, for every effort to impose good order there is an equal and opposite good reaction.

FIG. 1 provides a simple illustrative example in these regards. At block 101 it is understood that a particular person has a partiality (to a greater or lesser extent) to a particular kind of order. At block 102 that person willingly exerts effort to impose that order to thereby, at block 103, achieve an arrangement to which they are partial. And at block 104, this person appreciates the "good" that comes from successfully imposing the order to which they are partial, in effect establishing a positive feedback loop.

Figure 2:
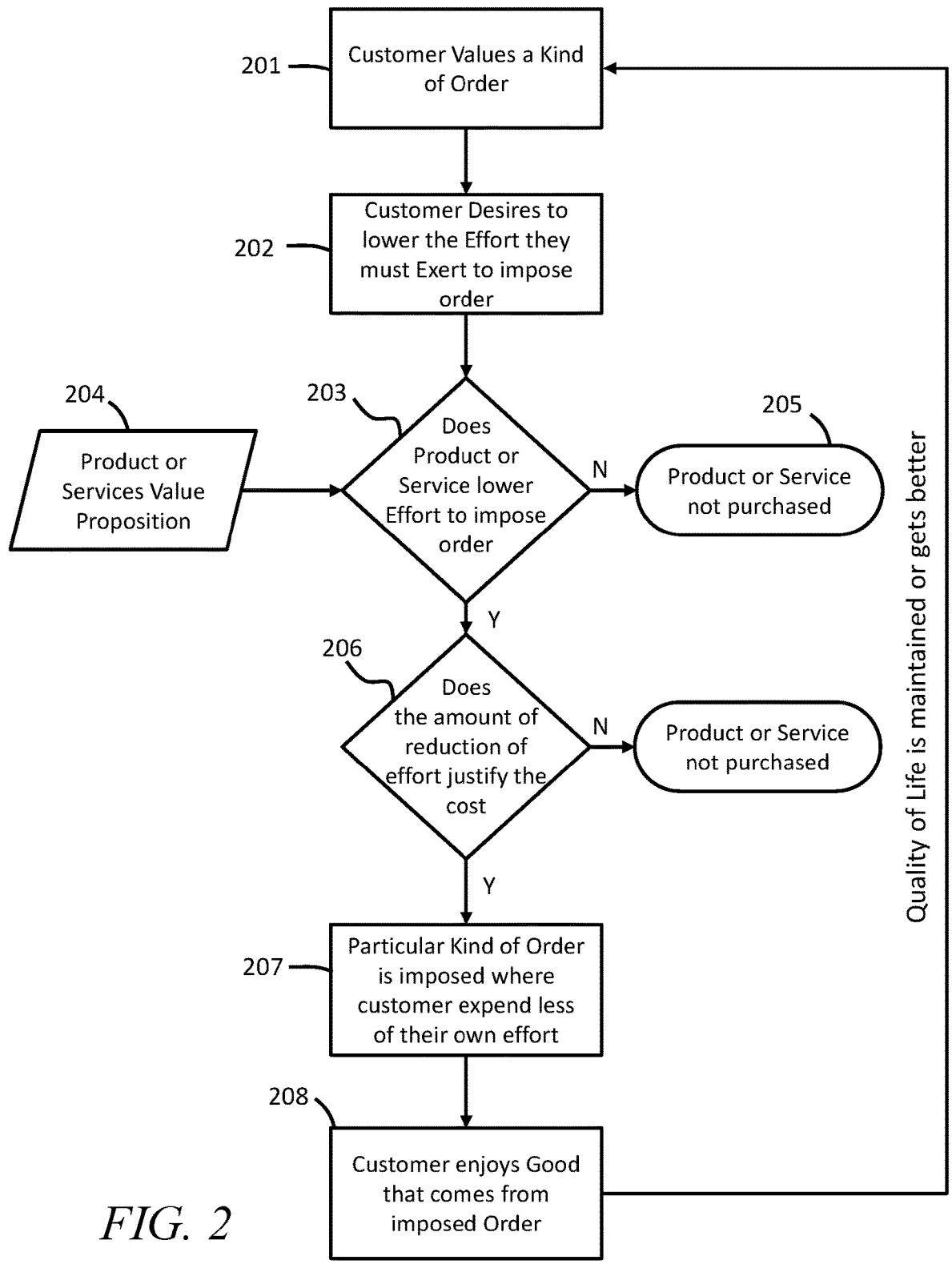
FIG. 2 comprises a flow diagram as configured in accordance with various embodiments of these teachings.

Understanding these partialities to particular kinds of order can be helpful to understanding how receptive a particular person may be to purchasing a given product or service. FIG. 2 provides a simple illustrative example in these regards. At block 201 it is understood that a particular person values a particular kind of order. At block 202 it is understood (or at least presumed) that this person wishes to lower the effort (or is at least receptive to lowering the effort) that they must personally exert to impose that order. At decision block 203 (and with access to information 204 regarding relevant products and or services) a determination can be made whether a particular product or service lowers the effort required by this person to impose the desired order. When such is not the case, it can be concluded that the person will not likely purchase such a product/service 205 (presuming better choices are available).

When the product or service does lower the effort required to impose the desired order, however, at block 206 a determination can be made as to whether the amount of the reduction of effort justifies the cost of purchasing and/or using the proffered product/service. If the cost does not justify the reduction of effort, it can again be concluded that the person will not likely purchase such a product/service 205. When the reduction of effort does justify the cost, however, this person may be presumed to want to purchase the product/service and thereby achieve the desired order (or at least an improvement with respect to that order) with less expenditure of their own personal effort (block 207) and thereby achieve, at block 208, corresponding enjoyment or appreciation of that result.

To facilitate such an analysis, the applicant has determined that factors pertaining to a person's partialities can be quantified and otherwise represented as corresponding vectors (where "vector" will be understood to refer to a geometric object/quantity having both an angle and a length/magnitude). These teachings will accommodate a variety of differing bases for such partialities including, for example, a person's values, affinities, aspirations, and preferences.

A value is a person's principle or standard of behavior, their judgment of what is important in life. A person's values represent their ethics, moral code, or morals and not a mere unprincipled liking or disliking of something. A person's value might be a belief in kind treatment of animals, a belief in cleanliness, a belief in the importance of personal care, and so forth.

An affinity is an attraction (or even a feeling of kinship) to a particular thing or activity. Examples including such a feeling towards a participatory sport such as golf or a spectator sport (including perhaps especially a particular team such as a particular professional or college football team), a hobby (such as quilting, model railroading, and so forth), one or more components of popular culture (such as a particular movie or television series, a genre of music or a particular musical performance group, or a given celebrity, for example), and so forth.

"Aspirations" refer to longer-range goals that require months or even years to reasonably achieve. As used herein "aspirations" does not include mere short term goals (such as making a particular meal tonight or driving to the store and back without a vehicular incident). The aspired-to goals, in turn, are goals pertaining to a marked elevation in one's core competencies (such as an aspiration to master a particular game such as chess, to achieve a particular articulated and recognized level of martial arts proficiency, or to attain a particular articulated and recognized level of cooking proficiency), professional status (such as an aspiration to receive a particular advanced education degree, to pass a professional examination such as a state Bar examination of a Certified Public Accountants examination, or to become Board certified in a particular area of medical practice), or life experience milestone (such as an aspiration to climb Mount Everest, to visit every state capital, or to attend a game at every major league baseball park in the United States). It will further be understood that the goal(s) of an aspiration is not something that can likely merely simply happen of its own accord; achieving an aspiration requires an intelligent effort to order one's life in a way that increases the likelihood of actually achieving the corresponding goal or goals to which that person aspires. One aspires to one day run their own business as versus, for example, merely hoping to one day win the state lottery.

A preference is a greater liking for one alternative over another or others. A person can prefer, for example, that their steak is cooked "medium" rather than other alternatives such as "rare" or "well done" or a person can prefer to play golf in the morning rather than in the afternoon or evening. Preferences can and do come into play when a given person makes purchasing decisions at a retail shopping facility. Preferences in these regards can take the form of a preference for a particular brand over other available brands or a preference for economy-sized packaging as versus, say, individual serving-sized packaging.

Values, affinities, aspirations, and preferences are not necessarily wholly unrelated. It is possible for a person's values, affinities, or aspirations to influence or even dictate their preferences in specific regards. For example, a person's moral code that values non-exploitive treatment of animals may lead them to prefer foods that include no animal-based ingredients and hence to prefer fruits and vegetables over beef and chicken offerings. As another example, a person's affinity for a particular musical group may lead them to prefer clothing that directly or indirectly references or otherwise represents their affinity for that group. As yet another example, a person's aspirations to become a Certified Public Accountant may lead them to prefer business-related media content.

While a value, affinity, or aspiration may give rise to or otherwise influence one or more corresponding preferences, however, is not to say that these things are all one and the same; they are not. For example, a preference may represent either a principled or an unprincipled liking for one thing over another, while a value is the principle itself. Accordingly, as used herein it will be understood that a partiality can include, in context, any one or more of a value-based, affinity-based, aspiration-based, and/or preference-based partiality unless one or more such features is specifically excluded per the needs of a given application setting.

Information regarding a given person's partialities can be acquired using any one or more of a variety of information-gathering and/or analytical approaches. By one simple approach, a person may voluntarily disclose information regarding their partialities (for example, in response to an online questionnaire or survey or as part of their social media presence). By another approach, the purchasing history for a given person can be analyzed to intuit the partialities that led to at least some of those purchases. By yet another approach demographic information regarding a particular person can serve as yet another source that sheds light on their partialities. Other ways that people reveal how they order their lives include but are not limited to: (1) their social networking profiles and behaviors (such as the things they "like" via Facebook, the images they post via Pinterest, informal and formal comments they initiate or otherwise provide in response to third-party postings including statements regarding their own personal long-term goals, the persons/topics they follow via Twitter, the photographs they publish via Picasso, and so forth); (2) their Internet surfing history; (3) their on-line or otherwise-published affinity-based memberships; (4) real-time (or delayed) information (such as steps walked, calories burned, geographic location, activities experienced, and so forth) from any of a variety of personal sensors (such as smart phones, tablet/pad-styled computers, fitness wearables, Global Positioning System devices, and so forth) and the so-called Internet of Things (such as smart refrigerators and pantries, entertainment and information platforms, exercise and sporting equipment, and so forth); (5) instructions, selections, and other inputs (including inputs that occur within augmented-reality user environments) made by a person via any of a variety of interactive interfaces (such as keyboards and cursor control devices, voice recognition, gesture-based controls, and eye tracking-based controls), and so forth.

The present teachings employ a vector-based approach to facilitate characterizing, representing, understanding, and leveraging such partialities to thereby identify products (and/or services) that will, for a particular corresponding consumer, provide for an improved or at least a favorable corresponding ordering for that consumer. Vectors are directed quantities that each have both a magnitude and a direction. Per the applicant's approach these vectors have a real, as versus a metaphorical, meaning in the sense of Newtonian physics. Generally speaking, each vector represents order imposed upon material space-time by a particular partiality.

Figure 3:
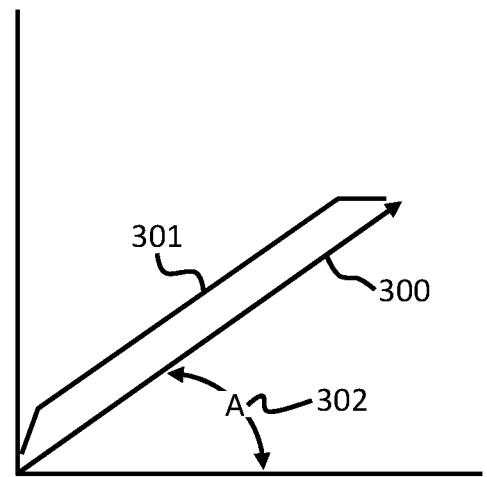
FIG. 3 comprises a graphic representation as configured in accordance with various embodiments of these teachings.

FIG. 3 provides some illustrative examples in these regards. By one approach the vector 300 has a corresponding magnitude 301 (i.e., length) that represents the magnitude of the strength of the belief in the good that comes from that imposed order (which belief, in turn, can be a function, relatively speaking, of the extent to which the order for this particular partiality is enabled and/or achieved). In this case, the greater the magnitude 301, the greater the strength of that belief and vice versa. Per another example, the vector 300 has a corresponding angle A 302 that instead represents the foregoing magnitude of the strength of the belief (and where, for example, an angle of 0° represents no such belief and an angle of 90° represents a highest magnitude in these regards, with other ranges being possible as desired).

Accordingly, a vector serving as a partiality vector can have at least one of a magnitude and an angle that corresponds to a magnitude of a particular person's belief in an amount of good that comes from an order associated with a particular partiality.

Applying force to displace an object with mass in the direction of a certain partiality-based order creates worth for a person who has that partiality. The resultant work (i.e., that force multiplied by the distance the object moves) can be viewed as a worth vector having a magnitude equal to the accomplished work and having a direction that represents the corresponding imposed order. If the resultant displacement results in more order of the kind that the person is partial to then the net result is a notion of "good." This "good" is a real quantity that exists in meta-physical space much like work is a real quantity in material space. The link between the "good" in meta-physical space and the work in material space is that it takes work to impose order that has value.

In the context of a person, this effort can represent, quite literally, the effort that the person is willing to exert to be compliant with (or to otherwise serve) this particular partiality. For example, a person who values animal rights would have a large magnitude worth vector for this value if they exerted considerable physical effort towards this cause by, for example, volunteering at animal shelters or by attending protests of animal cruelty.

While these teachings will readily employ a direct measurement of effort such as work done or time spent, these teachings will also accommodate using an indirect measurement of effort such as expense; in particular, money. In many cases people trade their direct labor for payment. The labor may be manual or intellectual. While salaries and payments can vary significantly from one person to another, a same sense of effort applies at least in a relative sense.

As a very specific example in these regards, there are wristwatches that require a skilled craftsman over a year to make. The actual aggregated amount of force applied to displace the small components that comprise the wristwatch would be relatively very small. That said, the skilled craftsman acquired the necessary skill to so assemble the wristwatch over many years of applying force to displace thousands of little parts when assembly previous wristwatches. That experience, based upon a much larger aggregation of previously-exerted effort, represents a genuine part of the "effort" to make this particular wristwatch and hence is fairly considered as part of the wristwatch's worth.

The conventional forces working in each person's mind are typically more-or-less constantly evaluating the value propositions that correspond to a path of least effort to thereby order their lives towards the things they value. A key reason that happens is because the actual ordering occurs in material space and people must exert real energy in pursuit of their desired ordering. People therefore naturally try to find the path with the least real energy expended that still moves them to the valued order. Accordingly, a trusted value proposition that offers a reduction of real energy will be embraced as being "good" because people will tend to be partial to anything that lowers the real energy they are required to exert while remaining consistent with their partialities.

Figure 4:
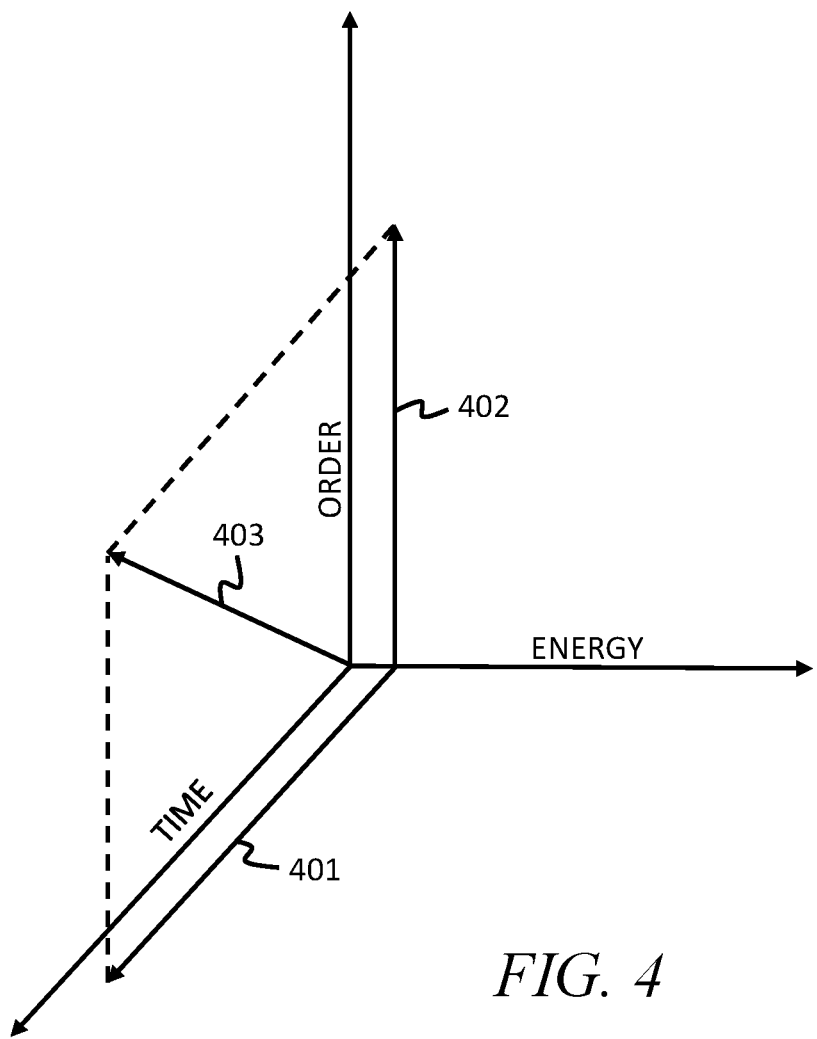
FIG. 4 comprises a graph as configured in accordance with various embodiments of these teachings.

FIG. 4 presents a space graph that illustrates many of the foregoing points. A first vector 401 represents the time required to make such a wristwatch while a second vector 402 represents the order associated with such a device (in this case, that order essentially represents the skill of the craftsman). These two vectors 401 and 402 in turn sum to form a third vector 403 that constitutes a value vector for this wristwatch. This value vector 403, in turn, is offset with respect to energy (i.e., the energy associated with manufacturing the wristwatch).

A person partial to precision and/or to physically presenting an appearance of success and status (and who presumably has the wherewithal) may, in turn, be willing to spend $100,000 for such a wristwatch. A person able to afford such a price, of course, may themselves be skilled at imposing a certain kind of order that other persons are partial to such that the amount of physical work represented by each spent dollar is small relative to an amount of dollars they receive when exercising their skill(s). (Viewed another way, wearing an expensive wristwatch may lower the effort required for such a person to communicate that their own personal success comes from being highly skilled in a certain order of high worth.)

Generally speaking, all worth comes from imposing order on the material space-time. The worth of a particular order generally increases as the skill required to impose the order increases. Accordingly, unskilled labor may exchange $10 for every hour worked where the work has a high content of unskilled physical labor while a highly-skilled data scientist may exchange $75 for every hour worked with very little accompanying physical effort.

Consider a simple example where both of these laborers are partial to a well-ordered lawn and both have a corresponding partiality vector in those regards with a same magnitude. To observe that partiality the unskilled laborer may own an inexpensive push power lawn mower that this person utilizes for an hour to mow their lawn. The data scientist, on the other hand, pays someone else $75 in this example to mow their lawn. In both cases these two individuals traded one hour of worth creation to gain the same worth (to them) in the form of a well-ordered lawn; the unskilled laborer in the form of direct physical labor and the data scientist in the form of money that required one hour of their specialized effort to earn.

This same vector-based approach can also represent various products and services. This is because products and services have worth (or not) because they can remove effort (or fail to remove effort) out of the customer's life in the direction of the order to which the customer is partial. In particular, a product has a perceived effort embedded into each dollar of cost in the same way that the customer has an amount of perceived effort embedded into each dollar earned. A customer has an increased likelihood of responding to an exchange of value if the vectors for the product and the customer's partiality are directionally aligned and where the magnitude of the vector as represented in monetary cost is somewhat greater than the worth embedded in the customer's dollar.

Put simply, the magnitude (and/or angle) of a partiality vector for a person can represent, directly or indirectly, a corresponding effort the person is willing to exert to pursue that partiality. There are various ways by which that value can be determined. As but one non-limiting example in these regards, the magnitude/angle V of a particular partiality vector can be expressed as:

$$V = \begin{bmatrix} X_1 \\ \vdots \\ X_n \end{bmatrix} [W_1 \cdots W_n]$$

where X refers to any of a variety of inputs (such as those described above) that can impact the characterization of a particular partiality (and where these teachings will accommodate either or both subjective and objective inputs as desired) and W refers to weighting factors that are appropriately applied the foregoing input values (and where, for example, these weighting factors can have values that themselves reflect a particular person's consumer personality or otherwise as desired and can be static or dynamically valued in practice as desired).

In the context of a product (or service) the magnitude/angle of the corresponding vector can represent the reduction of effort that must be exerted when making use of this product to pursue that partiality, the effort that was expended in order to create the product/service, the effort that the person perceives can be personally saved while nevertheless promoting the desired order, and/or some other corresponding effort. Taken as a whole the sum of all the vectors must be perceived to increase the overall order to be considered a good product/service.

It may be noted that while reducing effort provides a very useful metric in these regards, it does not necessarily follow that a given person will always gravitate to that which most reduces effort in their life. This is at least because a given person's values (for example) will establish a baseline against which a person may eschew some goods/services that might in fact lead to a greater overall reduction of effort but which would conflict, perhaps fundamentally, with their values. As a simple illustrative example, a given person might value physical activity. Such a person could experience reduced effort (including effort represented via monetary costs) by simply sitting on their couch, but instead will pursue activities that involve that valued physical activity. That said, however, the goods and services that such a person might acquire in support of their physical activities are still likely to represent increased order in the form of reduced effort where that makes sense. For example, a person who favors rock climbing might also favor rock climbing clothing and supplies that render that activity safer to thereby reduce the effort required to prevent disorder as a consequence of a fall (and consequently increasing the good outcome of the rock climber's quality experience).

By forming reliable partiality vectors for various individuals and corresponding product characterization vectors for a variety of products and/or services, these teachings provide a useful and reliable way to identify products/services that accord with a given person's own partialities (whether those partialities are based on their values, their affinities, their preferences, or otherwise).

It is of course possible that partiality vectors may not be available yet for a given person due to a lack of sufficient specific source information from or regarding that person. In this case it may nevertheless be possible to use one or more partiality vector templates that generally represent certain groups of people that fairly include this particular person. For example, if the person's gender, age, academic status/achievements, and/or postal code are known it may be useful to utilize a template that includes one or more partiality vectors that represent some statistical average or norm of other persons matching those same characterizing parameters. (Of course, while it may be useful to at least begin to employ these teachings with certain individuals by using one or more such templates, these teachings will also accommodate modifying (perhaps significantly and perhaps quickly) such a starting point over time as part of developing a more personal set of partiality vectors that are specific to the individual.) A variety of templates could be developed based, for example, on professions, academic pursuits and achievements, nationalities and/or ethnicities, characterizing hobbies, and the like.

Figure 5:
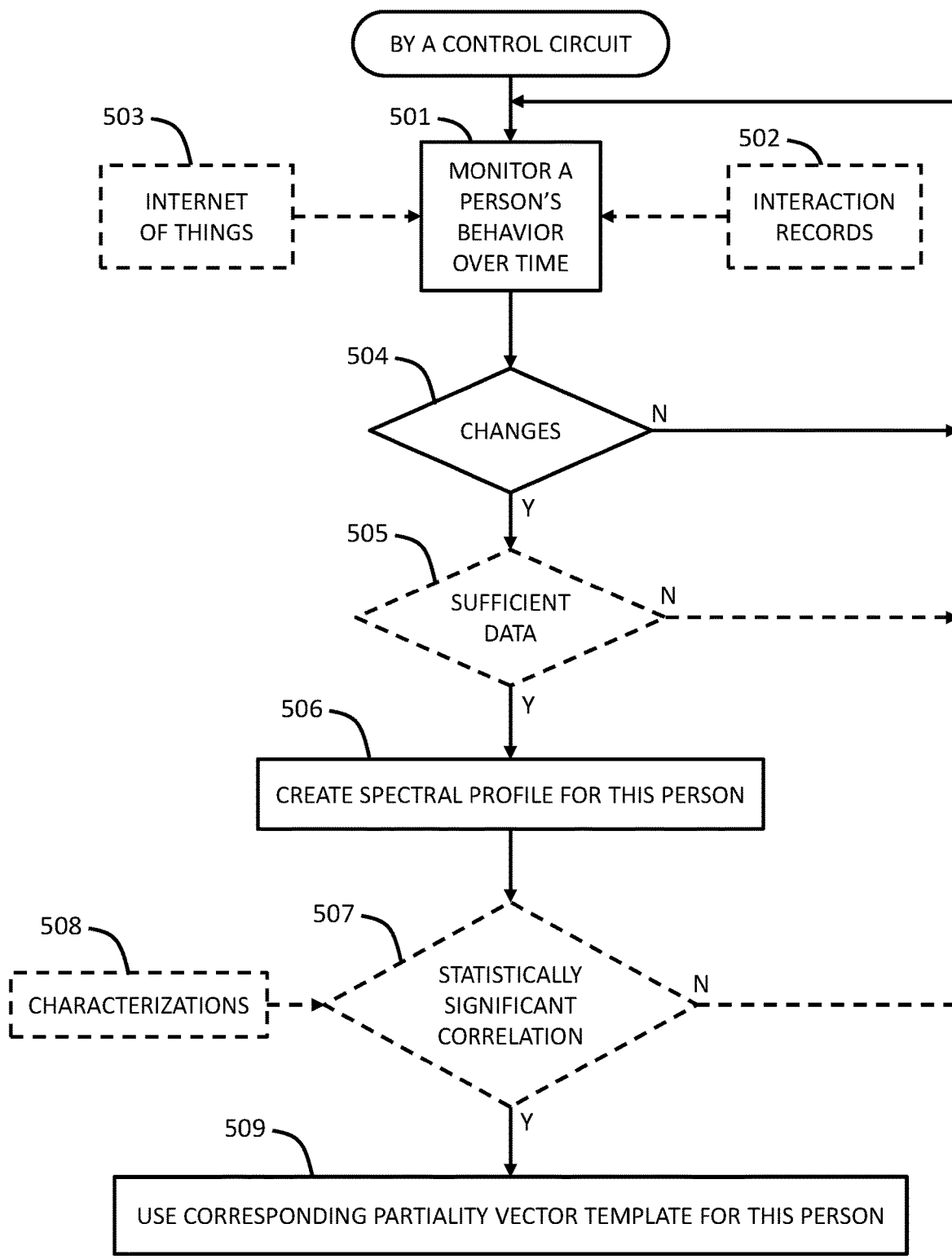
FIG. 5 comprises a flow diagram as configured in accordance with various embodiments of these teachings.

FIG. 5 presents a process 500 that illustrates yet another approach in these regards. For the sake of an illustrative example it will be presumed here that a control circuit of choice (with useful examples in these regards being presented further below) carries out one or more of the described steps/actions.

At block 501 the control circuit monitors a person's behavior over time. The range of monitored behaviors can vary with the individual and the application setting. By one approach, only behaviors that the person has specifically approved for monitoring are so monitored.

As one example in these regards, this monitoring can be based, in whole or in part, upon interaction records 502 that reflect or otherwise track, for example, the monitored person's purchases. This can include specific items purchased by the person, from whom the items were purchased, where the items were purchased, how the items were purchased (for example, at a bricks-and-mortar physical retail shopping facility or via an on-line shopping opportunity), the price paid for the items, and/or which items were returned and when), and so forth.

As another example in these regards the interaction records 502 can pertain to the social networking behaviors of the monitored person including such things as their "likes," their posted comments, images, and tweets, affinity group affiliations, their on-line profiles, their playlists and other indicated "favorites," and so forth. Such information can sometimes comprise a direct indication of a particular partiality or, in other cases, can indirectly point towards a particular partiality and/or indicate a relative strength of the person's partiality.

Other interaction records of potential interest include but are not limited to registered political affiliations and activities, credit reports, military-service history, educational and employment history, and so forth.

As another example, in lieu of the foregoing or in combination therewith, this monitoring can be based, in whole or in part, upon sensor inputs from the Internet of Things (IOT) 503. The Internet of Things refers to the Internet-based inter-working of a wide variety of physical devices including but not limited to wearable or carriable devices, vehicles, buildings, and other items that are embedded with electronics, software, sensors, network connectivity, and sometimes actuators that enable these objects to collect and exchange data via the Internet. In particular, the Internet of Things allows people and objects pertaining to people to be sensed and corresponding information to be transferred to remote locations via intervening network infrastructure. Some experts estimate that the Internet of Things will consist of almost 50 billion such objects by 2020. (Further description in these regards appears further herein.)

Depending upon what sensors a person encounters, information can be available regarding a person's travels, lifestyle, calorie expenditure over time, diet, habits, interests and affinities, choices and assumed risks, and so forth. This process 500 will accommodate either or both real-time or non-real time access to such information as well as either or both push and pull-based paradigms.

By monitoring a person's behavior over time a general sense of that person's daily routine can be established (sometimes referred to herein as a routine experiential base state). As a very simple illustrative example, a routine experiential base state can include a typical daily event timeline for the person that represents typical locations that the person visits and/or typical activities in which the person engages. The timeline can indicate those activities that tend to be scheduled (such as the person's time at their place of employment or their time spent at their child's sports practices) as well as visits/activities that are normal for the person though not necessarily undertaken with strict observance to a corresponding schedule (such as visits to local stores, movie theaters, and the homes of nearby friends and relatives).

At block 504 this process 500 provides for detecting changes to that established routine. These teachings are highly flexible in these regards and will accommodate a wide variety of "changes." Some illustrative examples include but are not limited to changes with respect to a person's travel schedule, destinations visited or time spent at a particular destination, the purchase and/or use of new and/or different products or services, a subscription to a new magazine, a new Rich Site Summary (RSS) feed or a subscription to a new blog, a new "friend" or "connection" on a social networking site, a new person, entity, or cause to follow on a Twitter-like social networking service, enrollment in an academic program, and so forth.

Upon detecting a change, at optional block 505 this process 500 will accommodate assessing whether the detected change constitutes a sufficient amount of data to warrant proceeding further with the process. This assessment can comprise, for example, assessing whether a sufficient number (i.e., a predetermined number) of instances of this particular detected change have occurred over some predetermined period of time. As another example, this assessment can comprise assessing whether the specific details of the detected change are sufficient in quantity and/or quality to warrant further processing. For example, merely detecting that the person has not arrived at their usual 6 PM-Wednesday dance class may not be enough information, in and of itself, to warrant further processing, in which case the information regarding the detected change may be discarded or, in the alternative, cached for further consideration and use in conjunction or aggregation with other, later-detected changes.

Figure 6:
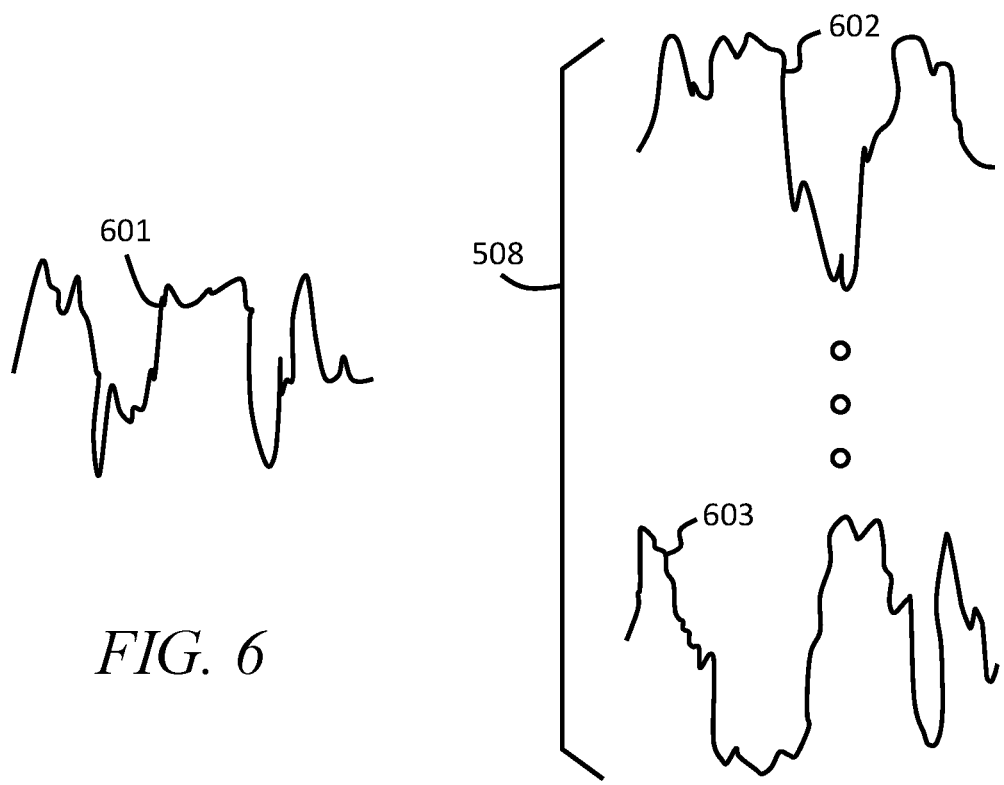
FIG. 6 comprises a graphic representation as configured in accordance with various embodiments of these teachings.

At block 507 this process 500 uses these detected changes to create a spectral profile for the monitored person. FIG. 6 provides an illustrative example in these regards with the spectral profile denoted by reference numeral 601. In this illustrative example the spectral profile 601 represents changes to the person's behavior over a given period of time (such as an hour, a day, a week, or some other temporal window of choice). Such a spectral profile can be as multidimensional as may suit the needs of a given application setting.

At optional block 507 this process 500 then provides for determining whether there is a statistically significant correlation between the aforementioned spectral profile and any of a plurality of like characterizations 508. The like characterizations 508 can comprise, for example, spectral profiles that represent an average of groupings of people who share many of the same (or all of the same) identified partialities. As a very simple illustrative example in these regards, a first such characterization 602 might represent a composite view of a first group of people who have three similar partialities but a dissimilar fourth partiality while another of the characterizations 603 might represent a composite view of a different group of people who share all four partialities.

The aforementioned "statistically significant" standard can be selected and/or adjusted to suit the needs of a given application setting. The scale or units by which this measurement can be assessed can be any known, relevant scale/unit including, but not limited to, scales such as standard deviations, cumulative percentages, percentile equivalents, Z-scores, T-scores, standard nines, and percentages in standard nines. Similarly, the threshold by which the level of statistical significance is measured/assessed can be set and selected as desired. By one approach the threshold is static such that the same threshold is employed regardless of the circumstances. By another approach the threshold is dynamic and can vary with such things as the relative size of the population of people upon which each of the characterizations 508 are based and/or the amount of data and/or the duration of time over which data is available for the monitored person.

Figure 7:
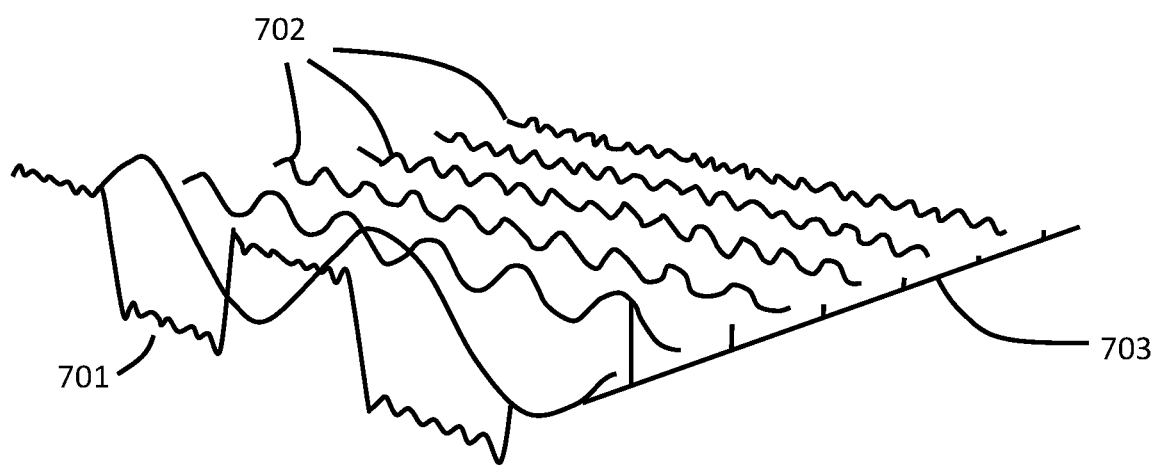
FIG. 7 comprises a graphic representation as configured in accordance with various embodiments of these teachings.

Referring now to FIG. 7, by one approach the selected characterization (denoted by reference numeral 701 in this figure) comprises an activity profile over time of one or more human behaviors. Examples of behaviors include but are not limited to such things as repeated purchases over time of particular commodities, repeated visits over time to particular locales such as certain restaurants, retail outlets, athletic or entertainment facilities, and so forth, and repeated activities over time such as floor cleaning, dish washing, car cleaning, cooking, volunteering, and so forth. Those skilled in the art will understand and appreciate, however, that the selected characterization is not, in and of itself, demographic data (as described elsewhere herein).

More particularly, the characterization 701 can represent (in this example, for a plurality of different behaviors) each instance over the monitored/sampled period of time when the monitored/represented person engages in a particular represented behavior (such as visiting a neighborhood gym, purchasing a particular product (such as a consumable perishable or a cleaning product), interacts with a particular affinity group via social networking, and so forth). The relevant overall time frame can be chosen as desired and can range in a typical application setting from a few hours or one day to many days, weeks, or even months or years. (It will be understood by those skilled in the art that the particular characterization shown in FIG. 7 is intended to serve an illustrative purpose and does not necessarily represent or mimic any particular behavior or set of behaviors).

Generally speaking it is anticipated that many behaviors of interest will occur at regular or somewhat regular intervals and hence will have a corresponding frequency or periodicity of occurrence. For some behaviors that frequency of occurrence may be relatively often (for example, oral hygiene events that occur at least once, and often multiple times each day) while other behaviors (such as the preparation of a holiday meal) may occur much less frequently (such as only once, or only a few times, each year). For at least some behaviors of interest that general (or specific) frequency of occurrence can serve as a significant indication of a person's corresponding partialities.

By one approach, these teachings will accommodate detecting and timestamping each and every event/activity/behavior or interest as it happens. Such an approach can be memory intensive and require considerable supporting infrastructure.

The present teachings will also accommodate, however, using any of a variety of sampling periods in these regards. In some cases, for example, the sampling period per se may be one week in duration. In that case, it may be sufficient to know that the monitored person engaged in a particular activity (such as cleaning their car) a certain number of times during that week without known precisely when, during that week, the activity occurred. In other cases it may be appropriate or even desirable, to provide greater granularity in these regards. For example, it may be better to know which days the person engaged in the particular activity or even the particular hour of the day. Depending upon the selected granularity/resolution, selecting an appropriate sampling window can help reduce data storage requirements (and/or corresponding analysis/processing overhead requirements).

Although a given person's behaviors may not, strictly speaking, be continuous waves (as shown in FIG. 7) in the same sense as, for example, a radio or acoustic wave, it will nevertheless be understood that such a behavioral characterization 701 can itself be broken down into a plurality of sub-waves 702 that, when summed together, equal or at least approximate to some satisfactory degree the behavioral characterization 701 itself (The more-discrete and sometimes less-rigidly periodic nature of the monitored behaviors may introduce a certain amount of error into the corresponding sub-waves. There are various mathematically satisfactory ways by which such error can be accommodated including by use of weighting factors and/or expressed tolerances that correspond to the resultant sub-waves.)

It should also be understood that each such sub-wave can often itself be associated with one or more corresponding discrete partialities. For example, a partiality reflecting concern for the environment may, in turn, influence many of the included behavioral events (whether they are similar or dissimilar behaviors or not) and accordingly may, as a sub-wave, comprise a relatively significant contributing factor to the overall set of behaviors as monitored over time. These sub-waves (partialities) can in turn be clearly revealed and presented by employing a transform (such as a Fourier transform) of choice to yield a spectral profile 703 wherein the X axis represents frequency and the Y axis represents the magnitude of the response of the monitored person at each frequency/sub-wave of interest.

Figure 8:
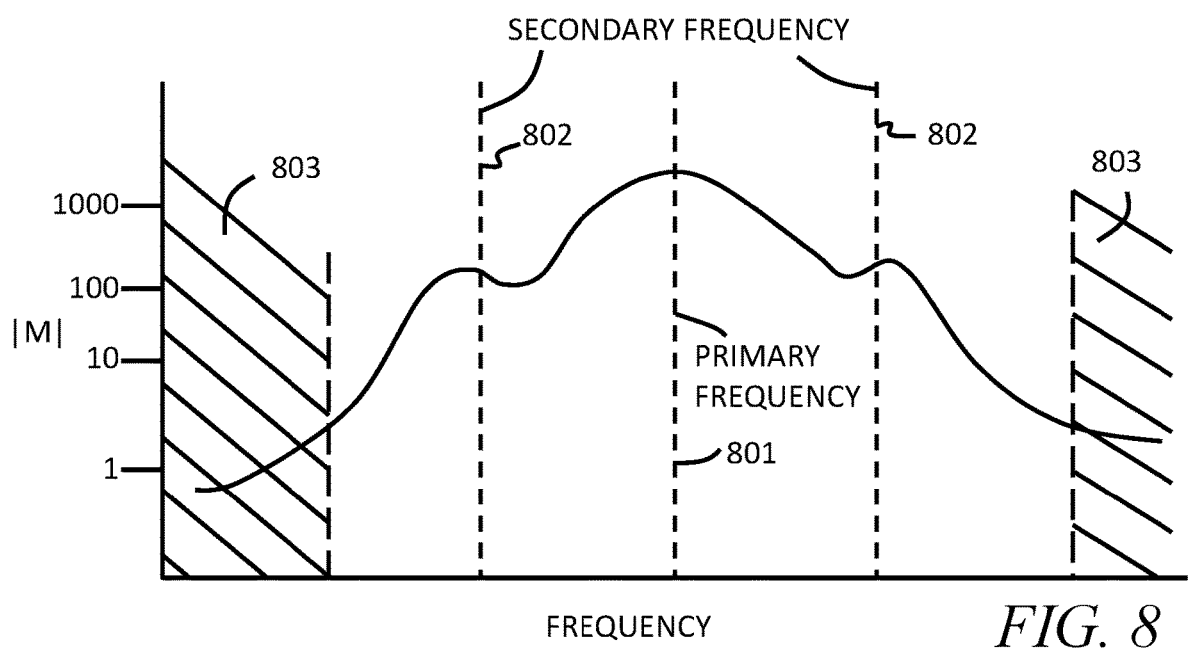
FIG. 8 comprises a graphic representation as configured in accordance with various embodiments of these teachings.

This spectral response of a given individual—which is generated from a time series of events that reflect/track that person's behavior—yields frequency response characteristics for that person that are analogous to the frequency response characteristics of physical systems such as, for example, an analog or digital filter or a second order electrical or mechanical system. Referring to FIG. 8, for many people the spectral profile of the individual person will exhibit a primary frequency 801 for which the greatest response (perhaps many orders of magnitude greater than other evident frequencies) to life is exhibited and apparent. In addition, the spectral profile may also possibly identify one or more secondary frequencies 802 above and/or below that primary frequency 801. (It may be useful in many application settings to filter out more distant frequencies 803 having considerably lower magnitudes because of a reduced likelihood of relevance and/or because of a possibility of error in those regards; in effect, these lower-magnitude signals constitute noise that such filtering can remove from consideration.)

As noted above, the present teachings will accommodate using sampling windows of varying size. By one approach the frequency of events that correspond to a particular partiality can serve as a basis for selecting a particular sampling rate to use when monitoring for such events. For example, Nyquist-based sampling rules (which dictate sampling at a rate at least twice that of the frequency of the signal of interest) can lead one to choose a particular sampling rate (and the resultant corresponding sampling window size).

As a simple illustration, if the activity of interest occurs only once a week, then using a sampling of half-a-week and sampling twice during the course of a given week will adequately capture the monitored event. If the monitored person's behavior should change, a corresponding change can be automatically made. For example, if the person in the foregoing example begins to engage in the specified activity three times a week, the sampling rate can be switched to six times per week (in conjunction with a sampling window that is resized accordingly).

By one approach, the sampling rate can be selected and used on a partiality-by-partiality basis. This approach can be especially useful when different monitoring modalities are employed to monitor events that correspond to different partialities. If desired, however, a single sampling rate can be employed and used for a plurality (or even all) partialities/behaviors. In that case, it can be useful to identify the behavior that is exemplified most often (i.e., that behavior which has the highest frequency) and then select a sampling rate that is at least twice that rate of behavioral realization, as that sampling rate will serve well and suffice for both that highest-frequency behavior and all lower-frequency behaviors as well.

It can be useful in many application settings to assume that the foregoing spectral profile of a given person is an inherent and inertial characteristic of that person and that this spectral profile, in essence, provides a personality profile of that person that reflects not only how but why this person responds to a variety of life experiences. More importantly, the partialities expressed by the spectral profile for a given person will tend to persist going forward and will not typically change significantly in the absence of some powerful external influence (including but not limited to significant life events such as, for example, marriage, children, loss of job, promotion, and so forth).

In any event, by knowing a priori the particular partialities (and corresponding strengths) that underlie the particular characterization 701, those partialities can be used as an initial template for a person whose own behaviors permit the selection of that particular characterization 701. In particular, those particularities can be used, at least initially, for a person for whom an amount of data is not otherwise available to construct a similarly rich set of partiality information.

As a very specific and non-limiting example, per these teachings the choice to make a particular product can include consideration of one or more value systems of potential customers. When considering persons who value animal rights, a product conceived to cater to that value proposition may require a corresponding exertion of additional effort to order material space-time such that the product is made in a way that (A) does not harm animals and/or (even better) (B) improves life for animals (for example, eggs obtained from free range chickens). The reason a person exerts effort to order material space-time is because they believe it is good to do and/or not good to not do so. When a person exerts effort to do good (per their personal standard of "good") and if that person believes that a particular order in material space-time (that includes the purchase of a particular product) is good to achieve, then that person will also believe that it is good to buy as much of that particular product (in order to achieve that good order) as their finances and needs reasonably permit (all other things being equal).

The aforementioned additional effort to provide such a product can (typically) convert to a premium that adds to the price of that product. A customer who puts out extra effort in their life to value animal rights will typically be willing to pay that extra premium to cover that additional effort exerted by the company. By one approach a magnitude that corresponds to the additional effort exerted by the company can be added to the person's corresponding value vector because a product or service has worth to the extent that the product/service allows a person to order material space-time in accordance with their own personal value system while allowing that person to exert less of their own effort in direct support of that value (since money is a scalar form of effort).

By one approach there can be hundreds or even thousands of identified partialities. In this case, if desired, each product/service of interest can be assessed with respect to each and every one of these partialities and a corresponding partiality vector formed to thereby build a collection of partiality vectors that collectively characterize the product/service. As a very simple example in these regards, a given laundry detergent might have a cleanliness partiality vector with a relatively high magnitude (representing the effectiveness of the detergent), a ecology partiality vector that might be relatively low or possibly even having a negative magnitude (representing an ecologically disadvantageous effect of the detergent post usage due to increased disorder in the environment), and a simple-life partiality vector with only a modest magnitude (representing the relative ease of use of the detergent but also that the detergent presupposes that the user has a modern washing machine). Other partiality vectors for this detergent, representing such things as nutrition or mental acuity, might have magnitudes of zero.

As mentioned above, these teachings can accommodate partiality vectors having a negative magnitude. Consider, for example, a partiality vector representing a desire to order things to reduce one's so-called carbon footprint. A magnitude of zero for this vector would indicate a completely neutral effect with respect to carbon emissions while any positive-valued magnitudes would represent a net reduction in the amount of carbon in the atmosphere, hence increasing the ability of the environment to be ordered. Negative magnitudes would represent the introduction of carbon emissions that increases disorder of the environment (for example, as a result of manufacturing the product, transporting the product, and/or using the product)

Figure 9:
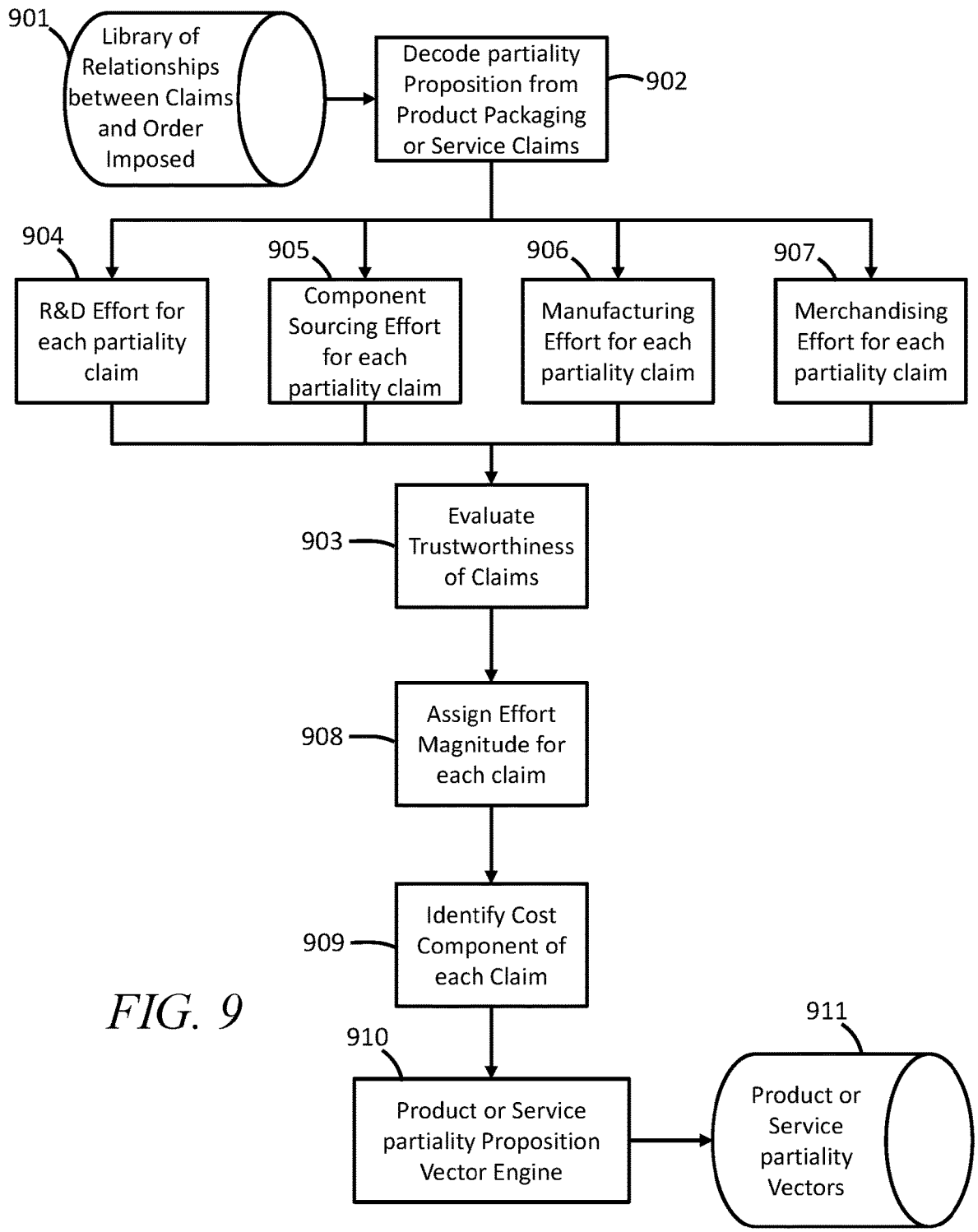
FIG. 9 comprises a flow diagram as configured in accordance with various embodiments of these teachings.

FIG. 9 presents one non-limiting illustrative example in these regards. The illustrated process presumes the availability of a library 901 of correlated relationships between product/service claims and particular imposed orders. Examples of product/service claims include such things as claims that a particular product results in cleaner laundry or household surfaces, or that a particular product is made in a particular political region (such as a particular state or country), or that a particular product is better for the environment, and so forth. The imposed orders to which such claims are correlated can reflect orders as described above that pertain to corresponding partialities.

At block 902 this process provides for decoding one or more partiality propositions from specific product packaging (or service claims). For example, the particular textual/graphics-based claims presented on the packaging of a given product can be used to access the aforementioned library 901 to identify one or more corresponding imposed orders from which one or more corresponding partialities can then be identified.

At block 903 this process provides for evaluating the trustworthiness of the aforementioned claims. This evaluation can be based upon any one or more of a variety of data points as desired. FIG. 9 illustrates four significant possibilities in these regards. For example, at block 904 an actual or estimated research and development effort can be quantified for each claim pertaining to a partiality. At block 905 an actual or estimated component sourcing effort for the product in question can be quantified for each claim pertaining to a partiality. At block 906 an actual or estimated manufacturing effort for the product in question can be quantified for each claim pertaining to a partiality. And at block 907 an actual or estimated merchandising effort for the product in question can be quantified for each claim pertaining to a partiality.

If desired, a product claim lacking sufficient trustworthiness may simply be excluded from further consideration. By another approach the product claim can remain in play but a lack of trustworthiness can be reflected, for example, in a corresponding partiality vector direction or magnitude for this particular product.

At block 908 this process provides for assigning an effort magnitude for each evaluated product/service claim. That effort can constitute a one-dimensional effort (reflecting, for example, only the manufacturing effort) or can constitute a multidimensional effort that reflects, for example, various categories of effort such as the aforementioned research and development effort, component sourcing effort, manufacturing effort, and so forth.

At block 909 this process provides for identifying a cost component of each claim, this cost component representing a monetary value. At block 910 this process can use the foregoing information with a product/service partiality propositions vector engine to generate a library 911 of one or more corresponding partiality vectors for the processed products/services. Such a library can then be used as described herein in conjunction with partiality vector information for various persons to identify, for example, products/services that are well aligned with the partialities of specific individuals.

Figure 10:
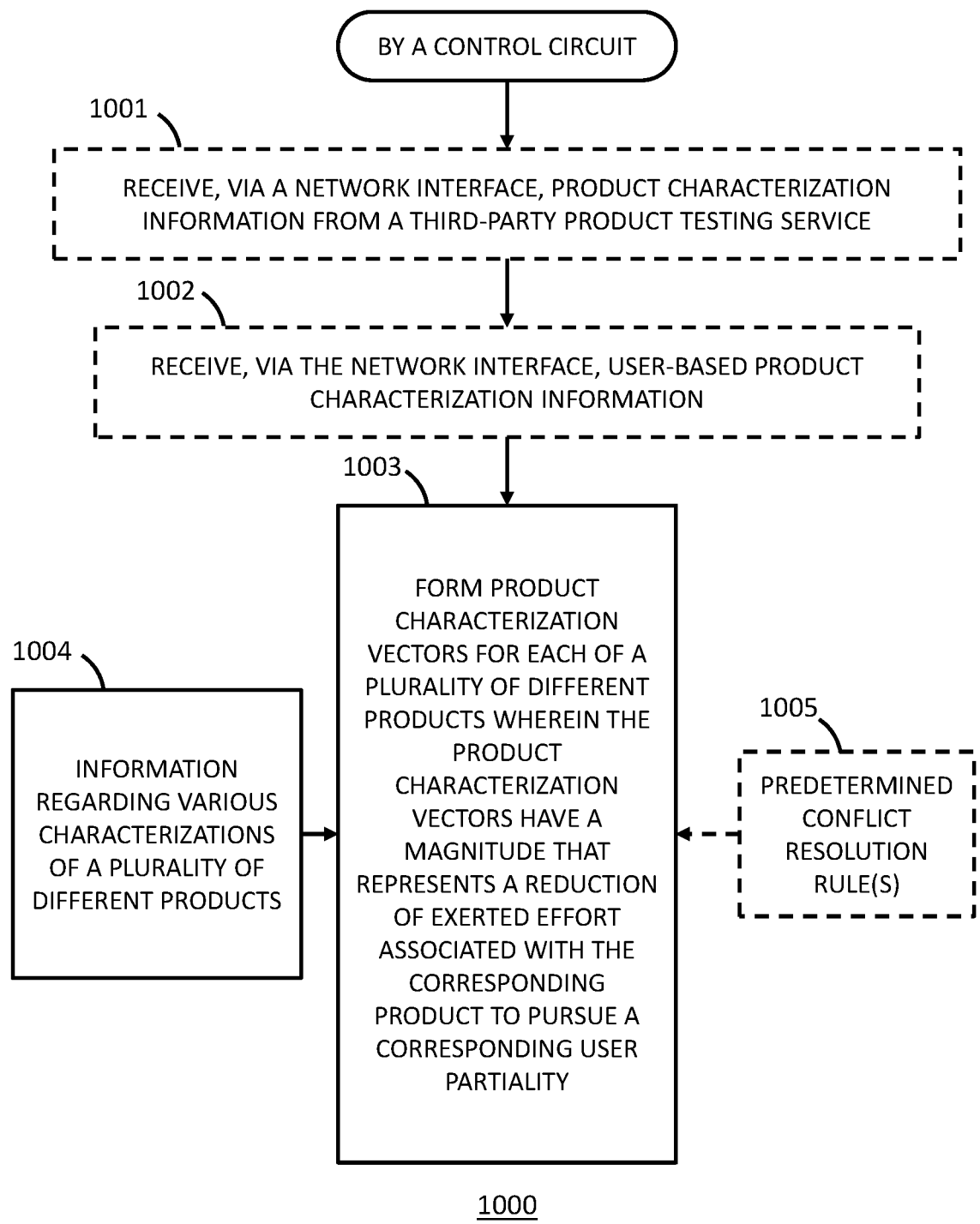
FIG. 10 comprises a flow diagram as configured in accordance with various embodiments of these teachings.

FIG. 10 provides another illustrative example in these same regards and may be employed in lieu of the foregoing or in total or partial combination therewith. Generally speaking, this process 1000 serves to facilitate the formation of product characterization vectors for each of a plurality of different products where the magnitude of the vector length (and/or the vector angle) has a magnitude that represents a reduction of exerted effort associated with the corresponding product to pursue a corresponding user partiality.

By one approach, and as illustrated in FIG. 10, this process 1000 can be carried out by a control circuit of choice. Specific examples of control circuits are provided elsewhere herein.

As described further herein in detail, this process 1000 makes use of information regarding various characterizations of a plurality of different products. These teachings are highly flexible in practice and will accommodate a wide variety of possible information sources and types of information. By one optional approach, and as shown at optional block 1001, the control circuit can receive (for example, via a corresponding network interface of choice) product characterization information from a third-party product testing service. The magazine/web resource Consumers Report provides one useful example in these regards. Such a resource provides objective content based upon testing, evaluation, and comparisons (and sometimes also provides subjective content regarding such things as aesthetics, ease of use, and so forth) and this content, provided as-is or pre-processed as desired, can readily serve as useful third-party product testing service product characterization information.

As another example, any of a variety of product-testing blogs that are published on the Internet can be similarly accessed and the product characterization information available at such resources harvested and received by the control circuit. (The expression "third party" will be understood to refer to an entity other than the entity that operates/controls the control circuit and other than the entity that provides the corresponding product itself.)

As another example, and as illustrated at optional block 1002, the control circuit can receive (again, for example, via a network interface of choice) user-based product characterization information. Examples in these regards include but are not limited to user reviews provided on-line at various retail sites for products offered for sale at such sites. The reviews can comprise metricized content (for example, a rating expressed as a certain number of stars out of a total available number of stars, such as 3 stars out of 5 possible stars) and/or text where the reviewers can enter their objective and subjective information regarding their observations and experiences with the reviewed products. In this case, "user-based" will be understood to refer to users who are not necessarily professional reviewers (though it is possible that content from such persons may be included with the information provided at such a resource) but who presumably purchased the product being reviewed and who have personal experience with that product that forms the basis of their review. By one approach the resource that offers such content may constitute a third party as defined above, but these teachings will also accommodate obtaining such content from a resource operated or sponsored by the enterprise that controls/operates this control circuit.

In any event, this process 1000 provides for accessing (see block 1004) information regarding various characterizations of each of a plurality of different products. This information 1004 can be gleaned as described above and/or can be obtained and/or developed using other resources as desired. As one illustrative example in these regards, the manufacturer and/or distributor of certain products may source useful content in these regards.

These teachings will accommodate a wide variety of information sources and types including both objective characterizing and/or subjective characterizing information for the aforementioned products.

Examples of objective characterizing information include, but are not limited to, ingredients information (i.e., specific components/materials from which the product is made), manufacturing locale information (such as country of origin, state of origin, municipality of origin, region of origin, and so forth), efficacy information (such as metrics regarding the relative effectiveness of the product to achieve a particular end-use result), cost information (such as per product, per ounce, per application or use, and so forth), availability information (such as present in-store availability, on-hand inventory availability at a relevant distribution center, likely or estimated shipping date, and so forth), environmental impact information (regarding, for example, the materials from which the product is made, one or more manufacturing processes by which the product is made, environmental impact associated with use of the product, and so forth), and so forth.

Examples of subjective characterizing information include but are not limited to user sensory perception information (regarding, for example, heaviness or lightness, speed of use, effort associated with use, smell, and so forth), aesthetics information (regarding, for example, how attractive or unattractive the product is in appearance, how well the product matches or accords with a particular design paradigm or theme, and so forth), trustworthiness information (regarding, for example, user perceptions regarding how likely the product is perceived to accomplish a particular purpose or to avoid causing a particular collateral harm), trendiness information, and so forth.

This information 1004 can be curated (or not), filtered, sorted, weighted (in accordance with a relative degree of trust, for example, accorded to a particular source of particular information), and otherwise categorized and utilized as desired. As one simple example in these regards, for some products it may be desirable to only use relatively fresh information (i.e., information not older than some specific cut-off date) while for other products it may be acceptable (or even desirable) to use, in lieu of fresh information or in combination therewith, relatively older information. As another simple example, it may be useful to use only information from one particular geographic region to characterize a particular product and to therefore not use information from other geographic regions.

At block 1003 the control circuit uses the foregoing information 1004 to form product characterization vectors for each of the plurality of different products. By one approach these product characterization vectors have a magnitude (for the length of the vector and/or the angle of the vector) that represents a reduction of exerted effort associated with the corresponding product to pursue a corresponding user partiality (as is otherwise discussed herein).

It is possible that a conflict will become evident as between various ones of the aforementioned items of information 1004. In particular, the available characterizations for a given product may not all be the same or otherwise in accord with one another. In some cases it may be appropriate to literally or effectively calculate and use an average to accommodate such a conflict. In other cases it may be useful to use one or more other predetermined conflict resolution rules 1005 to automatically resolve such conflicts when forming the aforementioned product characterization vectors.

These teachings will accommodate any of a variety of rules in these regards. By one approach, for example, the rule can be based upon the age of the information (where, for example the older (or newer, if desired) data is preferred or weighted more heavily than the newer (or older, if desired) data. By another approach, the rule can be based upon a number of user reviews upon which the user-based product characterization information is based (where, for example, the rule specifies that whichever user-based product characterization information is based upon a larger number of user reviews will prevail in the event of a conflict). By another approach, the rule can be based upon information regarding historical accuracy of information from a particular information source (where, for example, the rule specifies that information from a source with a better historical record of accuracy shall prevail over information from a source with a poorer historical record of accuracy in the event of a conflict).

By yet another approach, the rule can be based upon social media. For example, social media-posted reviews may be used as a tie-breaker in the event of a conflict between other more-favored sources. By another approach, the rule can be based upon a trending analysis. And by yet another approach the rule can be based upon the relative strength of brand awareness for the product at issue (where, for example, the rule specifies resolving a conflict in favor of a more favorable characterization when dealing with a product from a strong brand that evidences considerable consumer goodwill and trust).

It will be understood that the foregoing examples are intended to serve an illustrative purpose and are not offered as an exhaustive listing in these regards. It will also be understood that any two or more of the foregoing rules can be used in combination with one another to resolve the aforementioned conflicts.

By one approach the aforementioned product characterization vectors are formed to serve as a universal characterization of a given product. By another approach, however, the aforementioned information 1004 can be used to form product characterization vectors for a same characterization factor for a same product to thereby correspond to different usage circumstances of that same product. Those different usage circumstances might comprise, for example, different geographic regions of usage, different levels of user expertise (where, for example, a skilled, professional user might have different needs and expectations for the product than a casual, lay user), different levels of expected use, and so forth. In particular, the different vectorized results for a same characterization factor for a same product may have differing magnitudes from one another to correspond to different amounts of reduction of the exerted effort associated with that product under the different usage circumstances.

Figure 11:
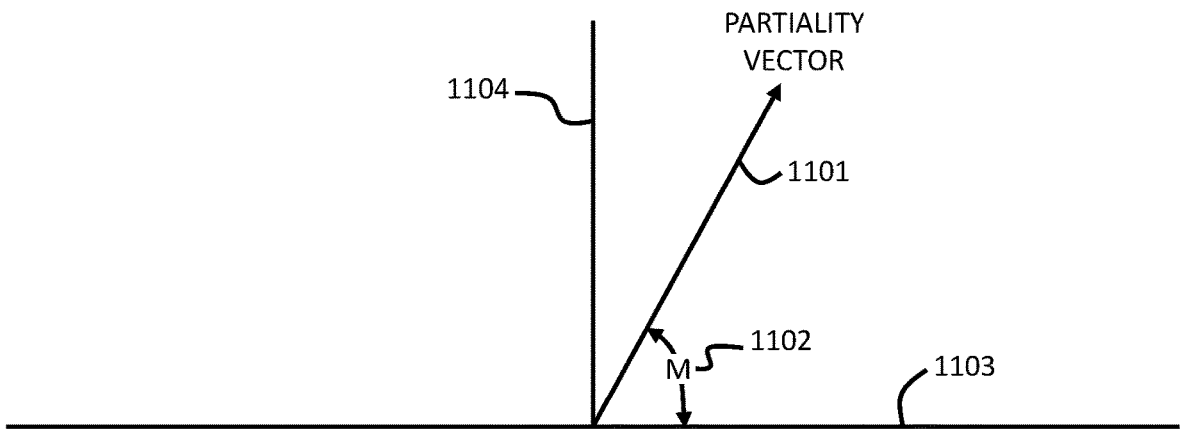
FIG. 11 comprises a graphic representation as configured in accordance with various embodiments of these teachings.

As noted above, the magnitude corresponding to a particular partiality vector for a particular person can be expressed by the angle of that partiality vector. FIG. 11 provides an illustrative example in these regards. In this example the partiality vector 1101 has an angle M 1102 (and where the range of available positive magnitudes range from a minimal magnitude represented by 0° (as denoted by reference numeral 1103) to a maximum magnitude represented by 90° (as denoted by reference numeral 1104)). Accordingly, the person to whom this partiality vector 1001 pertains has a relatively strong (but not absolute) belief in an amount of good that comes from an order associated with that partiality.

Figure 12:
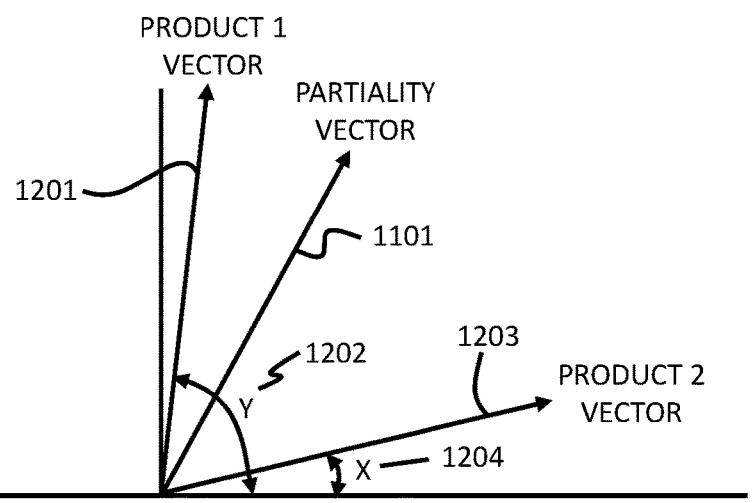
FIG. 12 comprises a graphic representation as configured in accordance with various embodiments of these teachings.

FIG. 12, in turn, presents that partiality vector 1101 in context with the product characterization vectors 1201 and 1203 for a first product and a second product, respectively. In this example the product characterization vector 1201 for the first product has an angle Y 1202 that is greater than the angle M 1102 for the aforementioned partiality vector 1101 by a relatively small amount while the product characterization vector 1203 for the second product has an angle X 1204 that is considerably smaller than the angle M 1102 for the partiality vector 1101.

Since, in this example, the angles of the various vectors represent the magnitude of the person's specified partiality or the extent to which the product aligns with that partiality, respectively, vector dot product calculations can serve to help identify which product best aligns with this partiality. Such an approach can be particularly useful when the lengths of the vectors are allowed to vary as a function of one or more parameters of interest. As those skilled in the art will understand, a vector dot product is an algebraic operation that takes two equal-length sequences of numbers (in this case, coordinate vectors) and returns a single number.

This operation can be defined either algebraically or geometrically. Algebraically, it is the sum of the products of the corresponding entries of the two sequences of numbers. Geometrically, it is the product of the Euclidean magnitudes of the two vectors and the cosine of the angle between them. The result is a scalar rather than a vector. As regards the present illustrative example, the resultant scaler value for the vector dot product of the product 1 vector 1201 with the partiality vector 1101 will be larger than the resultant scaler value for the vector dot product of the product 2 vector 1203 with the partiality vector 1101. Accordingly, when using vector angles to impart this magnitude information, the vector dot product operation provides a simple and convenient way to determine proximity between a particular partiality and the performance/properties of a particular product to thereby greatly facilitate identifying a best product amongst a plurality of candidate products.

By way of further illustration, consider an example where a particular consumer as a strong partiality for organic produce and is financially able to afford to pay to observe that partiality. A dot product result for that person with respect to a product characterization vector(s) for organic apples that represent a cost of $10 on a weekly basis (i.e., Cv·P1v) might equal (1,1), hence yielding a scalar result of ||1|| (where Cv refers to the corresponding partiality vector for this person and P1v represents the corresponding product characterization vector for these organic apples). Conversely, a dot product result for this same person with respect to a product characterization vector(s) for non-organic apples that represent a cost of $5 on a weekly basis (i.e., Cv·P2v) might instead equal (1,0), hence yielding a scalar result of ||½||. Accordingly, although the organic apples cost more than the non-organic apples, the dot product result for the organic apples exceeds the dot product result for the non-organic apples and therefore identifies the more expensive organic apples as being the best choice for this person.

To continue with the foregoing example, consider now what happens when this person subsequently experiences some financial misfortune (for example, they lose their job and have not yet found substitute employment). Such an event can present the "force" necessary to alter the previously-established "inertia" of this person's steady-state partialities; in particular, these negatively-changed financial circumstances (in this example) alter this person's budget sensitivities (though not, of course their partiality for organic produce as compared to non-organic produce). The scalar result of the dot product for the $5/week non-organic apples may remain the same (i.e., in this example, $\|½\|$), but the dot product for the $10/week organic apples may now drop (for example, to $\|½\|$ as well). Dropping the quantity of organic apples purchased, however, to reflect the tightened financial circumstances for this person may yield a better dot product result. For example, purchasing only $5 (per week) of organic apples may produce a dot product result of $\|1\|$. The best result for this person, then, under these circumstances, is a lesser quantity of organic apples rather than a larger quantity of non-organic apples.

In a typical application setting, it is possible that this person's loss of employment is not, in fact, known to the system. Instead, however, this person's change of behavior (i.e., reducing the quantity of the organic apples that are purchased each week) might well be tracked and processed to adjust one or more partialities (either through an addition or deletion of one or more partialities and/or by adjusting the corresponding partiality magnitude) to thereby yield this new result as a preferred result.

The foregoing simple examples clearly illustrate that vector dot product approaches can be a simple yet powerful way to quickly eliminate some product options while simultaneously quickly highlighting one or more product options as being especially suitable for a given person.

Such vector dot product calculations and results, in turn, help illustrate another point as well. As noted above, sine waves can serve as a potentially useful way to characterize and view partiality information for both people and products/services. In those regards, it is worth noting that a vector dot product result can be a positive, zero, or even negative value. That, in turn, suggests representing a particular solution as a normalization of the dot product value relative to the maximum possible value of the dot product. Approached this way, the maximum amplitude of a particular sine wave will typically represent a best solution.

Taking this approach further, by one approach the frequency (or, if desired, phase) of the sine wave solution can provide an indication of the sensitivity of the person to product choices (for example, a higher frequency can indicate a relatively highly reactive sensitivity while a lower frequency can indicate the opposite). A highly sensitive person is likely to be less receptive to solutions that are less than fully optimum and hence can help to narrow the field of candidate products while, conversely, a less sensitive person is likely to be more receptive to solutions that are less than fully optimum and can help to expand the field of candidate products.

Figure 13:
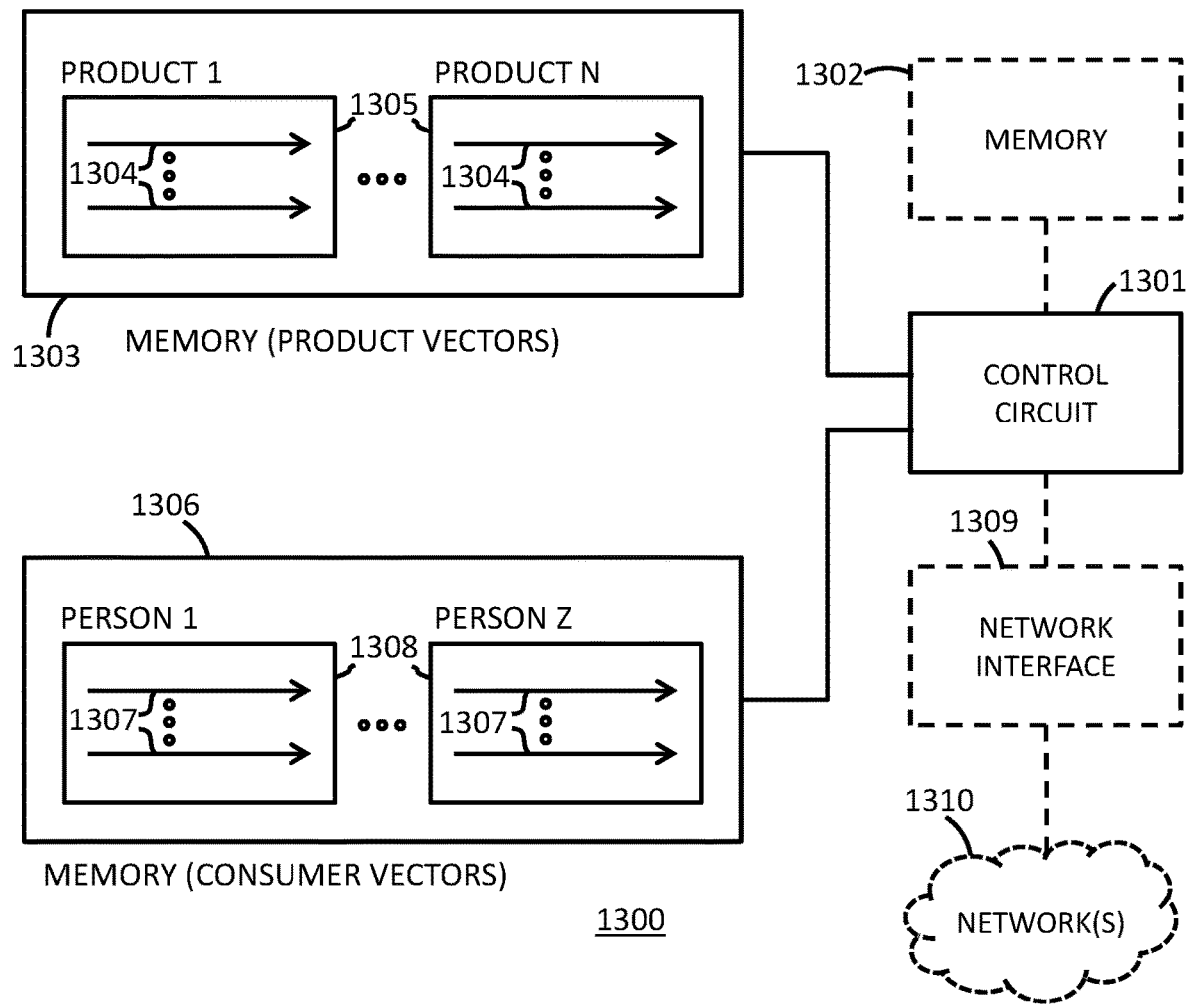
FIG. 13 comprises a block diagram as configured in accordance with various embodiments of these teachings.

FIG. 13 presents an illustrative apparatus 1300 for conducting, containing, and utilizing the foregoing content and capabilities. In this particular example, the enabling apparatus 1300 includes a control circuit 1301. Being a "circuit," the control circuit 1301 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 1301 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 1301 is configured (for example, by using corresponding programming as will be well understood by those skilled in the art) to carry out one or more of the steps, actions, and/or functions described herein.

By one optional approach the control circuit 1301 operably couples to a memory 1302. This memory 1302 may be integral to the control circuit 1301 or can be physically discrete (in whole or in part) from the control circuit 1301 as desired. This memory 1302 can also be local with respect to the control circuit 1301 (where, for example, both share a common circuit board, chassis, power supply, and/or housing) or can be partially or wholly remote with respect to the control circuit 1301 (where, for example, the memory 1302 is physically located in another facility, metropolitan area, or even country as compared to the control circuit 1301).

This memory 1302 can serve, for example, to non-transitorily store the computer instructions that, when executed by the control circuit 1301, cause the control circuit 1301 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Either stored in this memory 1302 or, as illustrated, in a separate memory 1303 are the vectorized characterizations 1304 for each of a plurality of products 1305 (represented here by a first product through an Nth product where "N" is an integer greater than "1"). In addition, and again either stored in this memory 1302 or, as illustrated, in a separate memory 1306 are the vectorized characterizations 1307 for each of a plurality of individual persons 1308 (represented here by a first person through a Zth person wherein "Z" is also an integer greater than "1").

In this example the control circuit 1301 also operably couples to a network interface 1309. So configured the control circuit 1301 can communicate with other elements (both within the apparatus 1300 and external thereto) via the network interface 1309. Network interfaces, including both wireless and non-wireless platforms, are well understood in the art and require no particular elaboration here. This network interface 1309 can compatibly communicate via whatever network or networks 1310 may be appropriate to suit the particular needs of a given application setting. Both communication networks and network interfaces are well understood areas of prior art endeavor and therefore no further elaboration will be provided here in those regards for the sake of brevity.

Figure 14:
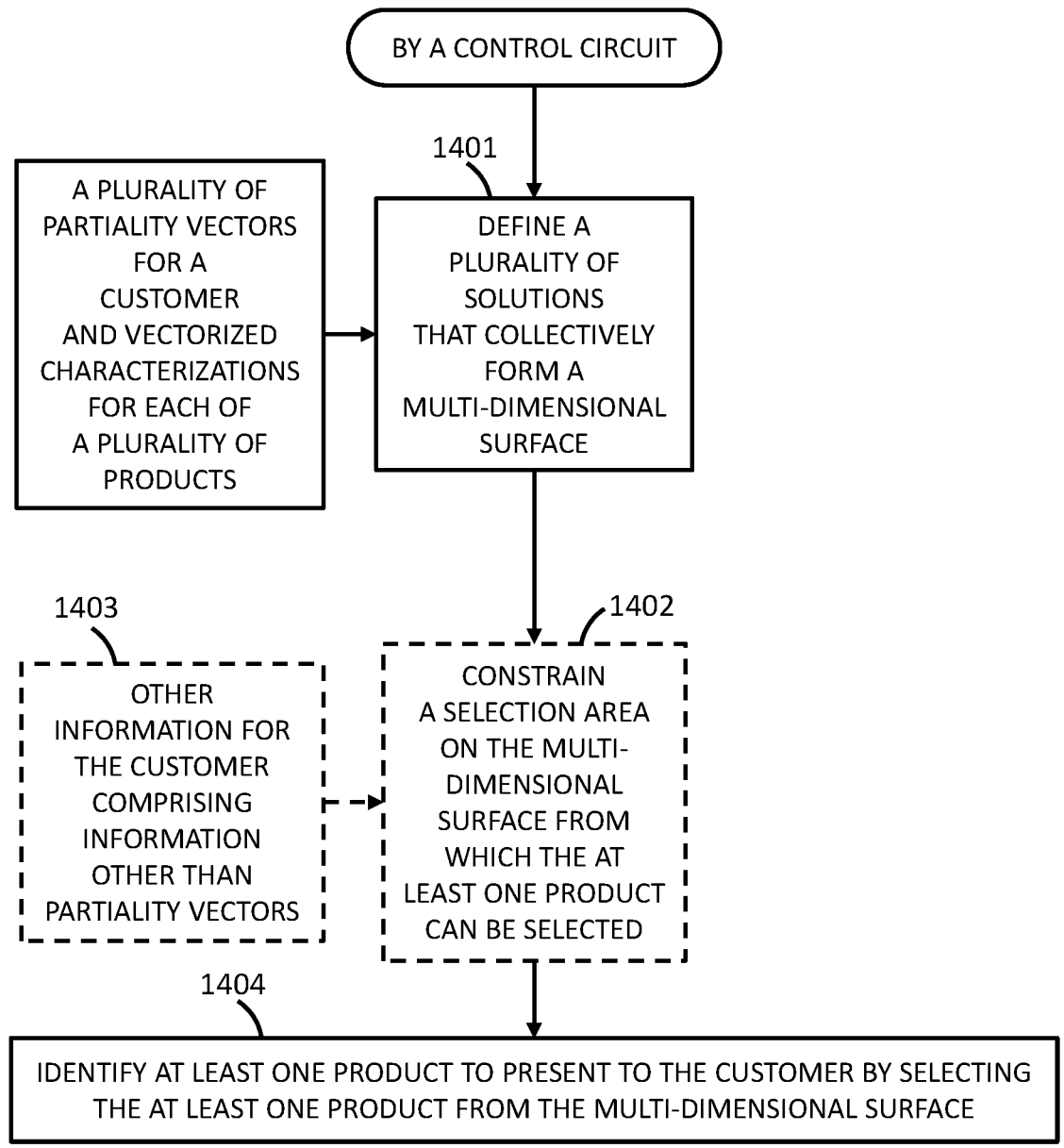
FIG. 14 comprises a flow diagram as configured in accordance with various embodiments of these teachings.
Figure 15:
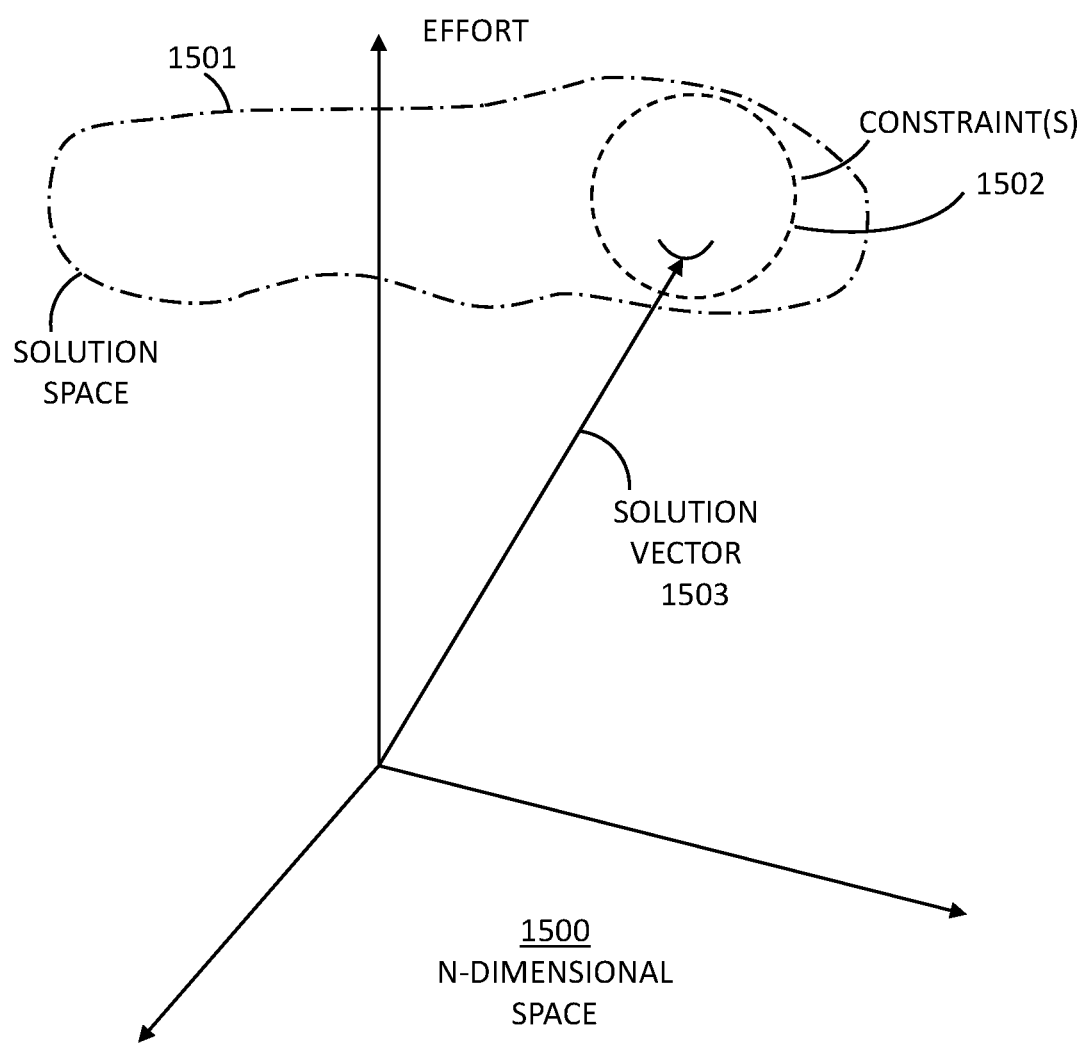
FIG. 15 comprises a graph as configured in accordance with various embodiments of these teachings.

By one approach, and referring now to FIG. 14, the control circuit 1301 is configured to use the aforementioned partiality vectors 1307 and the vectorized product characterizations 1304 to define a plurality of solutions that collectively form a multidimensional surface (per block 1401). FIG. 15 provides an illustrative example in these regards. FIG. 15 represents an N-dimensional space 1500 and where the aforementioned information for a particular customer yielded a multi-dimensional surface denoted by reference numeral 1501. (The relevant value space is an N-dimensional space where the belief in the value of a particular ordering of one's life only acts on value propositions in that space as a function of a least-effort functional relationship.)

Generally speaking, this surface 1501 represents all possible solutions based upon the foregoing information. Accordingly, in a typical application setting this surface 1501 will contain/represent a plurality of discrete solutions. That said, and also in a typical application setting, not all of those solutions will be similarly preferable. Instead, one or more of those solutions may be particularly useful/appropriate at a given time, in a given place, for a given customer.

With continued reference to FIGS. 14 and 15, at optional block 1402 the control circuit 1301 can be configured to use information for the customer 1403 (other than the aforementioned partiality vectors 1307) to constrain a selection area 1502 on the multi-dimensional surface 1501 from which at least one product can be selected for this particular customer. By one approach, for example, the constraints can be selected such that the resultant selection area 1502 represents the best 95th percentile of the solution space. Other target sizes for the selection area 1502 are of course possible and may be useful in a given application setting.

The aforementioned other information 1403 can comprise any of a variety of information types. By one approach, for example, this other information comprises objective information. (As used herein, "objective information" will be understood to constitute information that is not influenced by personal feelings or opinions and hence constitutes unbiased, neutral facts.)

One particularly useful category of objective information comprises objective information regarding the customer. Examples in these regards include, but are not limited to, location information regarding a past, present, or planned/scheduled future location of the customer, budget information for the customer or regarding which the customer must strive to adhere (such that, by way of example, a particular product/solution area may align extremely well with the customer's partialities but is well beyond that which the customer can afford and hence can be reasonably excluded from the selection area 1502), age information for the customer, and gender information for the customer. Another example in these regards is information comprising objective logistical information regarding providing particular products to the customer. Examples in these regards include but are not limited to current or predicted product availability, shipping limitations (such as restrictions or other conditions that pertain to shipping a particular product to this particular customer at a particular location), and other applicable legal limitations (pertaining, for example, to the legality of a customer possessing or using a particular product at a particular location).

At block 1404 the control circuit 1301 can then identify at least one product to present to the customer by selecting that product from the multi-dimensional surface 1501. In the example of FIG. 15, where constraints have been used to define a reduced selection area 1502, the control circuit 1301 is constrained to select that product from within that selection area 1502. For example, and in accordance with the description provided herein, the control circuit 1301 can select that product via solution vector 1503 by identifying a particular product that requires a minimal expenditure of customer effort while also remaining compliant with one or more of the applied objective constraints based, for example, upon objective information regarding the customer and/or objective logistical information regarding providing particular products to the customer.

So configured, and as a simple example, the control circuit 1301 may respond per these teachings to learning that the customer is planning a party that will include seven other invited individuals. The control circuit 1301 may therefore be looking to identify one or more particular beverages to present to the customer for consideration in those regards. The aforementioned partiality vectors 1307 and vectorized product characterizations 1304 can serve to define a corresponding multi-dimensional surface 1501 that identifies various beverages that might be suitable to consider in these regards.

Objective information regarding the customer and/or the other invited persons, however, might indicate that all or most of the participants are not of legal drinking age. In that case, that objective information may be utilized to constrain the available selection area 1502 to beverages that contain no alcohol. As another example in these regards, the control circuit 1301 may have objective information that the party is to be held in a state park that prohibits alcohol and may therefore similarly constrain the available selection area 1502 to beverages that contain no alcohol.

Figure 16:
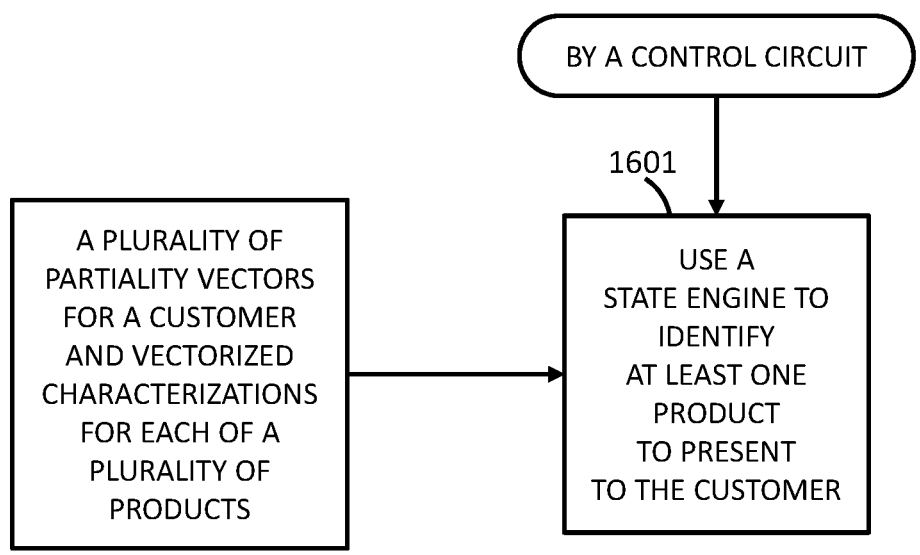
FIG. 16 comprises a flow diagram as configured in accordance with various embodiments of these teachings.

As described above, the aforementioned control circuit 1301 can utilize information including a plurality of partiality vectors for a particular customer along with vectorized product characterizations for each of a plurality of products to identify at least one product to present to a customer. By one approach 1600, and referring to FIG. 16, the control circuit 1301 can be configured as (or to use) a state engine to identify such a product (as indicated at block 1601). As used herein, the expression "state engine" will be understood to refer to a finite-state machine, also sometimes known as a finite-state automaton or simply as a state machine.

Generally speaking, a state engine is a basic approach to designing both computer programs and sequential logic circuits. A state engine has only a finite number of states and can only be in one state at a time. A state engine can change from one state to another when initiated by a triggering event or condition often referred to as a transition. Accordingly, a particular state engine is defined by a list of its states, its initial state, and the triggering condition for each transition.

Figure 17:
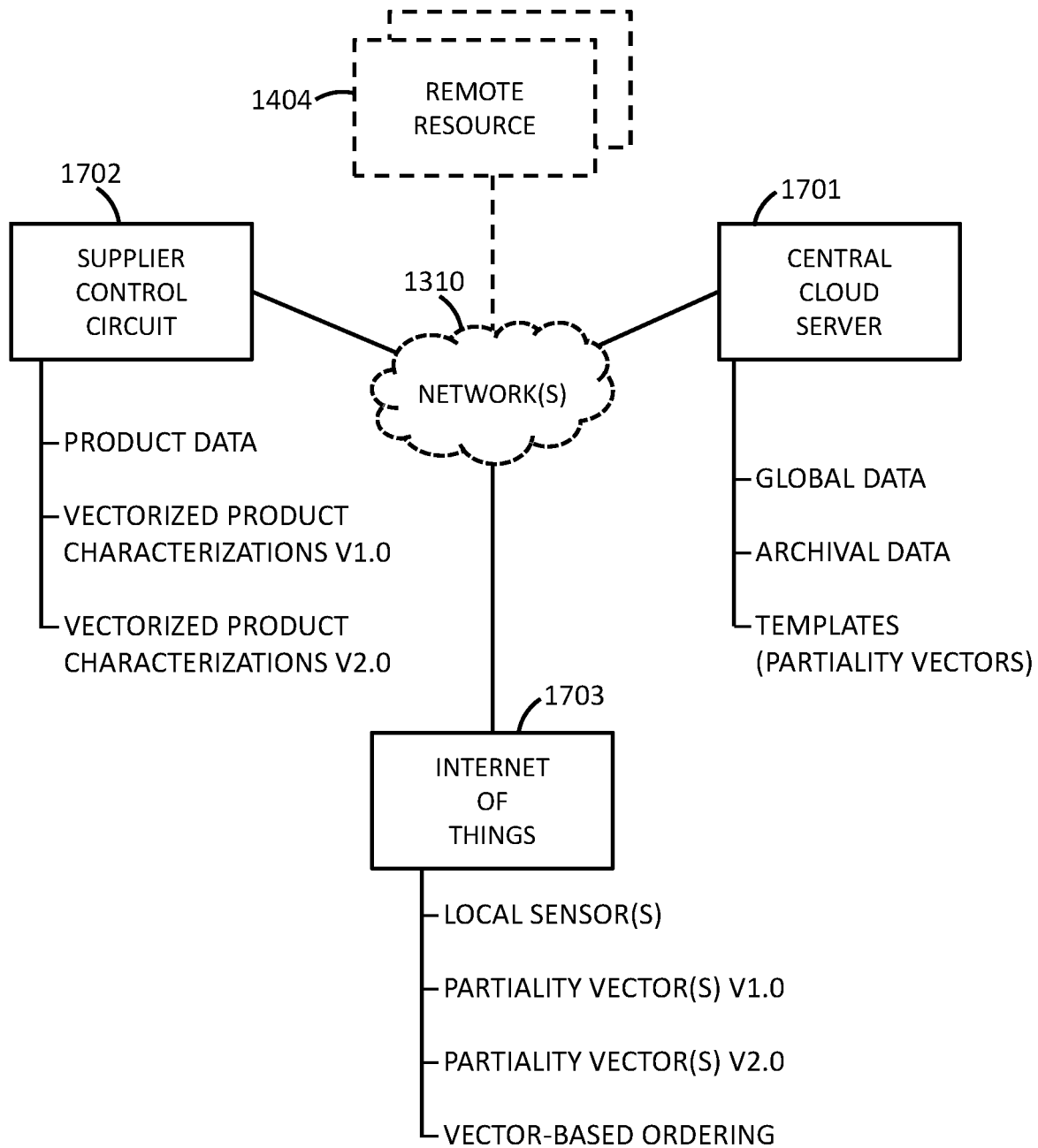
FIG. 17 comprises a block diagram as configured in accordance with various embodiments of these teachings.

It will be appreciated that the apparatus 1300 described above can be viewed as a literal physical architecture or, if desired, as a logical construct. For example, these teachings can be enabled and operated in a highly centralized manner (as might be suggested when viewing that apparatus 1300 as a physical construct) or, conversely, can be enabled and operated in a highly decentralized manner. FIG. 17 provides an example as regards the latter.

In this illustrative example a central cloud server 1701, a supplier control circuit 1702, and the aforementioned Internet of Things 1703 communicate via the aforementioned network 1310.

The central cloud server 1701 can receive, store, and/or provide various kinds of global data (including, for example, general demographic information regarding people and places, profile information for individuals, product descriptions and reviews, and so forth), various kinds of archival data (including, for example, historical information regarding the aforementioned demographic and profile information and/or product descriptions and reviews), and partiality vector templates as described herein that can serve as starting point general characterizations for particular individuals as regards their partialities. Such information may constitute a public resource and/or a privately-curated and accessed resource as desired. (It will also be understood that there may be more than one such central cloud server 1701 that store identical, overlapping, or wholly distinct content.)

The supplier control circuit 1702 can comprise a resource that is owned and/or operated on behalf of the suppliers of one or more products (including but not limited to manufacturers, wholesalers, retailers, and even resellers of previously-owned products). This resource can receive, process and/or analyze, store, and/or provide various kinds of information. Examples include but are not limited to product data such as marketing and packaging content (including textual materials, still images, and audio-video content), operators and installers manuals, recall information, professional and non-professional reviews, and so forth.

Another example comprises vectorized product characterizations as described herein. More particularly, the stored and/or available information can include both prior vectorized product characterizations (denoted in FIG. 17 by the expression "vectorized product characterizations V1.0") for a given product as well as subsequent, updated vectorized product characterizations (denoted in FIG. 17 by the expression "vectorized product characterizations V2.0") for the same product. Such modifications may have been made by the supplier control circuit 1702 itself or may have been made in conjunction with or wholly by an external resource as desired.

The Internet of Things 1703 can comprise any of a variety of devices and components that may include local sensors that can provide information regarding a corresponding user's circumstances, behaviors, and reactions back to, for example, the aforementioned central cloud server 1701 and the supplier control circuit 1702 to facilitate the development of corresponding partiality vectors for that corresponding user. Again, however, these teachings will also support a decentralized approach. In many cases devices that are fairly considered to be members of the Internet of Things 1703 constitute network edge elements (i.e., network elements deployed at the edge of a network). In some case the network edge element is configured to be personally carried by the person when operating in a deployed state. Examples include but are not limited to so-called smart phones, smart watches, fitness monitors that are worn on the body, and so forth. In other cases, the network edge element may be configured to not be personally carried by the person when operating in a deployed state. This can occur when, for example, the network edge element is too large and/or too heavy to be reasonably carried by an ordinary average person. This can also occur when, for example, the network edge element has operating requirements ill-suited to the mobile environment that typifies the average person.

For example, a so-called smart phone can itself include a suite of partiality vectors for a corresponding user (i.e., a person that is associated with the smart phone which itself serves as a network edge element) and employ those partiality vectors to facilitate vector-based ordering (either automated or to supplement the ordering being undertaken by the user) as is otherwise described herein. In that case, the smart phone can obtain corresponding vectorized product characterizations from a remote resource such as, for example, the aforementioned supplier control circuit 1702 and use that information in conjunction with local partiality vector information to facilitate the vector-based ordering.

Also, if desired, the smart phone in this example can itself modify and update partiality vectors for the corresponding user. To illustrate this idea in FIG. 17, this device can utilize, for example, information gained at least in part from local sensors to update a locally-stored partiality vector (represented in FIG. 17 by the expression "partiality vector V1.0") to obtain an updated locally-stored partiality vector (represented in FIG. 17 by the expression "partiality vector V2.0"). Using this approach, a user's partiality vectors can be locally stored and utilized. Such an approach may better comport with a particular user's privacy concerns.

It will be understood that the smart phone employed in the immediate example is intended to serve in an illustrative capacity and is not intended to suggest any particular limitations in these regards. In fact, any of a wide variety of Internet of Things devices/components could be readily configured in the same regards. As one simple example in these regards, a computationally-capable networked refrigerator could be configured to order appropriate perishable items for a corresponding user as a function of that user's partialities.

Presuming a decentralized approach, these teachings will accommodate any of a variety of other remote resources 1704. These remote resources 1704 can, in turn, provide static or dynamic information and/or interaction opportunities or analytical capabilities that can be called upon by any of the above-described network elements. Examples include but are not limited to voice recognition, pattern and image recognition, facial recognition, statistical analysis, computational resources, encryption and decryption services, fraud and misrepresentation detection and prevention services, digital currency support, and so forth.

As already suggested above, these approaches provide powerful ways for identifying products and/or services that a given person, or a given group of persons, may likely wish to buy to the exclusion of other options. When the magnitude and direction of the relevant/required meta-force vector that comes from the perceived effort to impose order is known, these teachings will facilitate, for example, engineering a product or service containing potential energy in the precise ordering direction to provide a total reduction of effort. Since people generally take the path of least effort (consistent with their partialities) they will typically accept such a solution.

As one simple illustrative example, a person who exhibits a partiality for food products that emphasize health, natural ingredients, and a concern to minimize sugars and fats may be presumed to have a similar partiality for pet foods because such partialities may be based on a value system that extends beyond themselves to other living creatures within their sphere of concern. If other data is available to indicate that this person in fact has, for example, two pet dogs, these partialities can be used to identify dog food products having well-aligned vectors in these same regards. This person could then be solicited to purchase such dog food products using any of a variety of solicitation approaches (including but not limited to general informational advertisements, discount coupons or rebate offers, sales calls, free samples, and so forth).

As another simple example, the approaches described herein can be used to filter out products/services that are not likely to accord well with a given person's partiality vectors. In particular, rather than emphasizing one particular product over another, a given person can be presented with a group of products that are available to purchase where all of the vectors for the presented products align to at least some predetermined degree of alignment/accord and where products that do not meet this criterion are simply not presented.

And as yet another simple example, a particular person may have a strong partiality towards both cleanliness and orderliness. The strength of this partiality might be measured in part, for example, by the physical effort they exert by consistently and promptly cleaning their kitchen following meal preparation activities. If this person were looking for lawn care services, their partiality vector(s) in these regards could be used to identify lawn care services who make representations and/or who have a trustworthy reputation or record for doing a good job of cleaning up the debris that results when mowing a lawn. This person, in turn, will likely appreciate the reduced effort on their part required to locate such a service that can meaningfully contribute to their desired order.

These teachings can be leveraged in any number of other useful ways. As one example in these regards, various sensors and other inputs can serve to provide automatic updates regarding the events of a given person's day. By one approach, at least some of this information can serve to help inform the development of the aforementioned partiality vectors for such a person. At the same time, such information can help to build a view of a normal day for this particular person. That baseline information can then help detect when this person's day is going experientially awry (i.e., when their desired "order" is off track). Upon detecting such circumstances these teachings will accommodate employing the partiality and product vectors for such a person to help make suggestions (for example, for particular products or services) to help correct the day's order and/or to even effect automatically-engaged actions to correct the person's experienced order.

When this person's partiality (or relevant partialities) are based upon a particular aspiration, restoring (or otherwise contributing to) order to their situation could include, for example, identifying the order that would be needed for this person to achieve that aspiration. Upon detecting, (for example, based upon purchases, social media, or other relevant inputs) that this person is aspiring to be a gourmet chef, these teachings can provide for plotting a solution that would begin providing/offering additional products/services that would help this person move along a path of increasing how they order their lives towards being a gourmet chef.

By one approach, these teachings will accommodate presenting the consumer with choices that correspond to solutions that are intended and serve to test the true conviction of the consumer as to a particular aspiration. The reaction of the consumer to such test solutions can then further inform the system as to the confidence level that this consumer holds a particular aspiration with some genuine conviction. In particular, and as one example, that confidence can in turn influence the degree and/or direction of the consumer value vector(s) in the direction of that confirmed aspiration.

All the above approaches are informed by the constraints the value space places on individuals so that they follow the path of least perceived effort to order their lives to accord with their values which results in partialities. People generally order their lives consistently unless and until their belief system is acted upon by the force of a new trusted value proposition. The present teachings are uniquely able to identify, quantify, and leverage the many aspects that collectively inform and define such belief systems.

A person's preferences can emerge from a perception that a product or service removes effort to order their lives according to their values. The present teachings acknowledge and even leverage that it is possible to have a preference for a product or service that a person has never heard of before in that, as soon as the person perceives how it will make their lives easier they will prefer it. Most predictive analytics that use preferences are trying to predict a decision the customer is likely to make. The present teachings are directed to calculating a reduced effort solution that can/will inherently and innately be something to which the person is partial.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

Figure 18:
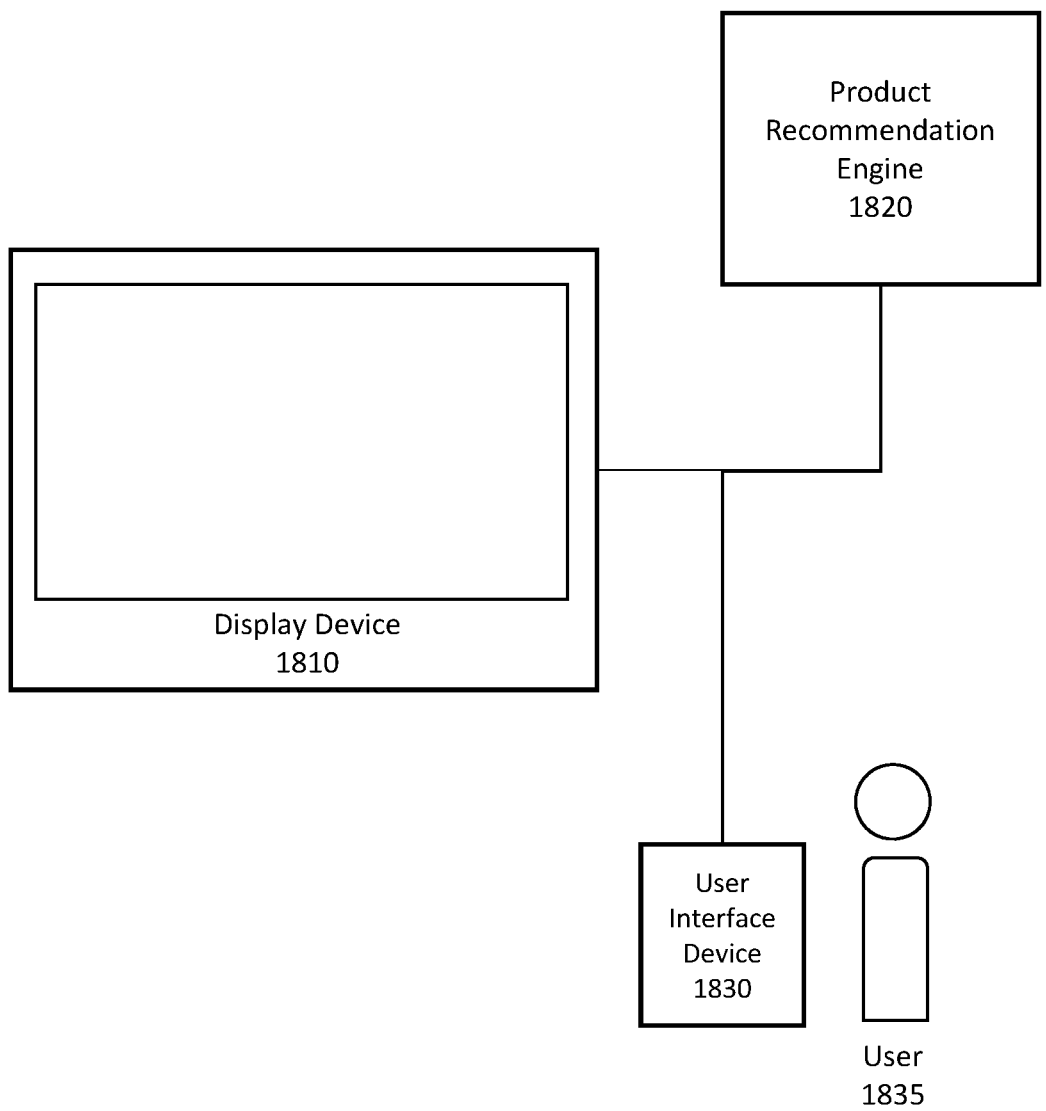
FIG. 18 comprises an illustration of a system as configured in accordance with various embodiments of these teachings.

Referring first to FIG. 18, a system for providing content-based product recommendations is shown. The system comprises a product recommendation engine 1820, a display device 1810, and a user interface device 1830 associated with a user 1835.

The display device 1810 may comprise a device configured to display video content to the user 1835. In some embodiments, the display device 1810 may comprise one or more of a television, a computer, a computer monitor, a mobile device, a wearable device, an immersive reality display device, an augmented reality display device, a virtual reality display device, and the like. In some embodiments, the display device 1810 may comprise a peripheral output device, a thin client, and/or a processor-based device. In some embodiments, the display device 1810 may comprise a smart TV with network connectivity. In some embodiments, the display device 1810 may be coupled to a content source such as a cable TV connection, a broadcast TV antenna, a set-top box, a DVD/Blue-ray player, a hard drive, a game console, the Internet, a social media service, a streaming video content provider, etc.

The product recommendation engine 1820 may comprise a processor-based device configured to recommend products to the user 1835 based on the content being viewed on the display device 1810. In some embodiments, the product recommendation engine 1820 may comprise a remote central server accessing a customer vector database and a product vector database to provide recommendations. In some embodiments, the product recommendation engine 1820 may be implemented as hardware and/or software modules on the display device 1810, the user interface device 1830, or another user device at the customer premise. For example, the product recommendation engine 1820 may be implemented on a voice command virtual assistance device, a set-top box, a smart home system, etc.

The user interface device 1830 may comprise a user device with user input/output devices. In some embodiments, the user interface device 1830 may comprise one or more of a computer, a mobile device, a wearable device, a smartphone, a laptop, a remote control, a microphone, etc. In some embodiments, the user interface device 1830 may be configured to allow the user to indicate an interest in an item being displayed in the video content. In some embodiments, the user interface device 1830 may be configured to display product recommendations from the product recommendation engine 1820 to the user. In some embodiments, the user interface device 1830 may provide a user interface for the user 1835 to configure various options of the product recommendation service. In some embodiments, a mobile application may be provided on the user interface device 1830 to provide one or more functions described herein. In some embodiments, the user interface device 1830 may comprise the display device 1810 or a second screen device to the display device 1810. In some embodiments, the user interface device 1830 may be configured to detect the content displayed on the display device 1810. For example, the user interface device 1830 may record audio and/or video snippets of the content being displayed to identify the content and the content segmented currently being view. In some embodiments, the user interface device 1830 may include the product recommendation engine 1820. In some embodiments, the user interface device 1830 may be optional, and the product recommendation engine 1820 may be configured to add recommended products to orders configured for the user without further user input. In some embodiments, the recommended products may be displayed on the display device 1810 along with the video content.

Figure 19:
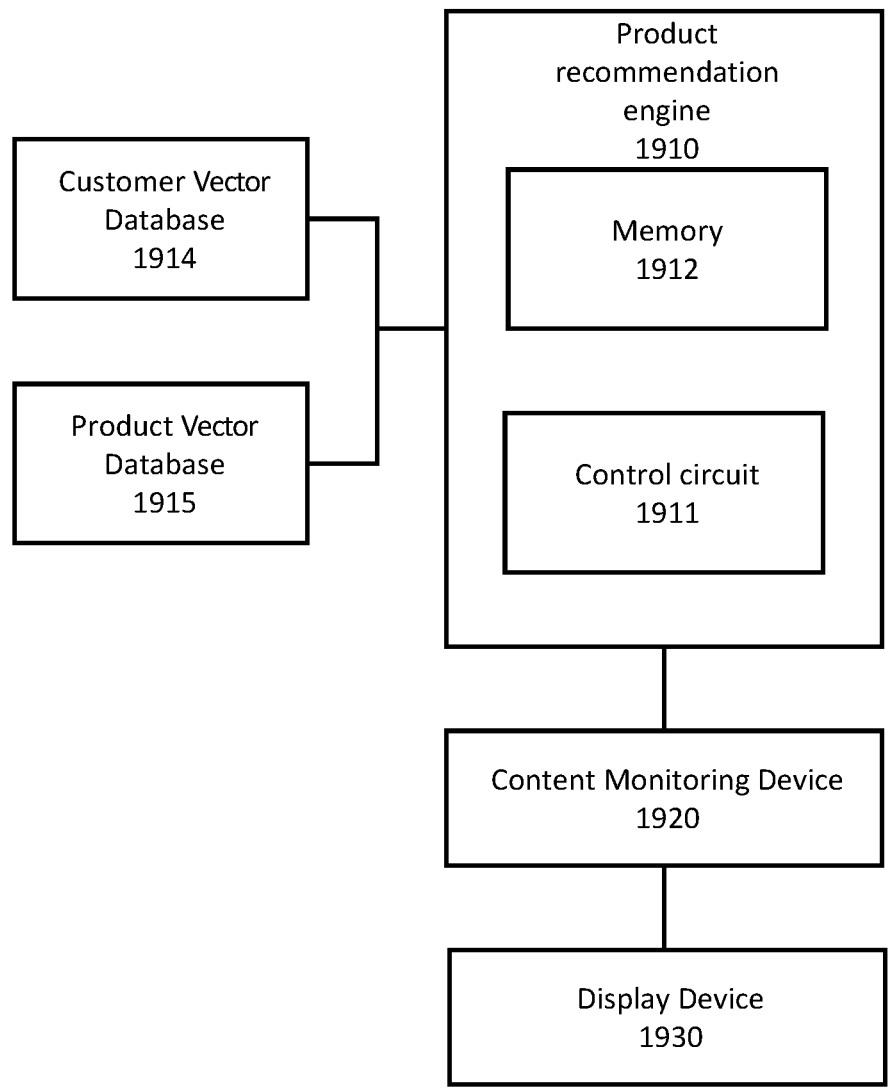
FIG. 19 comprises a block diagram as configured in accordance with various embodiments of these teachings.

Referring next to FIG. 19, a block diagram of a system according to some embodiments is shown. The system comprises a recommendation engine 1910, a customer vector database 1914, a product vector database 1915, a content monitoring device 1920, and a display device 1930.

The recommendation engine 1910 may comprise a processor-based system such as one or more of a server system, a computer system, a cloud-based server, a fulfillment center computer system, a personal computer, a user device, a portable user device, a smart television, and the like. In some embodiments, the recommendation engine 1910 may be implemented on one or more of the display device 1810, the product recommendation engine 1820, and the user interface device 1830 described with reference to FIG. 18 herein. The recommendation engine 1910 comprises a control circuit 1911 and a memory 1912. The control circuit 1911 may comprise a processor, a central processor unit, a microprocessor, and the like. The memory 1912 may include one or more of a volatile and/or non-volatile computer readable memory devices. In some embodiments, the memory 1912 stores computer executable codes that cause the control circuit 1911 to monitor the content being played on the display device 1930 via the content monitoring device 1920, select products based on the information in the customer vector database 1914 and the product vector database 1915, and recommend the products to the customer. In some embodiments, the control circuit 1911 may further be configured to update the customer vectors and customer locations in the customer vector database 1914 based on the content detected by the content monitoring device 1920. In some embodiments, computer executable code may cause the control circuit 1911 to perform one or more steps described with reference to FIG. 20 herein.

The display device 1930 may comprise a device configured to display video content to one or more viewers. In some embodiments, the display device 1810 may comprise one or more of a television, a computer, a computer monitor, a mobile device, a wearable device, an immersive reality display device, and the like. In some embodiments, the display device 1930 may comprise a peripheral display device, a thin client, and/or a processor-based device. In some embodiments, the display device may comprise a smart TV. In some embodiments, the display device 1810 may be coupled to a content source such as a cable TV connection, a broadcast TV antenna, a set-top box, a DVD/Blue-Ray player, a hard drive, a game console, the Internet, a social media server, a streaming video content provider, etc.

The content monitoring device 1920 may comprise a device configured to provide information about the content being viewed on the display device 1930 to the recommendation engine 1910. In some embodiments, the content monitoring device 1920 may be configured to capture information from the audio and/or video output of the display device 1930. For example, the content monitoring device 1920 may comprise a sound sensor of a user device configured to detect sound from the video content displayed on the display device 1930. The recommendation engine 1910 may then compare the captured audio with audio tracks of known content to identify the content being viewed. In some embodiments, the content monitoring device 1920 may be coupled to the video stream received at the display device 1930. For example, the content monitoring device may be coupled to one or more of a cable box, a video streaming device, and a network router. The video signal and/or metadata of the incoming video signal may then be used to identify the content being displayed. In some embodiments, the content monitoring device 1920 may be implemented on the display device 1930 and/or the recommendation engine 1910 or may comprise a separate device. In some embodiments, the content monitoring device 1920 may comprise a smart TV, a computer, or a mobile device running a content monitoring software module for detecting content being played on the same device.

The recommendation engine 1910 may be coupled to the customer vector database 1914 and/or the product vector database 1915 via one or more wired and/or wireless communication channels. The customer vector database 1914 may be configured store customer profiles for a plurality of customers. Each customer profile may comprise one or more of customer name, customer location(s), customer demographic information, and customer vectors. Customer vectors may comprise one or more of a customer value vectors, customer partiality vectors, customer preference vectors, customer affinity vectors, and customer aspiration vectors. In some embodiments, customer value vectors each comprises a magnitude that corresponds to the customer's belief in the good that comes from an order associated with that value. In some embodiments, customer vectors may each represent at least one of a person's values, preferences, affinities, and aspirations. In some embodiments, the customer vectors may be determined and/or updated based on one or more of customer purchase history, customer survey input, customer reviews, customer item return history, customer return comments, and video content viewed by the customer, etc. In some embodiments, customer vectors determined from a customer's purchase history in one or more product categories may be used to match the customer to a product in a category from which the customer has not previously made a purchase. For example, customer vectors determined from the customer's purchase of snacks and pet foods may indicate that the user values natural products. The customer vector and magnitude associated with natural products may then be used to match the user to products in the beauty and personal care categories.

The product vector database 1915 may store one or more profiles of products offered for sale. In some embodiments, the product profiles may associate vectorized product characterizations with products for sale. In some embodiments, the vectorized product characterizations may comprise one or more of vectors associated with customer values, preferences, affinities, and/or aspirations in reference to the products. For example, a product profile may comprise vectorized product value characterization that includes a magnitude that corresponds to how well the product aligns with a customer's cruelty-free value vector. In some embodiments, the vectorized product characterizations may be determined based on one or more of product packaging description, product ingredients list, product specification, brand reputation, and customer feedback. In some embodiments, the product vector database 1915 may store other information about the product, such as product price, product storage location, product availability, product origin location, product ingredients, etc.

While the customer vector database 1914 and the product vector database 1915 are shown to be outside the recommendation engine 1910 in FIG. 19, in some embodiments, the customer vector database 1914 and/or the product vector database 1915 may be implemented as part of the recommendation engine 1910 and/or the memory 1912 local to the recommendation engine 1910. In some embodiments, the customer vector database 1914 and/or the product vector database 1915 may comprise a server-based and/or cloud-based storage database accessible to the recommendation engine through a network connection. In some embodiments, the customer vector database 1914 and the product vector database 1915 comprise database structures that represent customer partialities and product characterizations, respectively, in vector form.

Figure 20:
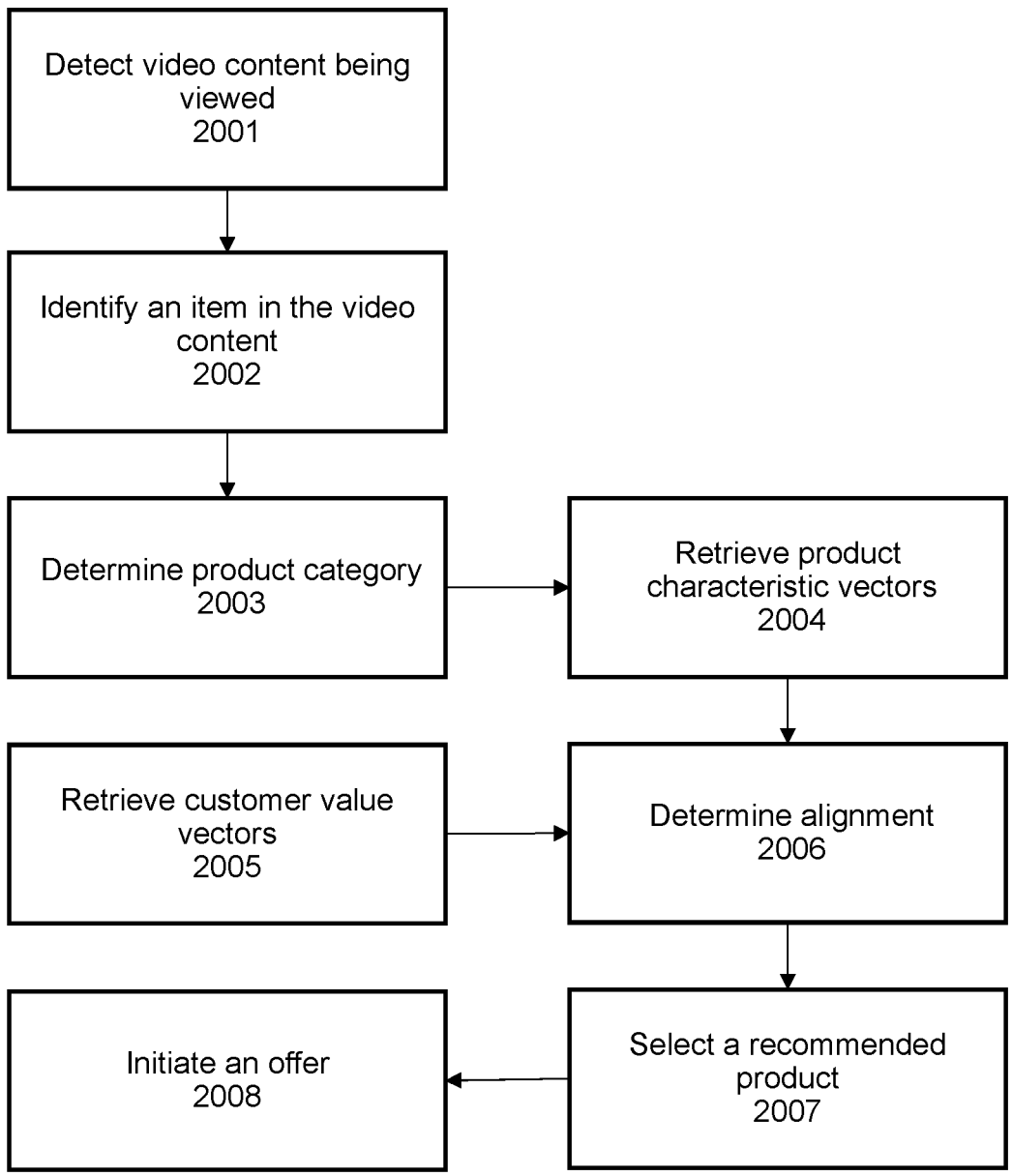
FIG. 20 comprises a flow diagram as configured in accordance with various embodiments of these teachings.

Referring next to FIG. 20, a method for providing content-based product recommendation according to some embodiments is shown. The steps in FIG. 20 may generally be performed by a processor-based device such as a central computer system, a server, a cloud-based server, a customer order management system, a personal computer, a user device, a smart TV, etc. In some embodiments, the steps in FIG. 20 may be performed by one or more of the display device 1810, the product recommendation engine 1820, the user interface device 1830 described with reference to FIG. 18, the recommendation engine 1910, the control circuit 1911, the display device 1930 described with reference to FIG. 19 herein, and/or other similar devices.

In step 2001, the system detects a video content being viewed by a user. In some embodiments, the display of the video content may be detected by a content monitoring device. In some embodiments, the content display device may comprise one or more of a television, a computer, a computer monitor, a mobile device, a wearable device, an immersive reality display device, and the like. In some embodiments, the display device may be coupled to a content source such as a cable TV connection, a broadcast TV antenna, a set-top box, a DVD/Blue Ray player, a hard drive, a game console, the Internet, a social media server, a streaming video content provider, etc. In some embodiments, the display device may comprise the display device 1810 described with reference to FIG. 1, the display device 1930 described with reference to FIG. 19 or a similar device.

The content monitoring device may comprise a device configured to collect information about the content being viewed. In some embodiments, the content monitoring device may be configured to capture information from the audio and/or video output of a display device. For example, the content monitoring device may comprise a sound sensor of a user device configured to detect sound from the video content displayed on the display device. In some embodiments, a content monitoring device may be coupled to the incoming video stream of the display device. For example, the content monitoring device may be coupled to one or more of a television input connector, a cable box, a video streaming device, and a network router. In some embodiments, the content monitoring device may be a separate device and/or be implemented on the display device. In some embodiments, the content monitoring device may comprise a smart TV, a computer, or a mobile device running a content monitoring software module for detecting content being played on the same device.

In step 2002, the system identifies an item associated with a current segment of the video content viewed by the user. In some embodiments, the system may be configured to first identify the content and/or content segment based on metadata, audio, and/or video analysis. In some embodiments, the system may be configured to identify an item selected by the user using one or more of a remote control of a content display device, a voice command sensor, and a user interface device. In some embodiments, the user interface device may comprise one or more of a computer, a mobile device, a wearable device, a smartphone, a laptop, a remote control, a microphone, etc. For example, the user may point to an object displayed on the display screen with a remote control and say "I want this." In another example, the user may open a mobile application and his/or her smartphone and press a button to indicate an interest for the displayed content. In some embodiments, the system may be configured to automatically identify items in the content being viewed without user input.

In some embodiments, the item associated with the current segment of the video content may be identified based on one or more of: metadata of the video content associated with the current segment, analysis of a caption text of the video content, audio analysis of an audio track of the video content, and object recognition analysis of the video content. In some embodiments, the metadata of the video content may specify one or more of the name of the content, a category associated with the content, actors/actresses associated with the content, items, and products associated with the content, locations associated with the content, etc. In some embodiments, the system may comprise a central video analysis system that analyzes video content viewed by one or more users for information about items displayed in the content and supply the information to a recommendation engine. In some embodiments, information about items may be embedded in the video content's metadata or provided as a separate file. In some embodiments, the video analysis may be performed at a user device such as a display device, a user interface device, and/or a home computer system. In some embodiments, the metadata may be timestamped to the content and be associated with one or more segments of the content. In some embodiments, video content metadata may be provided by the system, the recommendation engine, the content providers, and/or a third party video analysis service. In some embodiments, the system may compare metadata, audio, caption text, and image, associated with the item with products in a product database to identify the item. In some embodiments, the system may identify a specific product (e.g. Brand A, type C bath tissue), a product type (e.g. wood glue, hand saw), and/or one or more characteristic of a product (e.g. red tennis shoes, brown hat) in the video content.

In some embodiments, after steps 2001 and/or 2002, the system may be configured to update the customer vectors associated with the user in the customer vectors database based on one or more characteristics of the video content view by the user and/or the item. For example, if the customer repeatedly watches New England Patriots play in NFL games, the system may determine that the customer has an affinity to the Patriots. In another example, if a user watches nature documentaries the system may determine that the customer may value eco-friendly products.

In step 2003, the system determines a product category associated with the item identified in step 2002. In some embodiments, a product category may comprise a more generic description of the item and/or a categorical characteristic of the product. For example, if brand A genuine leather jacket is identified in the video content, the associated category may comprise leather jacket. In another example, if a bag of C brand pickle flavored potato chips is identified, the category may comprise potato chips and/or pickle flavored snack foods. In some embodiments, the identified item may itself comprise a category of items. For example, if eggs, olive oil, and black pepper are identified in a recipe described in a cooking show, the associated categories may be eggs, olive oil, and black pepper. In some embodiments, the product database may store categories and/or characteristics associated with different items and the system may determine the product categories associated with identified items based on the information stored in the product database. In some embodiments, products in a category may be determined based on keyword searches of the product name and/or description. In some embodiments, two or more categories may be selected for one identified item in step 2003.

In step 2004, the system retrieves product characteristic vectors associated with a plurality of products in the product category from the product vectors database. In some embodiments, the product profiles in the product vector database may associate vectorized product characterizations with products. In some embodiments, the vectorized product characterizations may comprise one or more of vectors associated with customer values, preferences, affinities, and/or aspirations in reference to the products. For example, a product profile may comprise vectorized product value characterization that includes a magnitude that corresponds to how well the product meets with a customer's cruelty-free value. In some embodiments, the vectorized product characterizations may be determined based on one or more of product packaging description, product ingredients list, product specification, brand reputation, and customer feedback. In some embodiments, vectorized product characteristics associated with products may be provided by the supplier, manually entered, and/or determined based on the product name or other identifiers, product packaging, product marking, product brand, advertisements of the product, and/or customer purchase history associated with the product.

In step 2005, the system retrieves customer value vectors associated with the user from the customer vectors database. Customer vectors may comprise one or more of a customer value vectors, customer partiality vectors, customer preference vectors, customer affinity vectors, and customer aspiration vectors. In some embodiments, customer vectors may each represent at least one of a person's values, preferences, affinities, and aspirations. In some embodiments, the customer vectors may be determined and/or updated based on one or more of customer purchase history, customer survey input, customer reviews, customer item return history, customer return comments, and video content viewed by the customer, etc. In some embodiments, customer vectors determined from a customer's purchase history in one or more product categories may be used to match the customer to a product in a category from which the customer has not previously made a purchase.

In step 2006, the system determines an alignment between the customer vectors and product vectors associated with a plurality of products in the category. For example, if the category identified in step 2003 corresponds to olive oils, the system may compare customer vectors and product vectors associated with different types and brands of olive oils offered for sale. In some embodiments, the alignment between a product and the customer may be determined by adding, subtracting, multiplying, and/or dividing the magnitudes of the corresponding vectors in the customer vectors and product characterization vectors. In some embodiments, alignment scores for each vector may be added and/or averaged to determine an overall customer alignment score for a product. In some embodiments, the system may only consider the prominent vectors (e.g. high magnitude vectors) associated with the customer in determining the alignment in step 2005.

In step 2007, the system selects a recommended product from a plurality of products based on the alignments between the customer value vectors and the product characteristic vectors for each of the plurality of products. In some embodiments, the item selected may correspond to the item with the highest alignment to the customer vectors. In some embodiments, the system may further consider other factors such as the customer's home inventory, the customer's recent purchases, item availability, item ship time, item location, etc. In some embodiments, a recommended product that does not exactly matched the item detected in step 2002 may be selected in step 2007. In some embodiments, the recommended product may comprise an alternative product that better matches the customer's values, based on value vector analysis. In some embodiments, the recommended product may comprise a product type or brand not previously purchased by the customer.

In step 2008, the system initiates an offer of the recommended product to the customer. In some embodiments, the system may be configured to cause a product ordering user interface for the recommended product to be displayed on a user interface device to the user. In some embodiments, the recommendation may be displayed on the display device displaying the content. For example, the recommendation may be displayed as an overlay of the video content. The user may select and interact with the overlay with a remote control and/or through the user interface of the display device. In some embodiments, the recommendation may be displayed via a mobile application or a web page on a user device separate from the display device. In some embodiments, the system may add the product to a recommended products list and/or a virtual shopping cart associated with the user's user account. In some embodiments, the system may be the configured to add the recommended product to an automatic delivery service shipment for the user. For example, the user may subscribe to a subscription box and/or a reoccurring delivery service with which the customer is only billed for items they keep. The system may then initiate the offering of the recommended product by adding the product to the next delivery order for the customer. For example, if the customer indicates an interest in beef jerky, the system may select a particular brand of beef jerky based on the customer's value vectors, and automatically send the selected beef jerky the customer to try. In some embodiments, steps 2001-2008 may be repeated as a customer views a video content and/or when a customer indicates an interest in an item in the video content.

In some embodiments, the system described herein provides a seamless product ordering process to the customer. A customer may watch a cooking show and click to order the ingredients. By using the intelligence of the connected device, such as a Smart TV, the system may recognize that the customer wishes to order the ingredients he saw the chef prepare on TV. The system can also use the customer value vectors to pick a variant of the recipe ingredients for the customer. For example, the system may select between using whole wheat vs. bleached flour or fresh vs. frozen vegetables using customer vectors.

In some embodiments, a customer watching TV may choose to investigate items he sees. When a customer sees something of interest, the customer may point the remote at an item and clicks. The system may then provide a popup insert on the screen. In some embodiments, the system may also display item parameters to the customer. In some embodiments, the system may use the customer's value vectors to offer an altered version of the product (e.g. type of fiber; manufacture location, color, print). In some embodiments, the system may allow a customer to order a recipe after watching it on TV using a Smart TV application.

In some embodiments, a system for content-based product recommendations comprises a content monitoring device configured to monitor video content viewed by a user, a customer vectors database storing customer vectors associated with a plurality of customers, a product vectors database, and a control circuit coupled to the customer vectors database and the product vectors database, the control circuit being configured to detect, via the content monitoring device, a video content being viewed by the user, identify an item associated with a current segment of the video content viewed by the user, determine a product category associated with the item, retrieve product characteristic vectors associated with a plurality of products in the product category from the product vectors database, retrieve customer value vectors associated with the user from the customer vectors database, determine alignments between the customer value vectors and the product characteristic vectors for each of the plurality of products in the product category, select a recommended product from the plurality of products based on the alignments between the customer value vectors and the product characteristic vectors for each of the plurality of products, and initiate an offer of the recommended product to the customer.

In one embodiment, a method for content-based product recommendation comprises detecting, via a content monitoring device configured to monitor video contents viewed by a user, a video content being viewed by the user, identifying, with a control circuit, an item associated with a current segment of the video content viewed by the user, determining, with the control circuit, a product category associated with the item, retrieving product characteristic vectors associated with a plurality of products in the product category from a product vectors database, retrieving customer value vectors associated with the user from a customer vectors database storing customer vectors associated with a plurality of customers, determining, with the control circuit, alignments between the customer value vectors and the product characteristic vectors for each of the plurality of products in the product category, selecting, with the control circuit, a recommended product from the plurality of products based on the alignments between the customer value vectors and the product characteristic vectors for each of the plurality of products, and initiating, with the control circuit, an offer of the recommended product to the customer.

In one embodiment, an apparatus for content-based product recommendation comprises a non-transitory storage medium storing a set of computer readable instructions, and a control circuit configured to execute the set of computer readable instructions which causes to the control circuit to: detect, via a content monitoring device configured to monitor video contents viewed by a user, a video content being viewed by the user, identify, with the control circuit, an item associated with a current segment of the video content viewed by the user, determine, with the control circuit, a product category associated with the item, retrieve product characteristic vectors associated with a plurality of products in the product category from a product vectors database, retrieve customer value vectors associated with the user from a customer vectors database storing customer vectors associated with a plurality of customers, determine, with the control circuit, alignments between the customer value vectors and the product characteristic vectors for each of the plurality of products in the product category, select a recommended product from the plurality of products based on the alignments between the customer value vectors and the product characteristic vectors for each of the plurality of products, and initiating an offer of the recommended product to the customer.

In some embodiments, apparatuses and methods are provided herein useful to facilitate the purchase of licensable content related to a product of interest. In one embodiment, a system includes a first user interface, a second user interface, a database of retail products, a database of pieces of licensable content related to the retail products, and a control circuit. By one approach, the control circuit is configured to identify a retail product to be purchased by the user, identify one or more pieces of licensable content related to the retail product, offer for purchase by the user a related piece of licensable content from the one or more pieces of licensable content related to the retail product, verify that the user purchased the related piece of licensable content, and provide the related piece of licensable content to the user.

Figure 21:
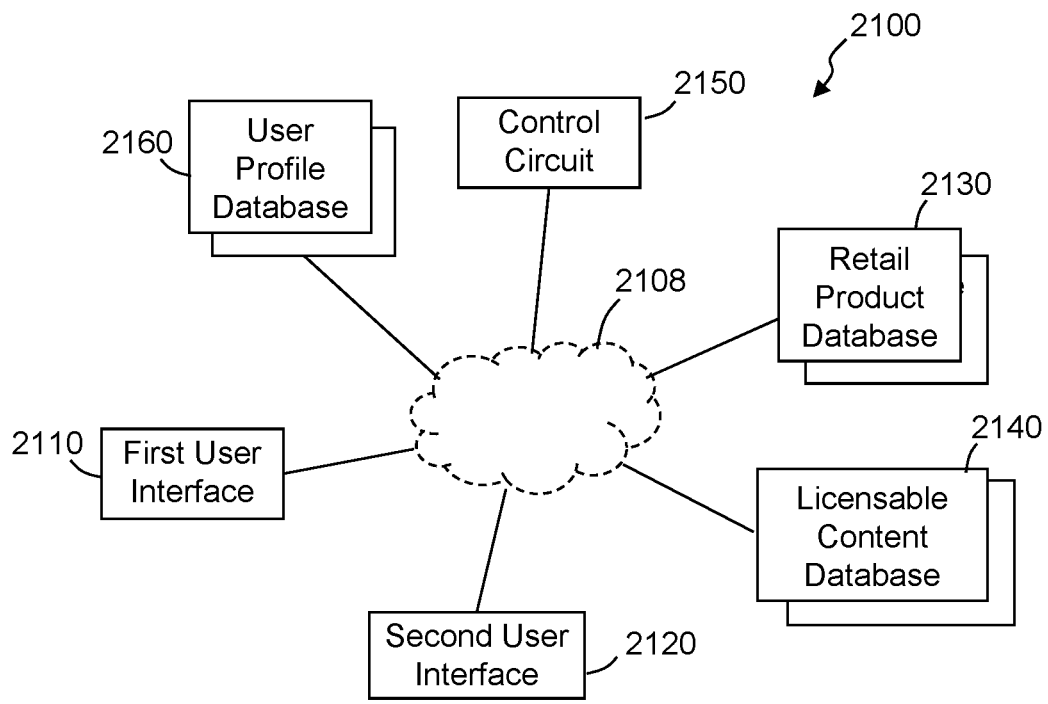
FIG. 21 is schematic diagram in accordance with some embodiments.

FIG. 21 illustrates a simplified block diagram of an exemplary system 2100, according to some embodiments, which facilitates the purchase of licensable content related to a product of interest to a customer.

The system 2100 includes a first user interface 2110, a second user interface 2120, a retail product database 2130 comprising retail products, and a licensable content database 2140 comprising pieces of licensable content related to the retail products. In some approaches, the retail product database 2130 and/or the licensable content database 2140 may include identified vectorized product characterizations or product vectors (which may be similar to the library 511 or the memory 1303 with vectorized characterizations 1304 for products 1305) for at least some of the retail products and/or at least some of the pieces of licensable content, respectively.

The system 2100 further comprises a central computer or a central computer or control circuit 2150 (which may be similar to other control circuits discussed herein). The control circuit 2150 is operatively coupled to the first user interface 2110, the second user interface 2120, the retail product database 2130, and licensable content database 2140. In some approaches, the control circuit 2150 may be configured to identify a retail product to be purchased by the user via the first user interface 2110. The control circuit 2150 is further configured to identify one or more pieces of licensable content related to the identified retail product.

In some approaches, the control circuit 2150 is configured to access the retail product database 2130 and the licensable content database 2140 and identify one or more suggested pieces of licensable content for a particular customer based, in part, on comparisons between the identified vectorized product characterizations of the retail products and the identified vectorized product characterizations of the pieces of licensable content. In some approaches, the control circuit 2150 may be configured to prompt the customer, via the first user interface 2110 or second user interface 2120, to answer one or more questions to assist the control circuit 2150 in tailoring the suggested pieces of licensable content to the customer's preferences.

In some approaches, the system 2100 may further include a user profile database 2160 (which may be similar to the memory 1306 of the vectorized characterizations 1307 of individual persons 1308), which may include a purchase history for the user and one or more identified partialities associated with the customers or users therein. By one approach, the control circuit 2150 may be configured to access the user profile database 2160 and identify one or more suggested pieces of licensable content for a particular customer based, in part, on comparisons between the identified partialities for that customer in their user profile and the identified vectorized product characterizations of the pieces of the licensable content.

Once the control circuit 2150 identifies one or more pieces of licensable content related to retail product of interest to the customer, the control circuit 2150 is configured to offer to the customer the option of purchasing a license to a related piece of licensable content. In some approaches, the offer to purchase a license to the related piece of licensable content may be displayed to the customer via the first user interface 2110. In some approaches, the offer to purchase a license to the related piece of licensable content may be displayed to the customer via the second user interface 2120. In both approaches, the control circuit 2150 then verifies whether the customer purchased the related piece of licensable content that was offered, and provides the purchased licensable content to the customer via the second user interface 2120.

One or both of the first user interface 2110 and the second user interface 2120 may allow a user to interact with the system 2100 and provide and/or receive information through the system 2100. In some instances, the first user interface 2110 and/or the second user interface 2120 may include a display and/or one or more user inputs, such as a buttons, touch screen, track ball, keyboard, mouse, etc., which can be part of or wired or wirelessly coupled with the system 2100. The first user interface 2110 and/or the second user interface 2120 may be displayed on any electronic device capable of displaying a user interface. For example, the electronic device comprise any mobile phone, tablet, laptop computer, desktop computer, gaming console, handheld communication and/or computing device, or the like, which may comprise additional hardware and/or software to facilitate identification of the retail product to be purchased by a user. In some approaches, the first user interface 2110 and/or the second user interface 2120 may be part of an in-store kiosk, which may also include additional components, such as, for example, a barcode reader, an image scanner, and/or any component that allows direct entry of information by either a store worker or a customer.

In some approaches, the first user interface 2110 and the second user interface 2120 may be displayed on the same electronic device. In one approach, the first user interface 2110 and the second user interface 2120 may be displayed on the same remote electronic device that is not affiliated with the retail facility or retailer. In some approaches, the first user interface 2110 and the second user interface 2120 may be displayed on different electronic devices. In one illustrative example, the first user interface 2110 may be displayed on a point of sale unit in a retail facility and the second user interface 2120 may be displayed on a remote electronic device that is not affiliated with the retail facility or retailer. In another illustrative example, the first user interface 2110 may be displayed on a first remote electronic device and the second user interface 2120 may be displayed on a second remote electronic device that is different from the first remote electronic device.

In one illustrative example, a customer may scan a retail product of interest using the customer's mobile device while browsing in the retail facility. In another example, the customer may scan the retail product during purchase of the retail product at an in-store self-service checkout kiosk, or a store worker may scan the retail product during purchase of the product at an in-store full-service checkout kiosk. In yet another example, the customer may select a retail product for purchase remotely from the retailer via an application or web-based browser on the customer's mobile device, tablet, personal computer, or gaming console. In each approach, the control circuit 2150 identifies one or more pieces of licensable content related to the retail product of interest, as described above, and offers the related licensable content to the customer for purchase during or after the purchase transaction of the retail product.

The offer to purchase the related licensable content may be made to the customer via the same user interface in which the purchase transaction of the retail product was facilitated, or the offer may be made via different user interface. For example, the customer may purchase the retail product at an in-store self-service kiosk in the retail facility. In such a case, a related piece of licensable content may be offered to the customer via the same in-store self-service kiosk during the purchase transaction of the retail product, or the offer may be made to customer via an application or web-based browser on the customer's mobile device, tablet, personal computer, or gaming console after the purchase transaction of the retail product is complete. In cases where the customer purchases the retail product via an application or web-based browser on the customer's mobile device, tablet, personal computer, or gaming console, the related piece of licensable content may be offered to the customer via the same application or web-based browser on the same electronic device that was used to purchase the retail product, or the offer may be made to the customer via different an application or web-based browser on an electronic device.

The customer may then select the piece of licensable content for purchase. The control circuit 2150 verifies the purchase, then provides the purchased licensable content to the customer. The purchased content may be provided to the customer directly or indirectly via the second user interface 2120. In some approaches the control circuit 2150 may prompt the customer to select a preferred method, user interface, and/or electronic device onto which the purchased licensed content may be downloaded, displayed, or otherwise accessed by the customer.

In one approach, the control circuit 2150 may be configured to offer for purchase a plurality of pieces of licensable content related to the retail product of interest to the customer. In such a case, the control circuit 2150 may obtain from the user a selection indicating one or more related pieces of licensable content to be purchased by the user. In some approaches, the one or more pieces of licensable content offered to a particular customer during a first purchase transaction may be different from one or more pieces of licensable content offered to the customer during a second purchase transaction such that different pieces of licensable content may be offered to the customer during successive purchase transaction of the same or different retail products.

In some approaches, the control circuit 2150 may provide the customer with an option to customize one or more pieces of related licensable content selected for purchase by the customer. For example, the customer may modify or customize the licensable content using an online or application-based editing tool.

In some approaches, the licensable content may comprise any content in a digital form. Examples of licensable content may include, but are not limited to, music files, video files, software, mobile applications, games, and the like. In some approaches, the retail product may be in a first form and the related piece of licensable content may be in a second form that is different from the first form. In one illustrative example, the retail product may have a physical or structural form, such as, for example, a toy, doll, or an action figure, and the licensable content may be in a digital form, and may comprise, for example, music files, video files, software, mobile applications, and/or games related to the physical retail product. In some approaches, the licensable content may be exclusively available from, and/or may be customized for, a specific retailer.

In one approach, the user profiles in the user profile database 2160 may include a purchase history. Further, in one approach, the purchased retail products and/or pieces of licensable content have vectorized product characterization associated therewith that impact the partialities associated with the user in the user profile. Accordingly, in one approach, the control circuit 2150 is configured to identify the one or more suggested pieces of licensable content based, in part, on the purchase history of a particular customer.

As used herein the system 2100 may be implemented at a number of retail facilities or by an online retailer, and the control circuit 2150 may be configured to update the user profile database 2160 according to purchases at multiple retail facilities or purchases made online or by phone. As noted above, the partialities may be represented by partiality vectors and can include values, preferences, and affinities. Further, as suggested above, the system 2100 may identify user partialities using data obtained from other sources outside of a customer's purchase history. For example, partialities may be identified based on calendar appointments, charitable donations, age, and profession, among many others. Accordingly, the user profile database 2160 may be updated according to the partialities identified outside of the purchase history.

Given the information in the retail product database 2130, the licensable content database 2140, and the user profile database 2160, the control circuit 2150, in one approach, is configured to analyze the partiality vectors and the vectorized product (including licensable content) characterizations and identify overlap therebetween. The suggested licensable content may be determined based on this overlap. In this manner, the suggested licensable content for a given customer may change based on changes in the user and product and/or licensable content databases. For example, a change to the product and/or licensable content databases or the user profile database, may result in the different suggested items for a particular customer.

Furthermore, the control circuit may be configured to update the one or more partialities for a given customer in the user profile database 2160 based, in part, on the particular customer selecting and/or rejecting one or more suggested pieces of licensable content. In one illustrative approach, the system may update the user profile and the user's partialities associated with the particular customer based, in part, on retail products and/or pieces of licensable content purchased by the particular customer and the vectorized product characterizations associated with the purchased retail products and the pieces of licensable content.

As illustrated in FIG. 21, the control circuit 2150, the first user interface 2110, the second user interface 2120, the retail product database 2130, the licensable content database 2140, and the user profile database 2160, if present, if present, may be communicatively coupled, either directly or indirectly, such as over one or more distributed communication networks 2108, which may include, for example, LAN, WAN, Internet, cellular, Wi-Fi, and other such communication networks or combinations of two or more of such networks.

Figure 22:
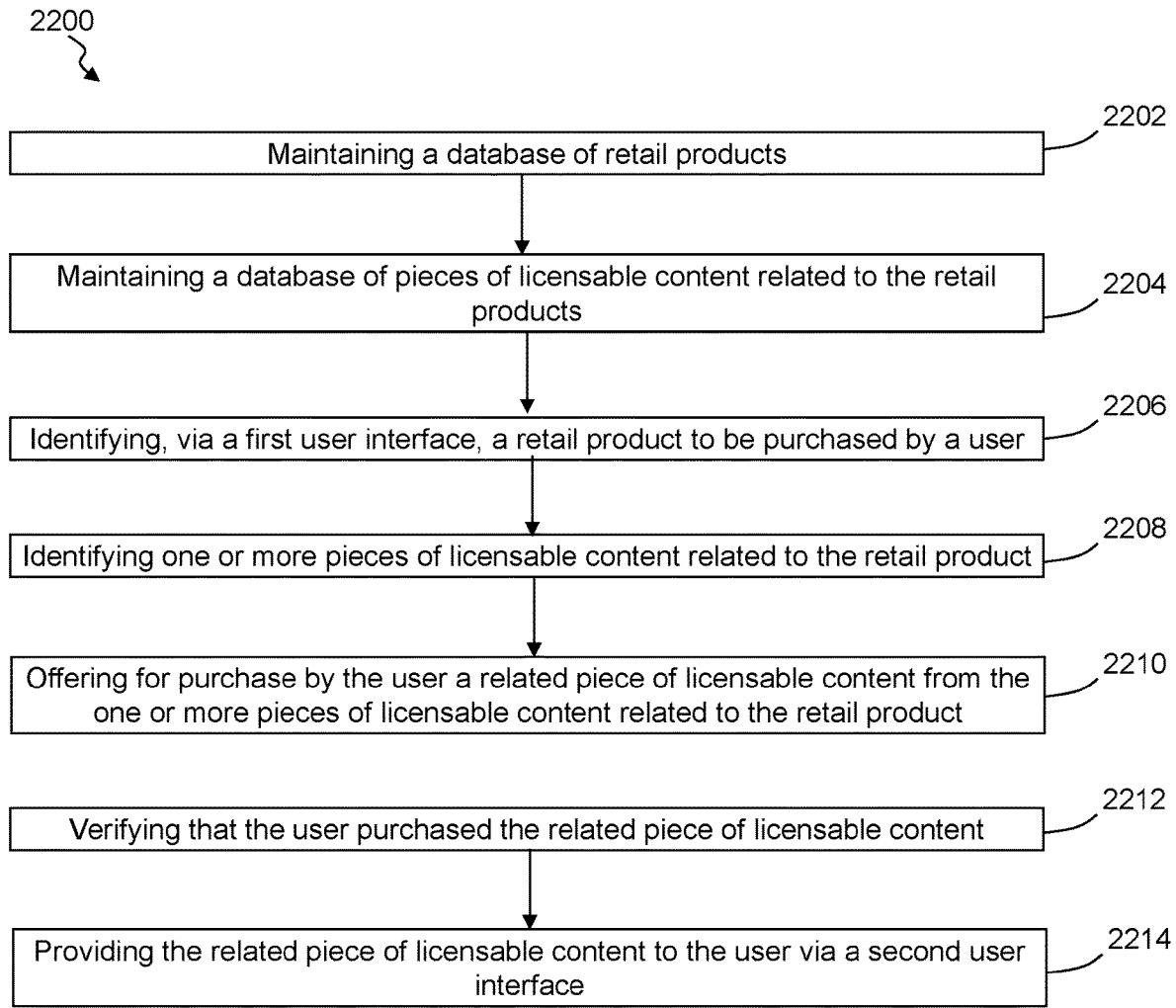
FIG. 22 is a flow diagram in accordance with some embodiments.

Referring now to FIG. 22, a process 2200 for facilitating the licensing of content related to a product of interest to a customer according to some embodiments discussed herein is illustrated. The method 2200 includes, for example, maintaining 2202 a retail product database comprising one or more retail products. In one illustrative approach, a particular retail product in the retail product database may have numerous vectorized product characterizations associated therewith.

The method 2200 further includes maintaining 2204 a licensable content database with pieces of licensable content related to the retail products, at least some of the pieces of licensable content having vectorized product characterizations. In one illustrative approach, a particular piece of licensable content in the licensable content database may have numerous vectorized product characterizations associated therewith.

As noted above, in some approaches, the licensable content may comprise any content in a digital form. Examples of licensable content may include, but are not limited to, music files, video files, software, mobile applications, games, and the like. In some approaches, the retail product may be in a first form and the related piece of licensable content may be in a second form that is different from the first form. In one approach, the licensable content may be exclusively available from, and/or may be customized for, a specific retailer.

In step 2206, the method includes identifying, via a first user interface, a retail product to be purchased by a user. In one illustrative example, a customer may scan a retail product of interest using the customer's mobile device while browsing in the retail facility. In another example, the customer may scan the retail product during purchase of the retail product at an in-store self-service checkout kiosk, or a store worker may scan the retail product during purchase of the product at an in-store full-service checkout kiosk. In yet another example, the customer may select a retail product for purchase remotely from the retailer via an application or web-based browser on the customer's mobile device, tablet, personal computer, or gaming console.

In step 2208, the method includes identifying one or more pieces of licensable content related to the retail product. In some approaches, the one or more suggested pieces of licensable content may be identified for a particular customer based, in part, on comparisons between the identified vectorized product characterizations of the retail products and the identified vectorized product characterizations of the pieces of licensable content. In some approaches, the method may include prompting the customer to answer one or more questions to assist in tailoring the suggested pieces of licensable content to the customer's preferences.

In some approaches, the method may include maintaining a database of user profiles, the user profiles having a purchase history and one or more identified partialities associated therewith, and identifying one or more suggested pieces of licensable content for a particular user based, in part, on comparisons between the identified partialities of the user profile associated with the particular user and identified vectorized product characterizations of the pieces of licensable content In step 2210, the method may include offering for purchase by the user a related piece of licensable content from the one or more pieces of licensable content related to the retail product. The offer to purchase the related licensable content may be made to the customer via the same user interface in which the purchase transaction of the retail product was facilitated, or the offer may be made via a different user interface. For example, the customer may purchase the retail product at an in-store self-service kiosk in the retail facility. In such a case, a related piece of licensable content may be offered to the customer via the same in-store self-service kiosk during the purchase transaction of the retail product, or the offer may be made to customer via an application or web-based browser on the customer's mobile device, tablet, personal computer, or gaming console after the purchase transaction of the retail product is complete. In cases where the customer purchases the retail product via an application or web-based browser on the customer's mobile device, tablet, personal computer, or gaming console, a related piece of licensable content may be offered to the customer via the same application or web-based browser on the same electronic device that was used to purchase the retail product, or the offer may be made to the customer via different an application or web-based browser on an electronic device.

In some approaches, the method may include offering for purchase a plurality of pieces of licensable content related to the retail product of interest to the customer. In such a case, the user may be prompted to make a selection indicating one or more related pieces of licensable content to be purchased by the user. In some approaches, the one or more pieces of licensable content offered to a particular customer during a first purchase transaction may be different from one or more pieces of licensable content offered to the customer during a second purchase transaction such that different pieces of licensable content may be offered to the customer during successive purchase transaction of the same or different retail products.

In some approaches, the method may further include providing the customer with an option to customize one or more pieces of licensable content selected for purchase. For example, the customer may modify or customize the licensable content using an online or application-based editing tool.

In step 2212, the method includes verifying that the user purchased the related piece of licensable content.

In step 2214, the method includes providing the related piece of licensable content to the user via a second user interface. The purchased content may be provided to the customer directly or indirectly. In some approaches the method may further include prompting the customer to select a preferred method, user interface, and/or electronic device onto which the purchased licensed content may be downloaded, displayed, or otherwise accessed by the customer.

As noted above, in some approaches, the first user interface and the second user interface may be displayed on the same electronic device. In one approach, the first user interface and the second user interface may be displayed on the same remote electronic device that is not affiliated with the retail facility or retailer. In some approaches, the first user interface and the second user interface may be displayed on different electronic devices. In one illustrative example, the first user interface may be displayed on a point of sale unit in a retail facility and the second user interface may be displayed on a remote electronic device that is not affiliated with the retail facility or retailer. In another illustrative example, the first user interface may be displayed on a first remote electronic device and the second user interface may be displayed on a second remote electronic device that is different from the first remote electronic device.

In one embodiment, a system useful for facilitating the purchase of licensable content related to a product of interest includes: a first user interface; a second user interface; a database of retail products; a database of pieces of licensable content related to the retail products; and a control circuit operatively coupled to the first user interface, the second user interface, the database of retail products, and the database of pieces of licensable content, the control circuit configured to: identify, via the first user interface, a retail product to be purchased by the user; identify one or more pieces of licensable content related to the retail product; offer for purchase by the user a related piece of licensable content from the one or more pieces of licensable content related to the retail product; verify that the user purchased the related piece of licensable content; and provide the related piece of licensable content to the user via the second user interface.

In one embodiment, a method useful for facilitating the purchase of licensable content related to a product of interest includes: maintaining a database of retail products; maintaining a database of pieces of licensable content related to the retail products; identifying, via a first user interface, a retail product to be purchased by a user; identifying one or more pieces of licensable content related to the retail product; offering for purchase by the user a related piece of licensable content from the one or more pieces of licensable content related to the retail product; verifying that the user purchased the related piece of licensable content; and providing the related piece of licensable content to the user via a second user interface.

In some embodiments, a system comprises a first user interface, a second user interface; a database of retail products, a database of pieces of licensable content related to the retail products, and a control circuit operatively coupled to the first user interface, the second user interface, the database of retail products, and the database of pieces of licensable content. The control circuit configured to: identify, via the first user interface, a retail product to be purchased by a user, identify one or more pieces of licensable content related to the retail product, offer for purchase by the user a related piece of licensable content from the one or more pieces of licensable content related to the retail product, verify that the user purchased the related piece of licensable content, and provide the related piece of licensable content to the user via the second user interface.

In some embodiments, the retail product is in a first form and the related piece of licensable content is in a second form that is different from the first form. In some embodiments the related piece of licensable content is in digital form. In some embodiments, the first user interface is displayed on a point of sale unit in a retail facility and the second user interface is displayed on a remote electronic device. In some embodiments, the first user interface is displayed on a first remote electronic device and the second user interface is displayed on a second remote electronic device that is different from the first remote electronic device. In some embodiments, the first user interface and the second user interface are displayed on the same remote electronic device. In some embodiments, the control circuit is configured to offer for purchase a plurality of pieces of licensable content related to the retail product, and the control circuit obtains from the user a selection indicating one or more related pieces of licensable content to be purchased by the user from the plurality of pieces of licensable content. In some embodiments, the control circuit provides the user with an option to customize the related piece of licensable content. In some embodiments, the system further comprises a database comprising user profiles, the user profiles having a purchase history and one or more identified partialities associated therewith, wherein the database of pieces of licensable content includes identified product vectors for at least some of the pieces of licensable content, and the control circuit is configured to identify one or more suggested pieces of licensable content for a particular user based, in part, on comparisons between the identified partialities of the user profile associated with the particular user and the identified product vectors of the pieces of licensable content. In some embodiments, the related piece of licensable content offered during a first purchase transaction is different from a related piece of licensable content offered during a second purchase transaction.

In some embodiments, a method comprises maintaining a database of retail products, maintaining a database of pieces of licensable content related to the retail products, identifying, via a first user interface, a retail product to be purchased by a user, identifying one or more pieces of licensable content related to the retail product, offering for purchase by the user a related piece of licensable content from the one or more pieces of licensable content related to the retail product, verifying that the user purchased the related piece of licensable content, and providing the related piece of licensable content to the user via a second user interface.

In some embodiments, the retail product is in a first form and the related piece of licensable content is in a second form that is different from the first form. In some embodiments, the related piece of licensable content is in digital form. In some embodiments, the first user interface is displayed on a point of sale unit in a retail facility and the second user interface is displayed on a remote electronic device. In some embodiments, the first user interface is displayed on a first remote electronic device and the second user interface is displayed on a second remote electronic device that is different from the first remote electronic device. In some embodiments, the first user interface and the second user interface are displayed on the same remote electronic device. In some embodiments, the offering for purchase by the user comprises offering for purchase a plurality of pieces of licensable content related to the retail product and obtaining from the user a selection indicating one or more related pieces of licensable content to be purchased by the user from the plurality of pieces of licensable content. In some embodiments, the method further comprises providing the user with an option to customize the related piece of licensable content. In some embodiments, the method further comprises maintaining a database of user profiles, the user profiles having a purchase history and one or more identified partialities associated therewith, wherein the database of pieces of licensable content includes identified product vectors for at least some of the pieces of licensable content, and identifying one or more suggested pieces of licensable content for a particular user based, in part, on comparisons between the identified partialities of the user profile associated with the particular user and identified vectorized product characterizations of the pieces of licensable content. In some embodiments, the related piece of licensable content offered during a first purchase transaction is different from a related piece of licensable content offered during a second purchase transaction.

In some embodiments, a control circuit is provided that automatically detects when a customer is interested in a particular product (for example, by detecting when that customer gazes at an image of that product) and then determines when that particular product is a product for which one or more vectorized characterizations are available. When true, these teachings then provide for using those vectorized characterizations in comparison to one or more partiality vectors for this particular customer to determine whether to automatically present the customer with an opportunity to purchase the particular product while the product remains within a field of view of the customer.

The present teachings provide generally for automatically detecting when a customer is interested in a particular product (for example, by detecting when that customer gazes at an image of that product) and then determining when that particular product is a product for which one or more vectorized characterizations are available. When true, these teachings then provide for using those vectorized characterizations in comparison to one or more partiality vectors for this particular customer to determine whether to automatically present the customer with an opportunity to purchase the particular product while the product remains within a field of view of the customer.

These teachings are highly flexible in practice and will accommodate a variety of embellishments and/or modifications. By one approach, for example, the image of the particular product constitutes real-world content being provided by a camera (such as a camera that comprises a part of a smartphone or tablet/pad-styled computer). By another approach, the image of the particular product comprises a still-image that appears on a web site being visited by the customer.

The aforementioned purchasing opportunity can comprise, by one approach, an opportunity-presentation window that is presented within a display in close proximity to the image/view of the product. The opportunity-presentation window can present textual and/or non-textual information regarding the product and/or its purchase and can further present, for example, a user-assertable button or the like by which the customer can effect a purchase and delivery of the product.

If desired, the purchasing opportunity can further include an indication of a degree to which the customer's relevant partiality vectors align with the characterizing vectors for this particular product. Using this approach a customer can be quickly, easily, and intuitively informed as to how well (or poorly) a particular viewed product aligns with their own partialities.

These teachings can be applied, if desired, within the confines of a physical retail shopping facility. In this case, these teachings can conveniently supplement a customer's purposeful shopping experience. These teachings can also be applied, however, in a non-shopping context. For example, while the customer simply browses the Internet viewing informational websites, social networking websites, and so forth. As another example, these teachings can be used either purposefully at a moment of need or as a background task while the customer conducts other activities, such as capturing a digital photograph or a digital video with their camera-equipped smartphone or when playing an augmented reality game such as Pokémon Go.

These benefits and others will become more apparent upon making a thorough study of the following detailed description of various approaches in the foregoing regards.

To begin, it may be helpful to first describe in more detail the aforementioned customer partiality vectors and product characterization vectors.

Figure 23:
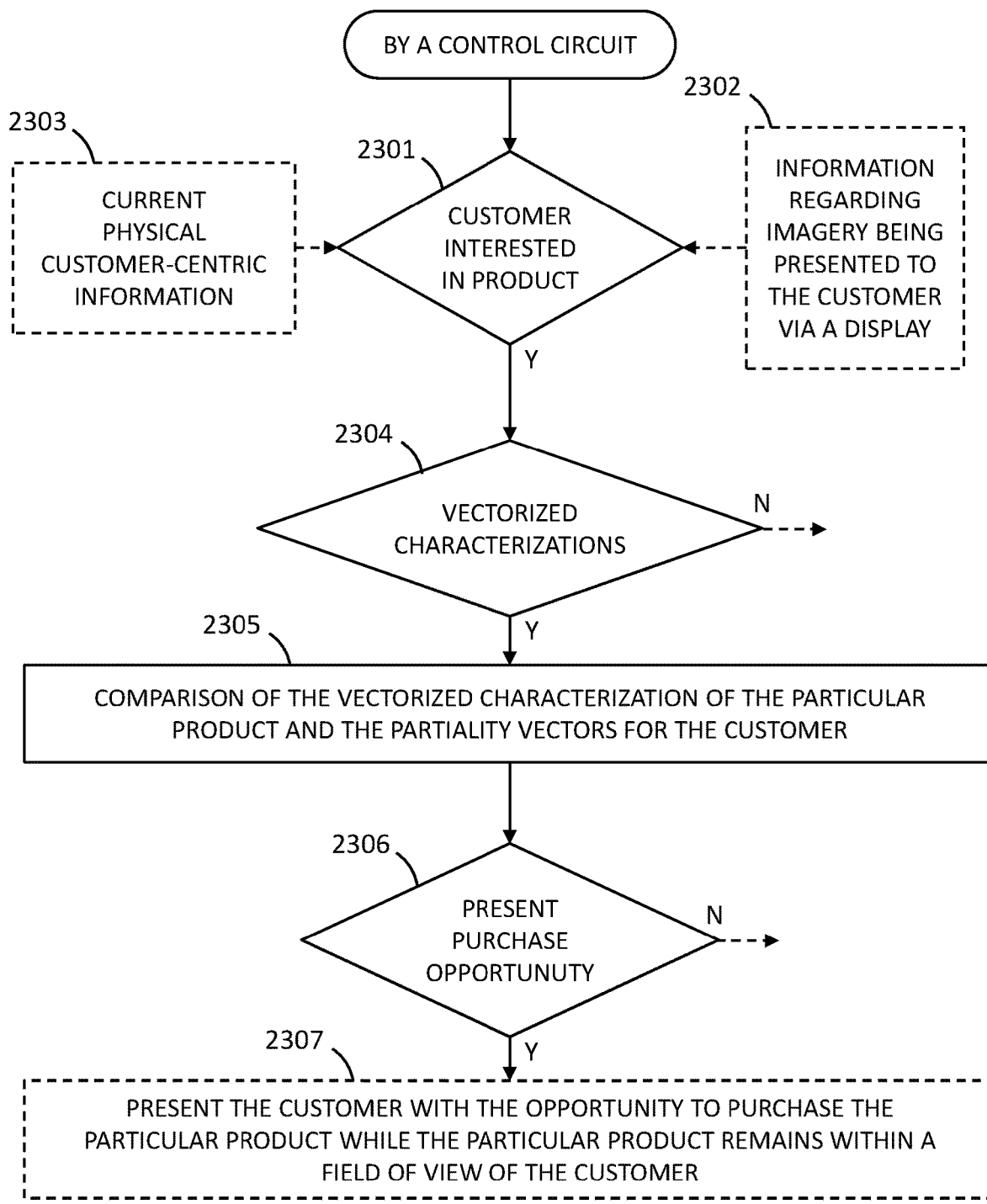
FIG. 23 comprises a flow diagram as configured in accordance with various embodiments of these teachings.

FIG. 23 presents a process 2300 that represents yet another way to leverage such information. For the sake of an illustrative example it is presumed here that the steps of this process 2300 are carried out by the aforementioned control circuit 1301.

At decision block 2301 this process 2300 provides for determining/detecting when a particular customer exhibits interest in a particular product. By one approach this comprises detecting when the customer is gazing at an image of a particular product. Making this determination, in turn, can be based upon information 2302 regarding imagery being presented to the customer via a display such as via the customer's computer, their pad/tablet-style computer, or their smart phone. That information may be received by the control circuit 1301 via the aforementioned network interface 1309. More particularly, the conveyed information may pertain, at least in part, to details regarding the customer's gaze with respect to the aforementioned display.

By one approach the conveyed information can comprise one or more captured images and/or screenshots that include the aforementioned imagery. By another approach, in lieu of the foregoing or in combination therewith, conveyed information can comprise an abridged version of the foregoing (such as, for example, a selected portion of the image that includes (exclusively or otherwise) an image of the product upon which the customer's gaze is presently settled).

These teachings will accommodate the customer themselves having initiated the capture and/or transmission or other processing of the aforementioned imagery. For example, the customer may themselves take a digital photograph that includes the product at issue. These teachings will also accommodate, however, capturing and/or processing imagery that is presently presented to the customer via the aforementioned display in a partially or wholly automated fashion. For example, if desired, this process (or at least this portion of the process) may run constantly (or nearly constantly) as a background process in the customer's device.

As mentioned above the customer's interest in a product can be evidenced by the subject of the customer's gaze. Gaze tracking constitutes a known area of prior art endeavor that requires no further description or elaboration here. By one approach the determination regarding the customer's interest in a particular product can be based, in whole or in part, upon determining that the customer has visually focused on the particular image (either directly or as presented in the aforementioned image) for at least a predetermined amount of time (such as one second, two seconds, five seconds, or other preferred duration of time).

In addition to (or in substitution for) gaze tracking these teachings will accommodate using any other current physical customer-centric information 2303 that may be available in a given application setting ("current" in the sense of being current with respect to the customer's present real-time experience). In addition to the aforementioned gaze information, for example, the current physical customer-centric information can include information regarding one or more physiological responses of the customer (including but not limited to pupil dilation, pulse rate, blood pressure, and so forth) and customer's gestures including pointing towards or touching the product.

One or more of these items of current physical customer-centric information 2303 may be sourced by the customer's device that includes the aforementioned lay or maybe at least initially sourced by other than a device that is currently held or used by the customer. As one example in these regards, one or more available sensors that source an item of current physical customer-centric information 2303 may be part of another device (or maybe a standalone sensor) that independently provides this information to the aforementioned control circuit 1301 or that convey the information to the customer's device (via, for example, a wireless link such as a Bluetooth connection) such that the latter then forwards that information to the control circuit 1301.

At decision block 2304, this process 2300 determines whether the product in which the customer evidences interest is a product for which one or more of the aforementioned vectorized characterizations is/are available. When no character vectorized characterizations are available for the identified product, this process 2300 can accommodate any of a variety of responses. Examples of useful responses can include temporal multitasking pursuant to which the control circuit 1301 conducts other tasks before returning to consider in a same manner another later-identified product.

When the identified product does have one or more corresponding vectorized characterizations, at block 2305 this process 2300 provides for comparing those vectorized characterizations with relevant partiality vectors for the customer. This comparison, in turn, reveals an extent and degree to which there is (or is not) alignment between the customer's partialities and the characterizing attributes of this product as described above. By one approach this comparison reveals whether the product aligns to at least a sufficient predetermined degree with one or more of the customer's partiality vectors (to thereby yield a binary "aligned" or "not aligned" conclusion). By another approach, in lieu of the foregoing or in combination therewith, this comparison reveals a more quantitative or granularly-nuanced sense of an amount by which a particular partiality vector aligns with the product (to thereby yield, for example, a value in a range of values that represent degrees of alignment, or a coded rating from amongst a plurality of available coded ratings such as "medium fit," "good fit," and "excellent fit."

At decision block 2306 this process 2300 uses the result of the foregoing comparison activity to determine whether to automatically present the customer with an opportunity to purchase this particular product while the particular product remains within a field of view of the customer (which is not to say that the customer still needs to be focusing their gaze on this product). This determination can be based upon static and/or dynamic criteria as desired.

For example, by one approach such a purchase opportunity can be presented whenever the aforementioned alignment at least equals a particular measure of alignment. By another approach, the customer may elect to be presented with such purchase opportunities for a particular category of products while eschewing presentation of purchase opportunities for a different category of products. By yet another approach, the customer may elect to be presented with purchase opportunities for any products that are extremely well aligned with their partialities but not for products that are less than extremely well aligned with their partialities.

As noted above, the decision to present a purchase opportunity can be based on dynamic criteria as well. For example, when the image that contains the product comprises a part of a real-time real-world display (as may be the case when playing, for example, an augmented reality game), the decision whether to present a purchase opportunity may depend at least in part upon a speed at which the user may be walking (which may be detected, for example, via image processing, accelerometers, and/or other location determination components such as global positioning system information-based components) and/or a rate at which the imagery itself is changing from one frame to the next. In a case where the field of view and/or the user's own physical location is changing too rapidly, for example, a decision may be made to not present a purchase opportunity with respect to a particular processed product image.

When the process 2300 determines to present the aforementioned purchase opportunity, at optional block 2307 this process 2300 serves to present the customer with the opportunity to purchase the particular product while the particular product remains within the field of the customer. This opportunity may be conveyed via the aforementioned network interface 1309 and may be presented via the same display described above and that is available to the customer.

The remaining figures provide some illustrative examples in these regards. It will be understood that no particular limitations are intended by way of any specific details shown in these examples.

Figure 24:
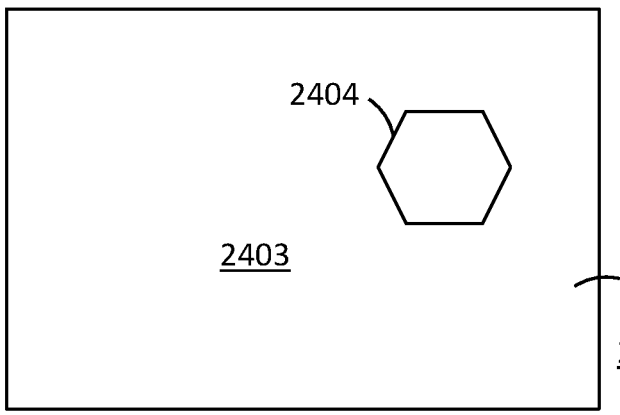
FIG. 24 comprises a screen shot as configured in accordance with various embodiments of these teachings.

FIG. 24 shows the display 2401 of a particular user device 2402 such as, in this example, the display of a desktop computer. In this example the display 2401 presents a website 2403 that includes, amongst other things (which are not depicted for the sake of clarity), a product 2404. This depicted product 2404 may comprise, for example, a digital photographic image of the product 2404. Per the aforementioned process 2300 the control circuit 1301 determines that the customer evinces interest in this product 2404 (by, for example, gazing at the product 2404 for at least a predetermined amount of time). Upon determining that this product 2404 has one or more corresponding vector characterizations and upon comparing those vector characterizations with partiality vectors for this customer, the control circuit 1301 determines that this particular product 2404 aligns well with at least one of the customer's partiality vectors. Using that determination as a trigger, the control circuit 1301 effects presentation of a purchase opportunity to the customer.

Figure 25:
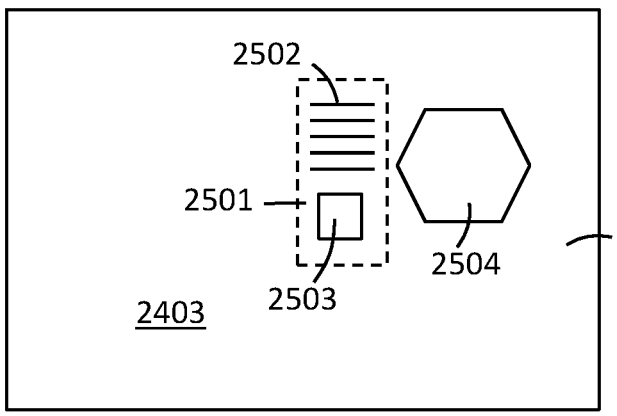
FIG. 25 comprises a screen shot as configured in accordance with various embodiments of these teachings.

With reference to FIG. 25, by one approach this purchase opportunity is presented to the customer via the same display 2401 that presents the product 2404. In this particular example the purchase opportunity appears via an opportunity-presentation window 2501 that is presented within the display 2401 that does not include a majority of the display 2401. For example, the opportunity-presentation window 2501 may be constrained to occupy no more than ten percent of the display area, or no more than twenty-five percent of the display area, or no more than some other predetermined portion of the display area as desired.

By one approach opportunity-presentation window 2501 is placed in close proximity to the product 2404. For example, opportunity-presentation window 2501 may be positioned to directly abut some portion of the product 2404, to partially but not completely overlay the product 2404, or to be within some specific minimal distance of the product 2404 (for example, within 10 pixels, 20 pixels, 50 pixels, or some other distance of choice).

In this example the opportunity-presentation window 2501 includes text 2502 that helps inform the purchasing opportunity. Examples include text that names the product and/or its manufacturer, text that names and/or describes various features of the product, text that describes purchasing options (regarding, for example, colors, sizes, functional capabilities, and so forth), pricing information, shipping restrictions, licensing requirements, and so forth as desired. These teachings will also accommodate having the opportunity-presentation window 2501 utilize non-textual content to supplement that text, or to substitute for such text, backspace.

Also in this example the opportunity-presentation window 2501 includes a user assertable button 2503 that the customer can assert (for example, by clicking or touching through an appropriate user interface) to initiate and/or effectively complete the purchase of the products. By one approach, for example, asserting this button 2503 can open a new window via which the customer can make appropriate selections regarding the purchase and shipment of the product 2404 and/or enter information regarding themselves as appropriate. By another approach, asserting this button 2503 can act as an authorization to fully effect the purchase using previously-stored information regarding the customer, their shipping preferences, their payment preferences, and so forth.

Figure 26:
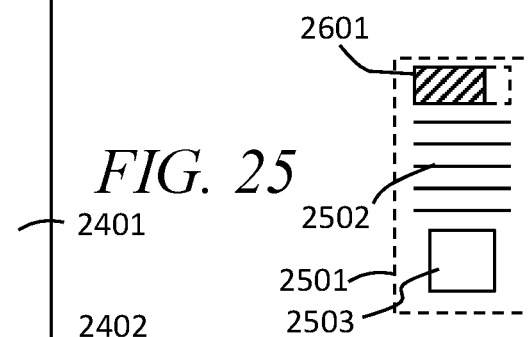
FIG. 26 comprises a screen shot detail view as configured in accordance with various embodiments of these teachings.

Referring now to FIG. 26, by one approach the opportunity-presentation window 2501 can further include an indication of a degree to which one or more relevant partiality vectors for the customer align with one or more corresponding characterizing vectors for this product 2404. In this example this indication comprises a virtual meter bar 2601. By another approach the indication could comprise the presentation of a number that rates the alignment on a particular scale (such as "8" on a scale of "1" to "10"). These teachings will also accommodate essentially any other approach in these regards. For example, the border of the opportunity-presentation window 2501 itself could have a color or other visual attribute that varies as a function of the strength of the represented alignment.

Figure 27:
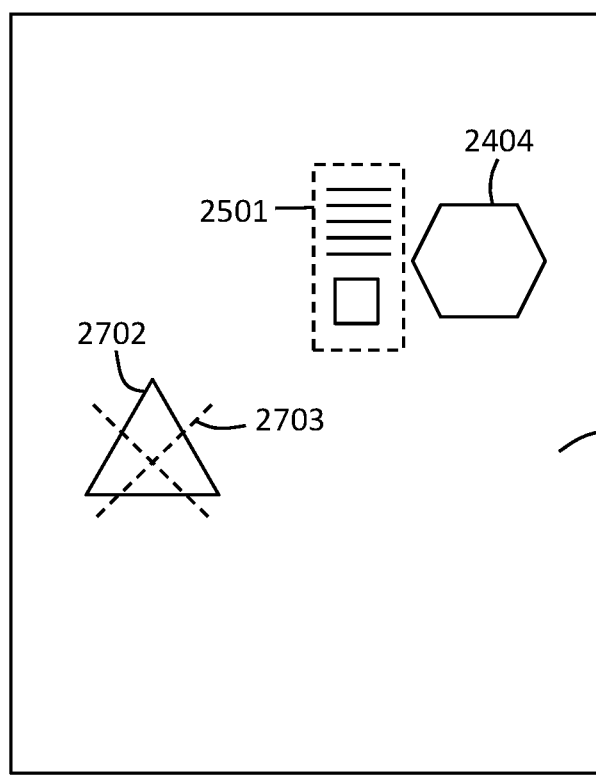
FIG. 27 comprises a screen shot as configured in accordance with various embodiments of these teachings.

FIG. 27 presents another possible approach as regards the implementation of these teachings. In this example, the display 2701 of the user's device 2700 (in this case, a smartphone) presents not only the above-described product 2404 and its corresponding opportunity-presentation window 2501 but also another product 2702 that attracted the attention of the customer. In this example the control circuit 1301 determines, however, that this second product 2702 aligns very poorly with the relevant partiality vectors for the customer. Given that result, the control circuit 1301 declines to present an opportunity-presentation window 2501. If desired, and also as shown in this figure, the control circuit 1301 also causes a negative indication (in this case, a large "X" 2703) to be overlaid on the image of the second product 2702 to intuitively inform the customer that this product 2702 aligns poorly with the customer's partialities.

So configured, these teachings permit a user to shop without shopping if they so wish. Instead, the user can simply conduct their life in their ordinary manner. When and if they find something interesting, they are presented with an opportunity to purchase that item provided it can be confirmed that the item of interest in fact well aligns with the user's own established partialities. As a net result, to a very great extent the user saves time, avoids inconvenience, and makes purchases of things that will increase the desired order of their life while avoiding the purchase of things that will likely lead to an opposite result, thereby increasing their satisfaction and avoiding disappointment.

In some embodiments, an apparatus comprises a memory having stored therein: information including a plurality of partiality vectors for a customer; and vectorized characterizations for each of a plurality of products, wherein each of the vectorized characterizations indicates a measure regarding an extent to which a corresponding one of the products accords with a corresponding one of the plurality of partiality vectors; a network interface; a control circuit operably coupled to the memory and to the network interface and configured to: detect when the customer is gazing at an image of a particular product, determine that the particular product is one of the products having at least one of the vectorized characterizations, determine whether to automatically present the customer with an opportunity to purchase the particular product while the particular product remains within a field of view of the customer as a function, at least in part, of a comparison of the vectorized characterizations of the particular product and the partiality vectors for the customer.

In some embodiments, at least one of the partiality vectors represents a value held by the customer. In some embodiments, the control circuit is configured to detect when the customer is gazing at the image of the particular product by receiving, via the network interface, information regarding imagery being presented to the customer via a display. In some embodiments, the control circuit is further configured to detect when the customer is gazing at the image of the particular product by receiving, via the network interface, information regarding the customer's gaze as pertains to the display. In some embodiments, the imagery being presented to the customer via the display includes, at least in part, real-world content being provided by a camera. In some embodiments, the information regarding imagery being presented to the customer via a display comprises at least one captured screenshot of imagery. In some embodiments, the at least one captured screenshot of imagery comprises imagery presented by a camera. In some embodiments, the control circuit is configured to detect when the customer is gazing at an image of a particular product by, at least in part, using the image of the particular product to compare to a record of known products. In some embodiments, the control circuit is configured to detect when the customer is gazing at an image of a particular product by determining that the customer has focused on the image of the particular product for at least a predetermined amount of time. In some embodiments, the control circuit is further configured to: present the customer with the opportunity to purchase the particular product while the particular product remains within a field of view of the customer. In some embodiments, the control circuit is configured to present the opportunity to purchase the particular product via the network interface and via a display that is available to the customer. In some embodiments, the control circuit is further configured to present the opportunity to purchase the particular product via an opportunity-presentation window that is presented within the display and that does not occlude a majority the display. In some embodiments, the control circuit is further configured to present the opportunity-presentation window in close proximity to the particular product. In some embodiments, the control circuit is further configured to present the opportunity to purchase the particular product in conjunction with presentation of an indication of a degree to which relevant partiality vectors for the customer align with corresponding characterizing vectors for the particular product. In some embodiments, the presentation of the indication of the degree to which the relevant partiality vectors for the customer align with the corresponding characterizing vectors for the particular product comprises a non-textual indication.

In some embodiments, an apparatus comprises a memory having stored therein: information including a plurality of partiality vectors for a customer, and vectorized characterizations for each of a plurality of products, wherein each of the vectorized characterizations indicates a measure regarding an extent to which a corresponding one of the products accords with a corresponding one of the plurality of partiality vectors, a network interface, a control circuit operably coupled to the memory and to the network interface and configured to: detect when the customer is interested in a particular product, determine that the particular product is one of the products having at least one of the vectorized characterizations, determine whether to automatically present the customer with an opportunity to purchase the particular product while the particular product remains within a field of view of the customer as a function, at least in part, of a comparison of the vectorized characterizations of the particular product and the partiality vectors for the customer.

In some embodiments, the control circuit is configured to receive current physical customer-centric information via the network interface and wherein the control circuit is configured to detect when the customer is interested in a particular product as a function, at least in part, of the current physical customer-centric information. In some embodiments, the current physical customer-centric information comprises, at least, in part, gaze information for the customer. In some embodiments, the current physical customer-centric information comprises at least one of: a physiological response of the customer and a gesture of the customer. In some embodiments, the current physical customer-centric information is initially sourced by other than a device that is currently held by the customer.

This application is related to, and incorporates herein by reference in its entirety, each of the following U.S. provisional applications listed as follows by application number and filing date: 62/323,026 filed Apr. 15, 2016; 62/341,993 filed May 26, 2016; 62/348,444 filed Jun. 10, 2016; 62/350,312 filed Jun. 15, 2016; 62/350,315 filed Jun. 15, 2016; 62/351,467 filed Jun. 17, 2016; 62/351,463 filed Jun. 17, 2016; 62/352,858 filed Jun. 21, 2016; 62/356,387 filed Jun. 29, 2016; 62/356,374 filed Jun. 29, 2016; 62/356,439 filed Jun. 29, 2016; 62/356,375 filed Jun. 29, 2016; 62/358,287 filed Jul. 5, 2016; 62/360,356 filed Jul. 9, 2016; 62/360,629 filed Jul. 11, 2016; 62/365,047 filed Jul. 21, 2016; 62/367,299 filed Jul. 27, 2016; 62/370,853 filed Aug. 4, 2016; 62/370,848 filed Aug. 4, 2016; 62/377,298 filed Aug. 19, 2016; 62/377,113 filed Aug. 19, 2016; 62/380,036 filed Aug. 26, 2016; 62/381,793 filed Aug. 31, 2016; 62/395,053 filed Sep. 15, 2016; 62/397,455 filed Sep. 21, 2016; 62/400,302 filed Sep. 27, 2016; 62/402,068 filed Sep. 30, 2016; 62/402,164 filed Sep. 30, 2016; 62/402,195 filed Sep. 30, 2016; 62/402,651 filed Sep. 30, 2016; 62/402,692 filed Sep. 30, 2016; 62/402,711 filed Sep. 30, 2016; 62/406,487 filed Oct. 11, 2016; 62/408,736 filed Oct. 15, 2016; 62/409,008 filed Oct. 17, 2016; 62/410,155 filed Oct. 19, 2016; 62/413,312 filed Oct. 26, 2016; 62/413,304 filed Oct. 26, 2016; 62/413,487 filed Oct. 27, 2016; 62/422,837 filed Nov. 16, 2016; 62/423,906 filed Nov. 18, 2016; 62/424,661 filed Nov. 21, 2016; 62/427,478 filed Nov. 29, 2016; 62/436,842 filed Dec. 20, 2016; 62/436,885 filed Dec. 20, 2016; 62/436,791 filed Dec. 20, 2016; 62/439,526 filed Dec. 28, 2016; 62/442,631 filed Jan. 5, 2017; 62/445,552 filed Jan. 12, 2017; 62/463,103 filed Feb. 24, 2017; 62/465,932 filed Mar. 2, 2017; 62/467,546 filed Mar. 6, 2017; 62/467,968 filed Mar. 7, 2017; 62/467,999 filed Mar. 7, 2017; 62/471,804 filed Mar. 15, 2017; 62/471,830 filed Mar. 15, 2017; 62/479,525 filed Mar. 31, 2017; 62/480,733 filed Apr. 3, 2017; 62/482,863 filed Apr. 7, 2017; 62/482,855 filed Apr. 7, 2017; and 62/485,045 filed Apr. 13, 2017.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system for content-based product recommendations comprising:
    a content monitoring device comprising a sensor configured to detect audio or video output of a separate device to monitor video content viewed by a user;
    a customer vectors database storing customer vectors associated with a plurality of customers;
    a product vectors database; and
    a control circuit coupled to the customer vectors database and the product vectors database, the control circuit being configured to:
        detect, via the content monitoring device, a video content being viewed by the user;
        identify an item associated with a current segment of the video content viewed by the user;
        determine a product category associated with the item;
        retrieve product characteristic vectors associated with a plurality of products in the product category from the product vectors database;
        retrieve customer value vectors associated with the user from the customer vectors database;
        determine alignments between the customer value vectors and the product characteristic vectors for each of the plurality of products in the product category;
        select a recommended product from the plurality of products based on the alignments between the customer value vectors and the product characteristic vectors for each of the plurality of products; and
        initiate an offer of the recommended product to the user.

2. The system of claim 1, wherein the customer vectors each represents at least one of a person's values, preferences, affinities, and aspirations.

3. The system of claim 1, wherein the customer value vectors each comprises a magnitude that corresponds to the customer's belief in good that comes from an order associated with that value.

4. The system of claim 1, wherein the content monitoring device comprises a sound sensor of a user device configured to detect sound from the video content displayed on the separate device.

5. The system of claim 1, wherein the content monitoring device comprises one or more of a smart television, a cable box, a video streaming device, and a network router.

6. The system of claim 1, wherein the item corresponds to an item selected by the user using one or more of a remote control of a display device and a voice command sensor.

7. The system of claim 1, wherein the item associated with the current segment of the video content is identified based on one or more of: metadata of the video content associated with the current segment, analysis of a caption text of the video content, audio analysis of an audio track of the video content, and object recognition analysis of the video content.

8. The system of claim 1, wherein the control circuit is further configured to cause a product ordering user interface for the recommended product to be displayed on a user interface device to the user.

9. The system of claim 1, wherein the control circuit is further configured to add the recommended product to an automatic delivery service shipment for the user.

10. The system of claim 1, wherein the control circuit is further configured to update the customer value vectors associated with the user in the customer vectors database based on one or more characteristics of the video content viewed by the user and/or the item.

11. A method for content-based product recommendation comprising:
    detecting, via a content monitoring device comprising a sensor configured to detect audio or video output of a separate device to monitor video contents viewed by a user, a video content being viewed by the user;
    identifying, with a control circuit, an item associated with a current segment of the video content viewed by the user;
    determining, with the control circuit, a product category associated with the item;
    retrieving product characteristic vectors associated with a plurality of products in the product category from a product vectors database;
    retrieving customer value vectors associated with the user from a customer vectors database storing customer vectors associated with a plurality of customers;
    determining, with the control circuit, alignments between the customer value vectors and the product characteristic vectors for each of the plurality of products in the product category;
    selecting, with the control circuit, a recommended product from the plurality of products based on the alignments between the customer value vectors and the product characteristic vectors for each of the plurality of products; and
    initiating, with the control circuit, an offer of the recommended product to the user.

12. The method of claim 11, wherein the customer vectors each represents at least one of a person's values, preferences, affinities, and aspirations.

13. The method of claim 11, wherein the customer value vectors each comprises a magnitude that corresponds to the customer's belief in good that comes from an order associated with that value.

14. The method of claim 11, wherein the content monitoring device comprises a sound sensor of a user device configured to detect sound from the video content displayed on the separate device.

15. The method of claim 11, wherein the content monitoring device comprises one or more of a smart television, a cable box, a video streaming device, and a network router.

16. The method of claim 11, wherein the item corresponds to an item selected by the user using one or more of a remote control of a content display device and a voice command sensor.

17. The method of claim 11, wherein the item associated with the current segment of the video content is identified based on one or more of: metadata of the video content associated with the current segment, analysis of a caption text of the video content, audio analysis of an audio track of the video content, and object recognition analysis of the video content.

18. The method of claim 11, further comprising:
    causing a product ordering user interface for the recommended product to be displayed on a user interface device to the user.

19. The method of claim 11, further comprising:
    adding the recommended product to an automatic delivery service shipment for the user.

20. The method of claim 11, further comprising:
    updating the customer value vectors associated with the user in the customer vectors database based on one or more characteristics of the video content viewed by the user and/or the item.

21. An apparatus for content-based product recommendation comprising:
- a non-transitory storage medium storing a set of computer readable instructions; and
- a control circuit configured to execute the set of computer readable instructions which causes to the control circuit to:
    - detect, via a content monitoring device comprising a sensor configured to detect audio or video output of a separate device to monitor video contents viewed by a user, a video content being viewed by the user;
    - identify, with the control circuit, an item associated with a current segment of the video content viewed by the user;
    - determine, with the control circuit, a product category associated with the item;
    - retrieve product characteristic vectors associated with a plurality of products in the product category from a product vectors database;
    - retrieve customer value vectors associated with the user from a customer vectors database storing customer vectors associated with a plurality of customers;
    - determine, with the control circuit, alignments between the customer value vectors and the product characteristic vectors for each of the plurality of products in the product category;
    - select a recommended product from the plurality of products based on the alignments between the customer value vectors and the product characteristic vectors for each of the plurality of products; and
    - initiating an offer of the recommended product to the user.

* * * * *